(12) United States Patent
Kaji et al.

(10) Patent No.: US 6,183,367 B1
(45) Date of Patent: Feb. 6, 2001

(54) COMMUNICATIVE GAME SYSTEM

(75) Inventors: Toshiyuki Kaji; Toshihiro Nakane; Yoshinori Harada, all of Tokyo; Naoki Fuse, Hachioji, all of (JP)

(73) Assignee: Kabushiki Kaisha Sega Enterprises, Tokyo (JP)

( * ) Notice: Under 35 U.S.C. 154(b), the term of this patent shall be extended for 0 days.

(21) Appl. No.: 09/115,638

(22) Filed: Jul. 15, 1998

(30) Foreign Application Priority Data

Jul. 16, 1997 (JP) .................................................... 9-205526

(51) Int. Cl.[7] .............................. A63F 13/00; A63F 9/24; G06F 17/00; G06F 19/00
(52) U.S. Cl. .................................. 463/42; 463/1; 463/30; 463/31; 463/40; 463/43; 345/113; 345/114; 345/133; 345/329; 345/418; 345/433
(58) Field of Search ..................................... 463/42, 40, 1, 463/2, 3, 4, 5, 6, 7, 8, 9, 10, 11, 12, 13, 16, 25, 26, 30, 31, 41, 43; 273/292, 293; 345/418, 433, 113, 114, 133, 329

(56) References Cited

U.S. PATENT DOCUMENTS

| | | | |
|---|---|---|---|
| 4,636,951 | * 1/1987 | Harlick | 364/412 X |
| 4,890,321 | * 12/1989 | Seth-Smith et al. | 380/20 X |
| 5,452,435 | * 9/1995 | Malouf et al. | 395/550 X |
| 5,664,778 | * 9/1997 | Kikuchi et al. | 273/148 B X |
| 5,755,621 | * 5/1998 | Marks et al. | 463/42 X |

* cited by examiner

*Primary Examiner*—Joe H. Cheng
*Assistant Examiner*—Binh-An Nguyen
(74) *Attorney, Agent, or Firm*—Finnegan, Henderson, Farabow, Garrett & Dunner, L.L.P.

(57) ABSTRACT

By enabling exchange of information relating to players, apart from game data, "communication" between the players is increased, and the sense of rivalry and level of interest generated by a game are raised. The communicative game system 1 forms a network comprising a plurality of game devices 2a–2d connected mutually by communications media 3. The plurality of game devices 2a–2d respectively comprise a communications system 31 for receiving data transferred over the network and transferring the received data and data generated by the home game device onto the network, and a host system 32 for accessing the received data. By this means, data comprising a game packet, sound packet and video packet can be transmitted by conducting broadcast communications based on the communications system 31 and host system 32 between the plurality of game devices 2a–2d.

13 Claims, 48 Drawing Sheets

PACKET

MEMORY MAP

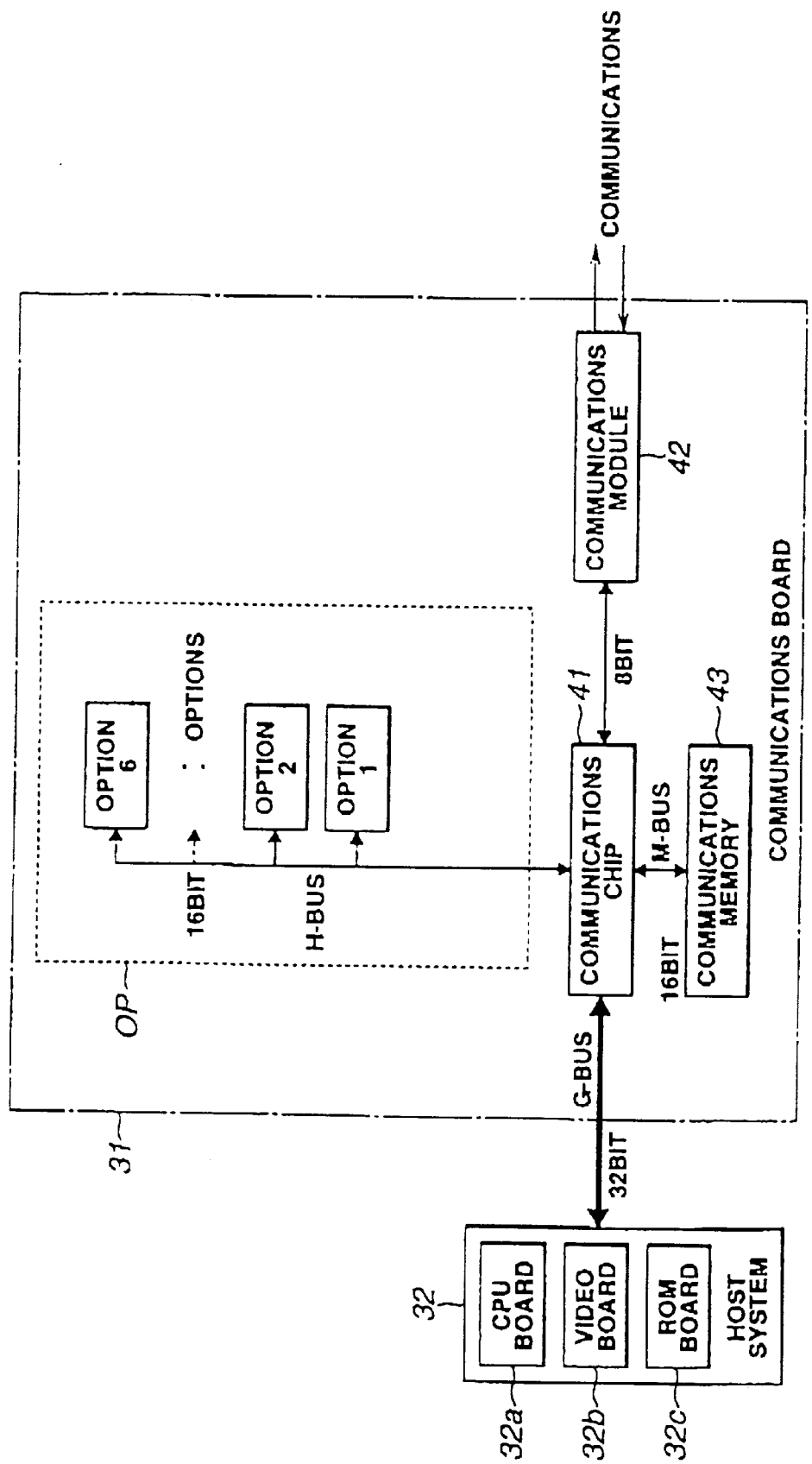

FIG.18

\*RST_PACKET : RESET PACKET
    OPERATION : USED TO RESET SYSTEM; TRANSMISSION SEQUENCER
        AND PACKET CONTROL HARDWARE IS RESET
        DELETED WHEN RECEIVED BY TRANSMISSION SOURCE (REQUESTER)
    TRANSMISSION : TRANSMITTED BY SETTING REG_RST BIT IN COMMAND_REGISTER TO ON
        TRANSMITTED AUTOMATICALLY WHEN COMREG_ASND BIT
        IN COMMAND_REGISTER IS ON
        TRANSMITTED AUTOMATICALLY AT EACH V INT WHEN COMREG_SSND BIT
        IN COMMAND_REGISTER IS ON

\*HLT_PACKET : HALT PACKET
    OPERATION : USED TO HALT OPERATION OF SYSTEM TEMPORARILY;
        OPERATION IS TEMPORARILY HALTED UP TO RECEPTION OF RST_PACKET
        DELETED WHEN RECEIVED BY TRANSMISSION SOURCE (REQUESTER)
    TRANSMISSION : TRANSMITTED BY SETTING COMREG_HLT BIT IN COMMAND_REGISTER TO ON

\*LOOP_PACKET : LOOP PACKET
    OPERATION : USED AS IDENTIFIER FOR SND_PACKET GROUPS (BETWEEN MAIN_PACKET
        AND OPTION_PACKET, FOR EXAMPLE); DELETED WHEN RECEIVED BY
        TRANSMISSION SOURCE (REQUESTER)
    TRANSMISSION : TRANSMITTED AUTOMATICALLY BY SND_MASTER

\*SYN_PACKET : SYNC PACKET
    OPERATION : USED FOR SYNCHRONIZING MACHINES
        IF TRANSMISSION SOURCE (REQUESTER) IS SYNCHRONIZED, AND THERE IS
        NO SYNPOS_PACKET, THEN SYNNEG_PACKET IS RETURNED
    TRANSMISSION : TRANSMITTED AT EACH VINT BY SETTING COMREG_SYN BIT IN
        COMMAND_REGISTER TO ON. TRANSMITTED UNTIL COMREG_SYN BIT
        IS SET TO OFF.

\*SET_PACKET : SET PACKET
    OPERATION : USED WHEN TRANSFERRING DATA BY SPECIFYING DESTINATION
        DELETED WHEN RECEIVED BY TRANSMISSION SOURCE (REQUESTER)
    TRANSMISSION : TRANSMITTED WHEN COMREG_SET BIT IN COMMAND_REGISTER IS SET TO ON

\*OPN_PACKET : OPEN PACKET
    OPERATION : USED FOR TRANSFERRING RIGHT TO TRANSMIT
    TRANSMISSION : TRANSMITTED AUTOMATICALLY AT START OF SND TRANSMISSION

\*SND_PACKET : SEND PACKET
    OPERATION : USED FOR TRANSFERRING DATA FOR ALL MACHINES CONTINUOUSLY BY
        SPECIFYING SOURCE
        DELETED WHEN RECEIVED BY TRANSMISSION SOURCE (REQUESTER)
    ASYNCHRONOUS
    TRANSMISSION : SND TRANSMISSION SEQUENCE IS STARTED BY SETTING COMREG_ASND
        BIT IN COMMAND_REGISTER TO ON
        MACHINE WITH COMREG_ASND BIT IN COMMAND_REGISTER SET TO ON
        BECOMES SND_MASTER, AND OTHER MACHINES OPERATE AS SLAVES
        (SEE (2)-1 TYPES OF DATA TRANSMISSION FOR DATA TRANSFER SEQUENCE)
    SYNCHRONOUS
    TRANSMISSION : SND TRANSMISSION SEQUENCE IS STARTED AT EACH VINT BY SETTING
        COMREG_ASND BIT IN COMMAND_REGISTER TO ON
        SND TRANSMISSION SEQUENCE IS GENERATED UNTIL COMREG_ASND BIT
        IN COMMAND_REGISTER IS SET TO OFF
        MACHINE WITH COMREG_ASND BIT IN COMMAND_REGISTER SET TO ON
        BECOMES SND_MASTER, AND OTHER MACHINES OPERATE AS SLAVES
        (SEE (2)-1 TYPES OF DATA TRANSMISSION FOR DATA TRANSFER SEQUENCE)

FIG.19

DATA COMMUNICATIONS PACKET

| CONTROL | ADDRESS, ETC. | DATA | END FLAG | CRC |

CONTROL : INITIALIZATION OF SEQUENCER / COMMANDS
CONTROL : ADDRESS ; PACKET LENGTH
    DATA : DATA OF 1~256 WORD LENGTH
END FLAG : INDICATES END OF DATA
     CRC : CRC CALCULATION RESULTS

DOT NUMBER FOR NTSC 1 LINE

FOR EXAMPLE, WHEN THE DATA FOR THIS DOT IS PROCESSED, IT REFLECTS DOTS APPLYING A TONE THERETO

FIG.39
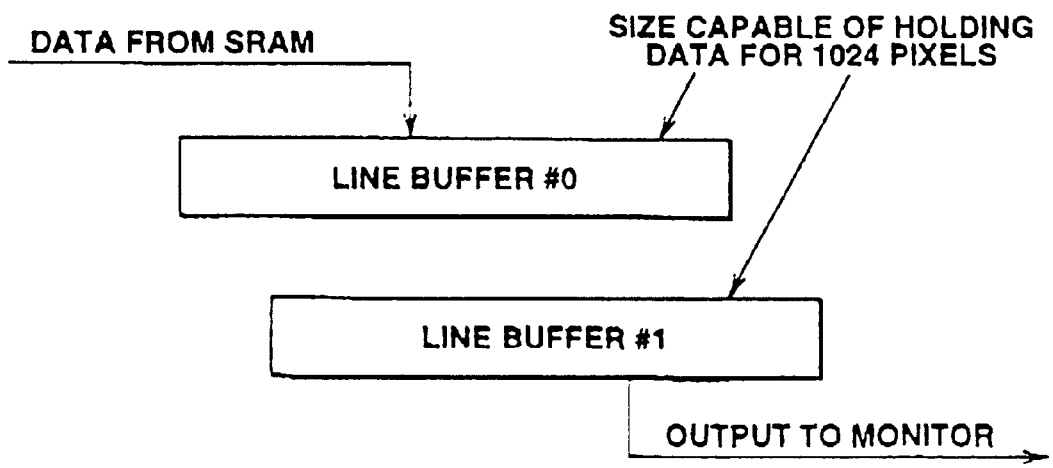
SWITCH LINE BUFFER DURING H BLANKING PERIOD
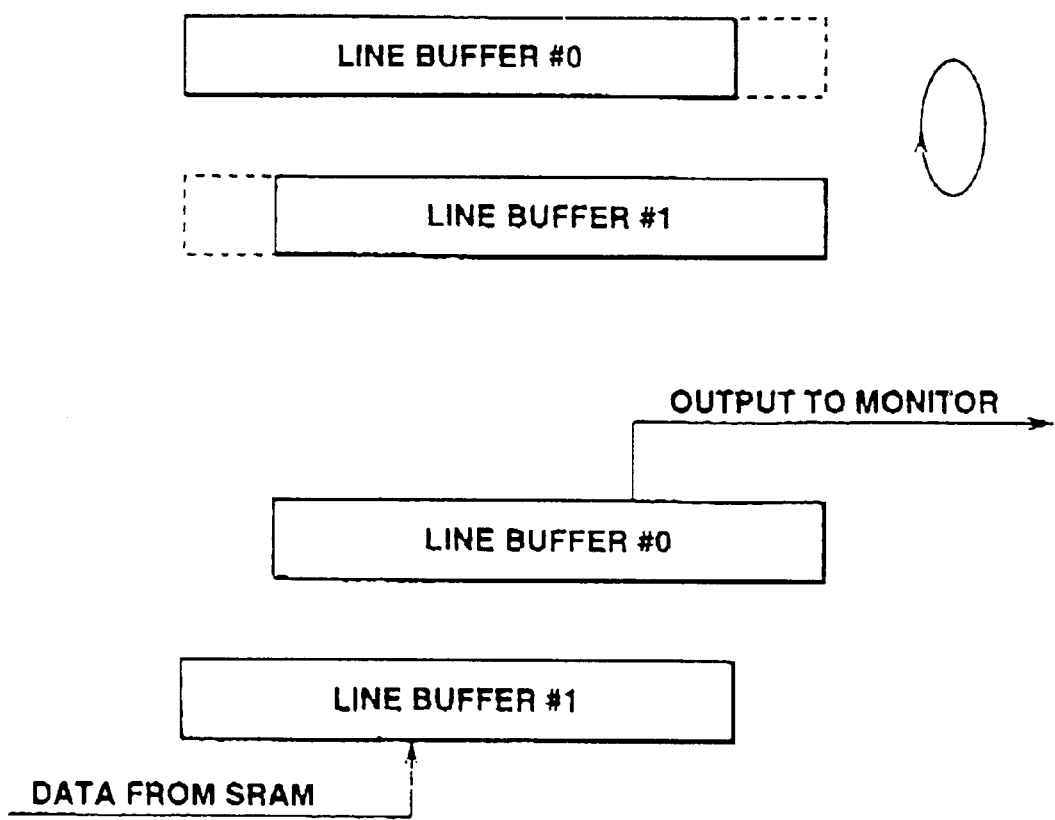

COMPOSITION FOR CREATING SOUND CIRCUIT
CLOCK FROM VIDEO SYNCHRONIZING SIGNAL

COMMUNICATIVE GAME SYSTEM

BACKGROUND OF THE INVENTION

1. Field of the Invention

The present invention relates to a communicative game system comprising a plurality of game devices linked by means of communications media, which is suitable for conducting a game of a format wherein a plurality of people compete against each other by means of these game devices.

2. Description of the Related

With the progress of computer graphics technology in recent years, image processing devices providing various types of images have been proposed. Of these, some are used in so-called video game devices (hereinafter, game devices) to provide racing games, shooting games, simulation games, action games, or the like. Game devices of this kind capable of displaying clearer and more realistic images are sought, for both domestic and commercial use. A game device generally comprises a game device main unit containing a computer device which executes previously recorded game programs, an operating device for supplying operating signals instructing the movement of an object represented in the game to the computer device, a display for displaying images associated with the game development in accordance with the execution of the game program by the game device, and a sound device for generating sounds associated with this game development.

In recent years, in order to make images of a higher quality and greater appeal, game devices have come to display images wherein an object (character) and a background, etc. are located in virtual three-dimensional spatial co-ordinates by defining image data, and these items are viewed from a prescribed viewpoint.

One of the game formats used in such game devices is a communicative game. Usually, a communicative game is implemented by means of a communicative game system. A communicative game system is a system wherein a plurality of game devices having the foregoing composition are linked mutually by means of communications media, such as communications cables, or the like, to form a communications loop. In this communicative game system, conventionally, data (game data) representing the game contents of the individual game devices is exchanged between the game devices. Thereby, each game device in the communications loop displays, practically in real time, the game progress status of the game device operated by the other players involved in the game contest. A communicative game system of this kind is suitable, for example, for a driving game wherein a plurality of players compete (contest) with each other in a virtual game space for rankings in a car race.

However, in the conventional communicative game system described above, only game data is exchanged between the game devices in the communications loop, and there is no communication whatsoever of information other than this. In other words, whilst it is natural for each player to make various expressions or to emit cries, or other sounds, in response to the state of development of a competitive game, these are not transmitted by the game device to the other players, forming the opponents in the competitive game. If the actual bodies of the game devices are positioned adjacent to each other, then it is possible to gain some impression of the opponents' feelings, but in nearly all cases, a player's eyes are glued to the monitor screen of his or her own game device, and therefore it is difficult for the player to tell the feelings of his or her opponents in the game. Consequently, certain aspects of "communication" created by contact between the players is lacking.

This lack of "communication" is a particular feature in the field of game devices. Since a game involves the use of game devices, the sense of rivalry and level of interest created by the game can be increased by transmitting the cries of rival players, expressing their emotions, to the other players. However, in conventional game devices, no consideration whatsoever is given to the provision of means for transmitting "communication" of this kind, and therefore the sense of rivalry and interest have been diminished accordingly. Moreover, since conventional communicative game systems involve only exchange of game data, it has not been possible to communicate special effects, such as noises, etc. required in the game, and hence the game space has created a poor sense of realism.

SUMMARY OF THE INVENTION

The present invention was devised in order to overcome the current state of conventional game communications systems, as described above. A first object of the present invention is to increase "communication" between players, by making it possible to exchange information relating to each player, other than the game data, thereby raising the sense of rivalry and the level of interest created by the game, and thus increasing the added value of the game.

A further object of the present invention is to raise the sense of realism of a game by making it possible to communicate special effects, and the like, which lie outside the game data, but are desirable for the game.

In order to achieve the aforementioned objects, the communicative game system relating to the present invention is a communicative game system forming a network of a plurality of game devices, whereby a plurality of players play a game individually, connected mutually by means of communications media, wherein the plurality of game devices respectively comprise transferring means for receiving data transferred on the network and transferring this reception data and data generated by the game device itself onto the network, and access means for accessing the reception data, and data is transmitted and received between the plurality of game devices by means of a broadcast communications system based on the transferring means and the access means.

The communications media are signal cables, for example. Desirably, the transferring means comprises a controller for controlling the data transmission and reception operations of the transferring means, and a memory for storing the reception data, whilst the access means comprises a CPU for commanding the execution of the game in the home game device, and there is also provided control means for causing the CPU to access the memory, whilst causing the aforementioned access operation and the transmission of reception data to the network by the transferring means to be executed simultaneously. In this case, desirably, the control means comprises means for causing the access operation by the CPU to the memory and the access operation by the controller to the memory to be executed alternately by time division.

Furthermore, each game device may also be provided, for example, with means for changing the right to transmit data to the network, alternately by time division.

Furthermore, each game device may also comprise means for selecting data transmitted over the network.

Moreover, desirably, a prescribed game device of the plurality of game devices is provided with synchronizing means for transmitting a synchronizing signal for synchronizing the operational timing of each of the game devices, onto the network, wherein the synchronizing signal is a signal which is synchronized with the video signal.

Furthermore, a prescribed game device of the plurality of game devices may also comprise means for detecting a fault in the communications media between the plurality of game devices by determining whether or not the synchronizing signal is transmitted to each of the game devices.

Desirably, the data transmitted over the network comprises: a game data packet generated by execution of the game in each game device; a sound data packet relating to the sound of the player playing the game at each game device; and a video data packet relating to the image of the player playing the game at each game device. In this case, desirably, each game device comprises: game implementing means for generating game data; sound data generating means for generating sound data by inputting the voice of the player; and video data generating means for generating video data by inputting video images of the player.

In this composition, for example, each game device may comprise sound generating means for generating sound by synthesizing sound data from the game data with the sound data in the transmission data; and image display means for displaying an image on a monitor by synthesizing the video data in the game data and the video data in the transmission data.

Moreover, the image display means may also be composed such that it comprises video data processing means whereby at least one of the elements of display size, display position, brightness, colour, bordering, embossing, or the like, relating to the video data in the transmission data, can be changed.

Moreover, desirably, the video data generating means comprises compression means for compressing the video data. Furthermore, desirably, the video data generating means comprises extracting means for extracting only the human image of the player from the video data.

Furthermore, the image display means may also comprise means for superimposing the video data in the transmission data on the screen of the video data in the game data, in the form of a window.

On the other hand, desirably, the transferring means comprises a controller for controlling data transmission and reception operations by the transferring means, and a memory for storing reception data, whilst the sound data generating means comprises a processor for processing the sound data, and a work memory, separate from the aforementioned memory, which is used as a work area for the processor.

In this case, the sound data generating means may also comprise means for achieving synchronism by implementing interpolation processing in order to match frame lengths.

For example, the sound data generating means may comprise sound data processing means for applying processes corresponding to at least one element of sound effects, noise, and special effects, to the sound data.

Furthermore, for example, any one of the plurality of game devices may also comprise means for transmitting background sound data generated by the home device to the remaining game devices. Moreover, desirably, the sound data generating means also comprises means for converting the sound data to three-dimensional sound data.

BRIEF DESCRIPTION OF THE DRAWINGS

FIG. 12 is a diagram illustrating positional relationships between a player, camera, microphone, and the like;

FIG. 17 is a diagram for describing the composition and operation of a communications system;

FIG. 18 is a diagram for describing the composition and operation of a communications system;

FIG. 19 is a diagram for describing the composition and operation of a communications system;

FIG. 39 is a diagram for describing the composition and operation of a video block;

DESCRIPTION OF THE PREFERRED EMBODIMENTS

A communicative game system relating to modes for implementing the present invention is now described with reference to the drawings.

A. Overview of communicative game system

Firstly, the characteristic features of the communicative game system relating to the present mode of implementation will be described.

A-1. Broadcast communications system

This communicative game system 1 comprises a plurality of game devices 2a–2d, and these game devices 2a–2d are mutually connected by means of communications media 3, such as cables, such that they form a single network.

Figure 1:
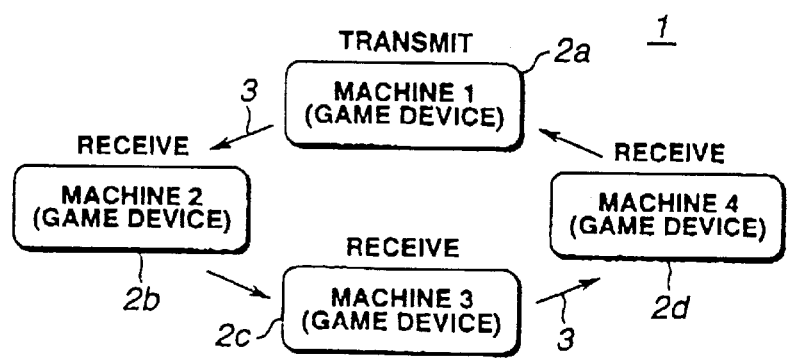
FIG. 1 is a block diagram showing a general view of a network for a communicative game system relating to one mode for implementing the present invention.

FIG. 1 shows an example wherein the game devices 2a–2d are connected in a ring configuration. The connection system is not limited in particular, and other configurations may be used. The communications protocol used in this network is based on a broadcast communications system. Specifically, only one game device 2a in the network has the right to transmit data, and when this game device 2a is transmitting, the other game devices can only receive data. When the game device 2a has finished transmission, the right to transmit passes to the next game device 2b, and this game device 2b conducts data transmission. In this case, similarly, the other game devices assume a receive-only state. Thereafter, by repeating this operation in sequence, the data from all the game devices 2a–2d is transmitted through the network.

Figure 2:
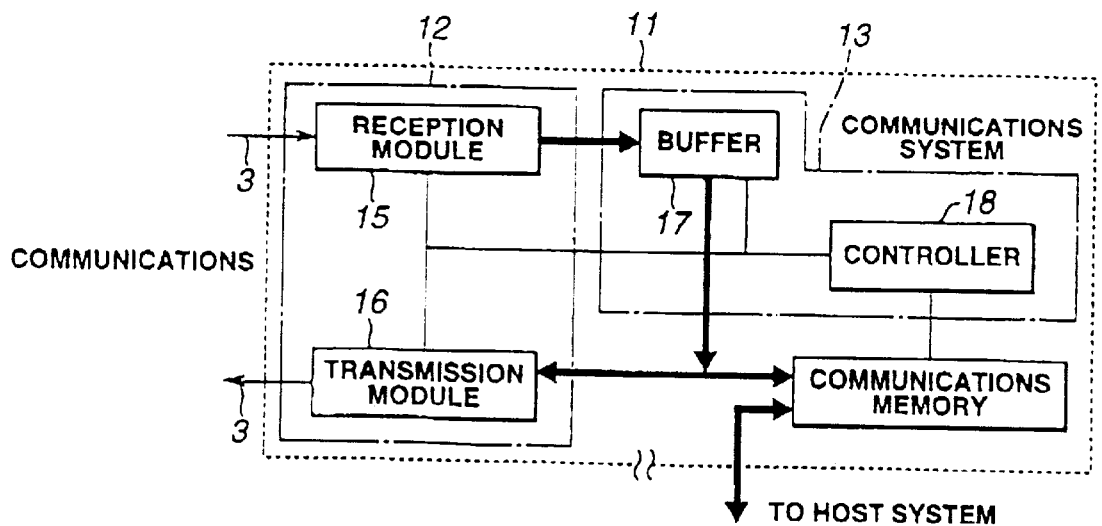
FIG. 2 is a block diagram giving an approximate illustration of a communicative game system.

In order to realize this broadcast communications system, the game devices 2a–2d respectively comprise a communications system 11, as illustrated in FIG. 2. (They also comprise a video block and a sound block; see FIG. 13). The communications system 11 comprises a communications module 12, communications chip 13 and communications memory 14. The communications module 12 comprises a reception module 15 and a transmission module 15. The communications chip 13 comprises a buffer 17 and a communications controller 18. The reception module 15 and the transmission module 16 are respectively connected to the other game devices by means of communications media 3. Furthermore, the reception module 15 is connected via the buffer 17 to the transmission module 16 and communications memory 14 by means of a bus 19. The communications controller 18 respectively controls the operations of the reception module 15, transmission module 16, buffer 17 and communications memory 14. The communications memory 14 is further connected to a host CPU in each game device (omitted from FIG. 2).

In this communications system 10, in order to implement the aforementioned broadcast communications method, a memory access operation by the communications controller 18 and a memory access operation by the host CPU are executed by time division with respect to the communications memory 14. In other words, the right of access passes in sequence from host CPU to communications controller to host CPU, and so on. When communication with the other game devices is finished, the communications controller 18 sends an interrupt signal to the host CPU by, for instance, raising a flag. When the host CPU receives an interrupt signal by, for example, recognizing that the flag is in the raised state, access to the communications memory 14 is permitted for a prescribed period of time.

A characteristic feature here is that the data output from the buffer 17 is output to both the communications memory 14 and the transmission module 16, and the host CPU is able to access the memory reliably at all times, even if the game device is in the process of communications. Therefore, no overrun errors or underrun errors occur, so there is no change to transmission efficiency, even if broadcast transfer is implemented continuously. In this way, it is possible to provide a communicative game system having good communications efficiency, which is especially designed for broadcast communications.

A-1-1. Selection of communications data

Figure 3:
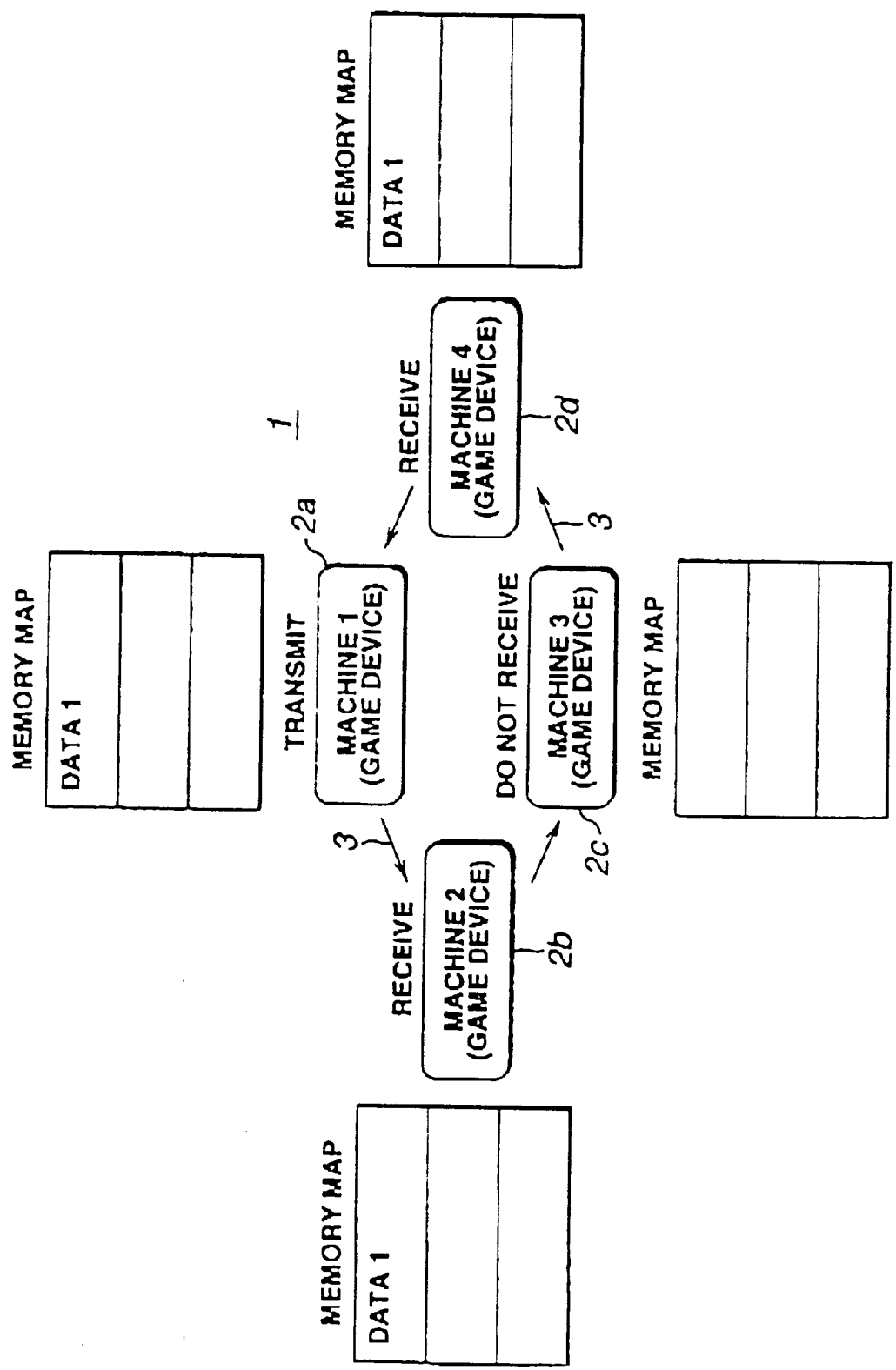
FIG. 3 is a diagram illustrating a broadcast communications system according to the present invention.

One important point in this communications system is that the data generated by each game device is transferred to all of the other game devices. In view of this, in the present invention, a broadcast system is adopted, and a hardware composition and a communications system specially for broadcast communications are used. Specifically, in a broadcast communications system relating to the present invention, a system is adopted wherein a receiving game device selects and receives required data from data sent by a game device carrying out data transmission at that point in time (the transmitting game device does not transmit data by specifying an ID number of a receiving game device), as shown schematically in FIG. 3. For example, when image data is transmitted, only game devices which aim to display this image read in the data, and unwanted data is either not read in or it is read in and not used. This is achieved by checking the header of the communications packet, and determining which game device the data is from, and which transfer cycle the data is using, by means of the communications controller.

A-2. High priority synchronizing signal

Figure 4:
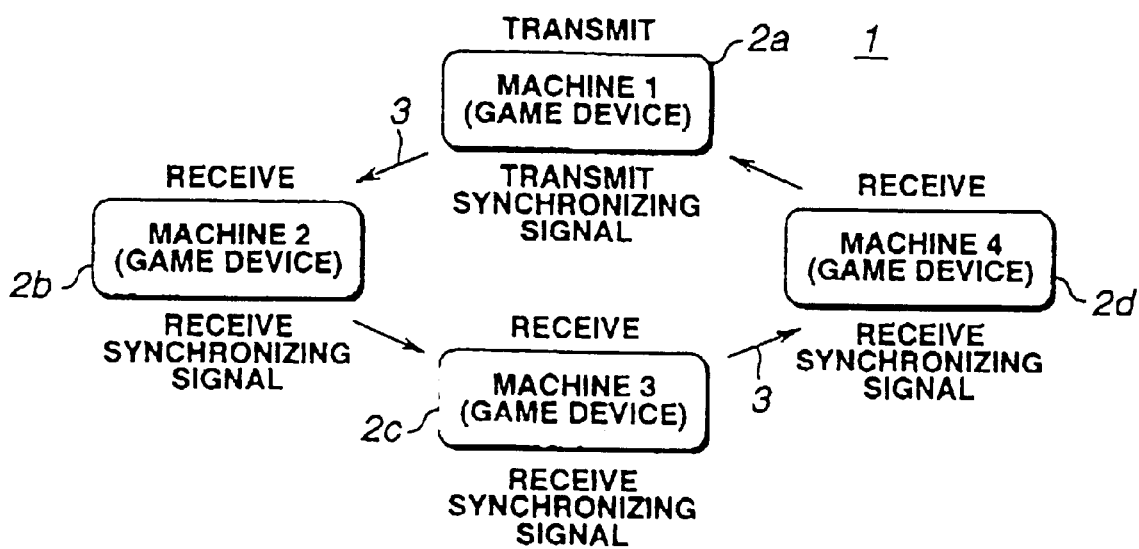
FIG. 4 is a diagram illustrating a synchronous communications system relating to the present invention.
Figure 5:
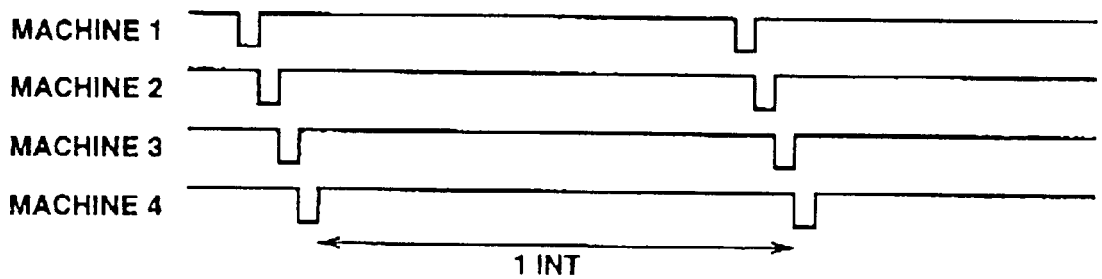
FIG. 5 is a timing chart illustrating a synchronous communications system relating to the present invention.

A further feature of the communicative game according to the present invention is the high priority synchronizing signal. For example, when a plurality of game devices are connected via communications media in a ring configuration, as shown in FIG. 4, one game device is set to transmit a synchronizing signal in the communications loop, separately from normal data communications, and it periodically transmits a synchronizing signal having priority over all other communications. By implementing data transfer in synchronism with this synchronizing signal, it is possible to conduct data transfer involving virtually no time delay (see FIG. 5). The hardware composition for achieving this can be implemented by means of a communications system 11 as described in FIG. 2, and a vsync signal of this system can be used as the synchronizing signal. Thereby, since this high priority synchronizing packet is transmitted by interrupting normal packet transmission, synchronous communications containing virtually no time delay can be conducted on the network.

A-2-1. Fault detection

Fault detection can be cited as an additional feature of synchronous communications. By transmitting the aforementioned synchronizing packet periodically, it is possible to take countermeasures when abnormalities occur in communications, such as a disconnection of a signal cable in a part of the network. Specifically, the location where a communications abnormality has occurred can be identified readily by means of a game device which has not received the synchronizing signal transmitting a signal indicating that the synchronizing signal has not been received to the game device which transmits the synchronizing signal.

Figure 6:
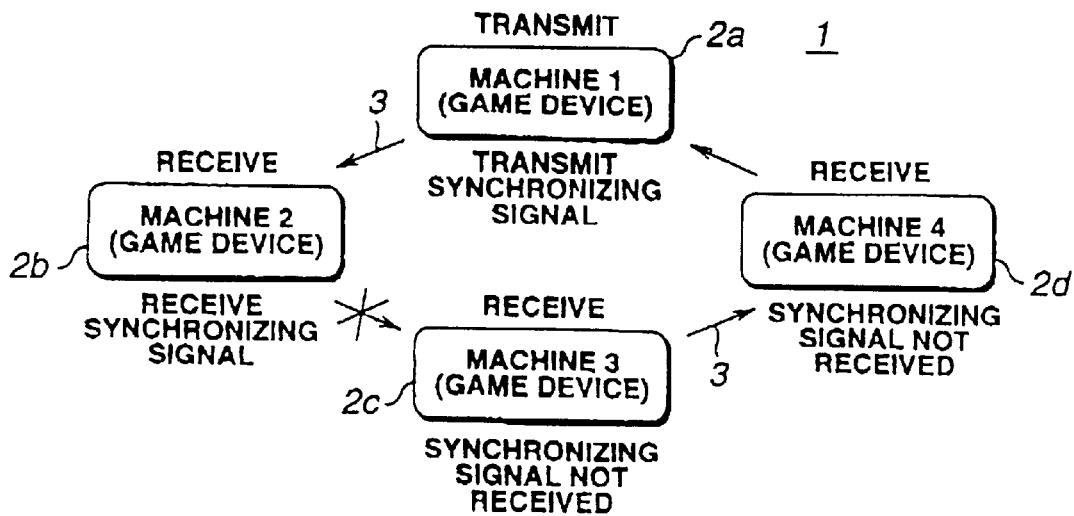
FIG. 6 is a diagram illustrating a fault detection system according to the present invention.
Figure 7:
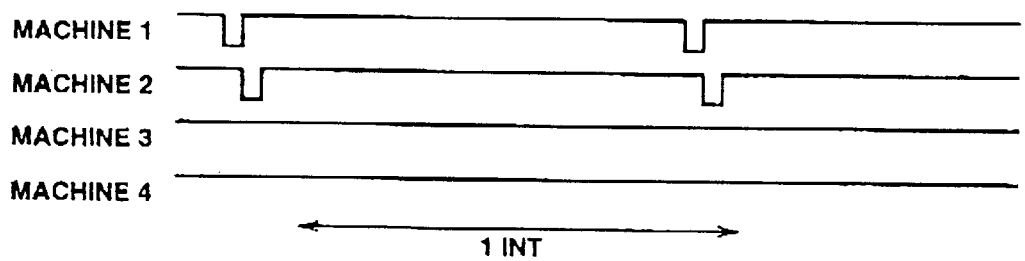
FIG. 7 is a timing chart illustrating a fault detection system according to the present invention.

FIGS. 6 and 7 show transmission states of the synchronizing signal when there is a disconnection between devices 2b and 2c, in a configuration where the game device 2a transmits the synchronizing signal.

A-2-2. Display of transmitted video data

Figure 8:
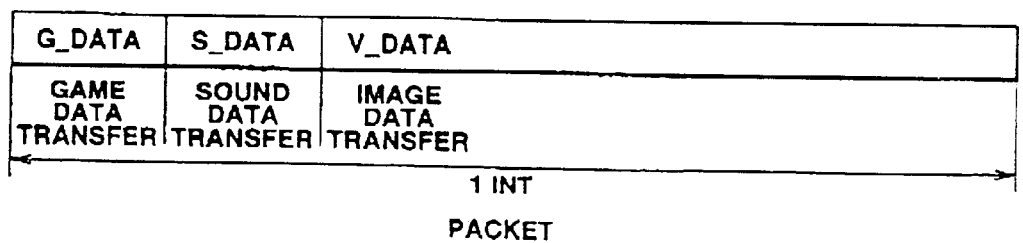
FIG. 8 is a diagram illustrating a transfer packet.

A further feature of this synchronous communications system is that the system is centred on image transfer. FIG. 8 shows a communications transfer packet. As shown in this diagram, the communications system is a fully synchronized signal wherein, essentially, a transfer packet is transmitted at every lint (vsync) and each transfer packet is divided into a "game packet", "sound packet" and "video packet". In other words, the "game data", "sound data" and "video data" are all communicated at the same level and are transmitted in synchronism with the vsync signal. In this way, in this synchronous communications system, image transfer is the central operation and other data is synchronized thereto. Therefore, even if appropriate image processing of some kind is implemented for a delay of 1 int, or the like, the image corresponding to the transmitted video data can be displayed in a 2–3 int delayed state, and since vsync is used for the timing of this processing, there is no delay in the image display. This communications system is specially designed for image processing.

B. More detailed description of communicative game system

A more detailed description of the composition and functions of the communicative game system relating to the present invention is now given with reference to the drawings.

Figure 9:
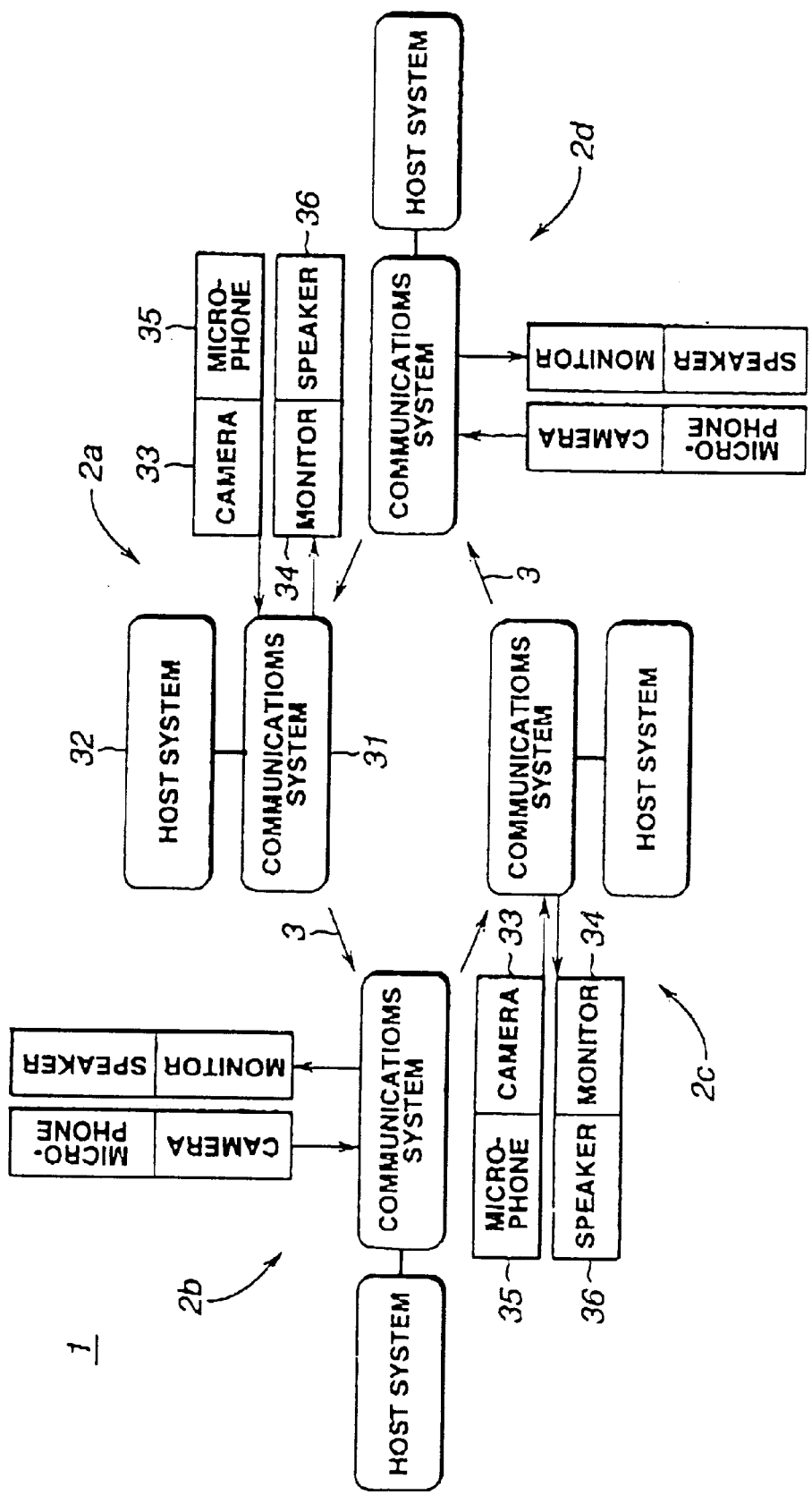
FIG. 9 is a block diagram for describing an overall network for a communicative game system relating to one mode for implementing the present invention in more detail.

The communicative game system 1 illustrated in FIG. 9 involves four game devices 2a–2d connected by cables in a ring configuration, and it conducts communications on the basis of the aforementioned broadcast communications method and simultaneous communications method. The game devices 2a–2d respectively comprise a communications system 31. host system 32, video camera 33, monitor 34, microphone 35, and speaker 36, as shown in the diagram. The communications system 31 has a similar composition and functions to the aforementioned communications system.

Figure 10:
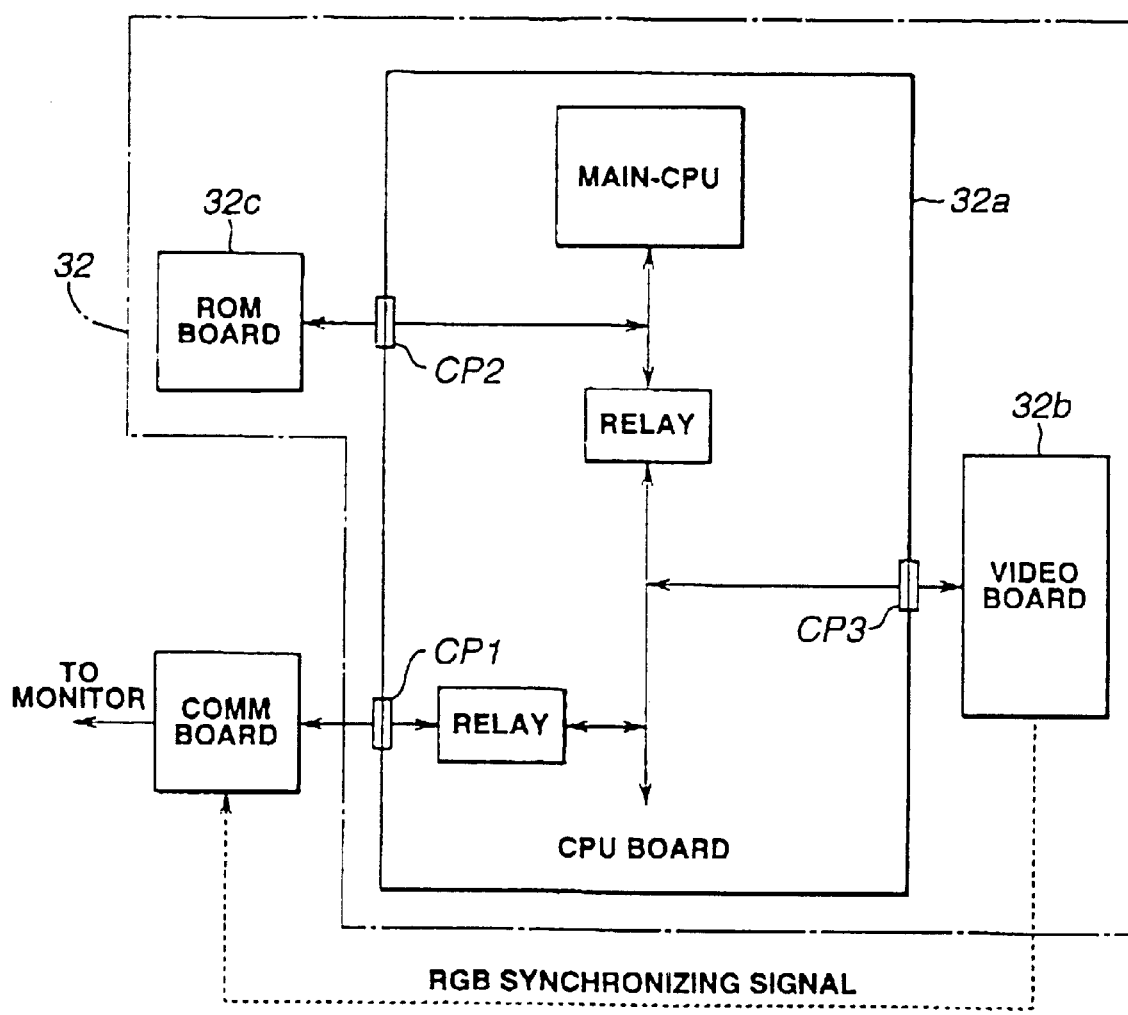
FIG. 10 is a diagram illustrating board connection relationships by means of a host system composition and connectors.

Each host system 32 is a system whereby the respective players execute the game, and it comprises a CPU board 32*a*, video board 32*b* and ROM board 32*c* (see FIG. 10). Each communications system 31 is formed onto a communications board and is connected to a host system 32 via a connector. The communications board 31 is connected to a video camera 33, monitor 34, microphone 35 and speaker 36. FIG. 10 shows the state of connections between boards of a communications system 31 and host system 32. In this drawing, the communications board 31 and the CPU board 32*a* of the host system 32 are connected by means of a connector CP1. Furthermore, the CPU board 32*a* in the host system 32 and the ROM board 33*c*, and the CPU board 32*a* and the video board 32*b*, are connected respectively by means of connectors CP2, CP3. RGB data (game data), sound signals and a synchronizing signal are transferred from the video board 32*b* to the communications board 31 by means of a signal cable. The video camera 33 is constituted by a CCD camera, for example. The video camera 33 is positioned such that it can capture a portion of the player, for example, his or her face (see FIG. 12), and the image of the player's face taken by this camera is transmitted to the other game devices.

Figure 11:
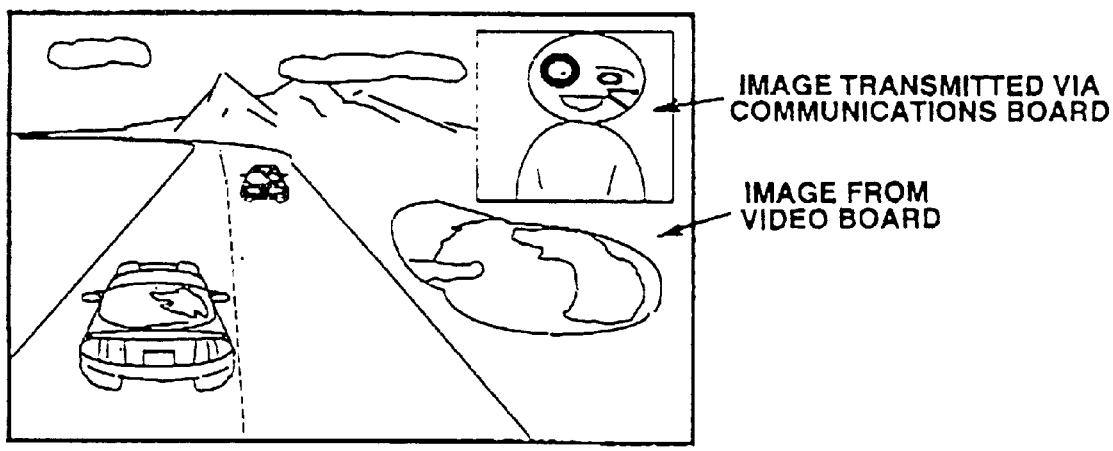
FIG. 11 is a diagram illustrating an example of a monitor screen.

The monitor 34 is constituted by a CRT display, for example. In the communications board 31, the RGB data and the synchronizing signal from the video board 32*b* are synthesized with (superimposed on) data transmitted from the other game devices and sent to the relevant monitor 34, where it is displayed. FIG. 11 shows a screen example of a monitor 34 displaying an image processed in this way. The transmitted image is, for example, displayed in a window on the monitor screen, as shown in this diagram. This window screen may display, for example, the facial expression of the player operating the leading car in a racing game. Furthermore, in a car racing game, it may display the facial expression of a friendly player who is on the same team.

Figure 12:
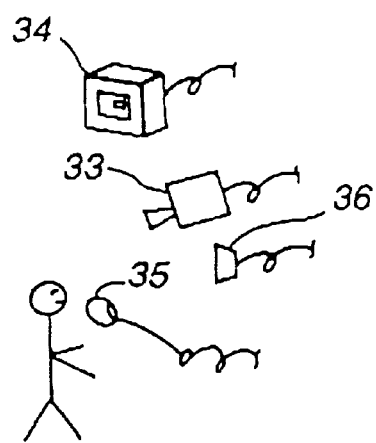

The microphone 35 is located in a prescribed position on the casing of each game device, such that it can detect the voice of the player (see FIG. 12). The sound signal from the microphone 35 is transmitted to the other game devices via the communications board 31, and it is output from the speaker 36 along with the sounds of the game, and thereby transmitted to the other players.

B-1 Communications system

Figure 13:
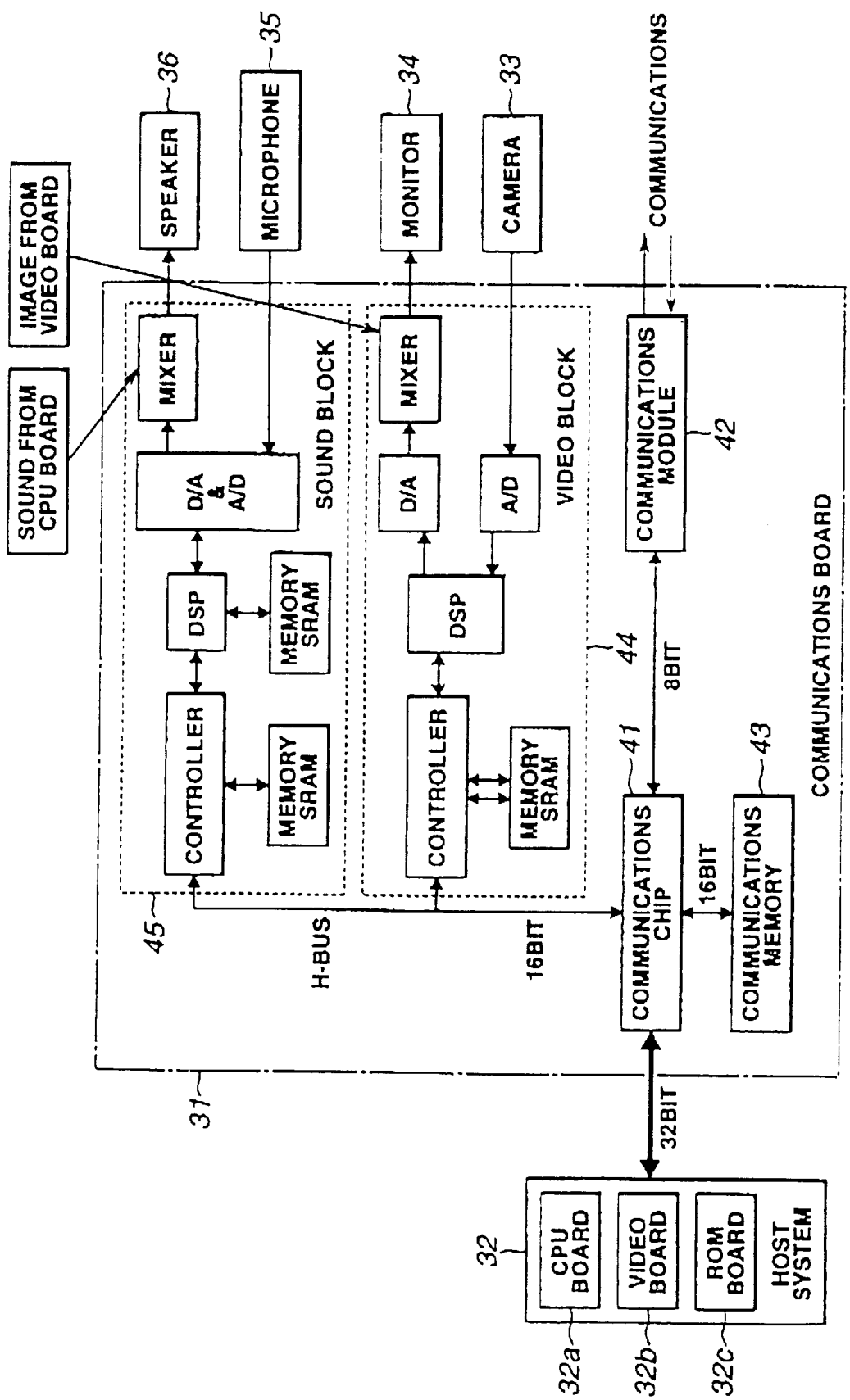
FIG. 13 is a block diagram showing (a partially approximated view of) a compositional example of a communications system (communications board)

FIG. 13 shows a more detailed block diagram of a communications system (communications board) 31. The communications system 31 comprises: a communications chip 41 (see FIG. 2) whereon a buffer and communications controller are mounted; a communications module 42 (transmission module and reception module); communications memory 43; video block 44; and a sound block 45. The communications chip 31 is connected via a bus to the host system 32, and it is also connected respectively via a bus to the communications module 42 and the communications memory 43. The communications module 42 is connected via communications cables, or the like, to the communications modules of the other game devices, thereby forming a communications network of a plurality of game devices in a ring configuration, for example. The communications chip 41 and communications module 42 conduct transmission and reception of game data, sound data and video data. The communications member 43 comprises a plurality of banks, and is used by switching banks. The video block 44 and sound block 45 are also connected to the communications chip 41 by means of a bus. The video block 44 is connected to the aforementioned video camera 33 and monitor 34. The sound block 45 is connected to the aforementioned microphone 35 and speaker 36. The video block 44 processes video data obtained from the video camera 33, such as an image of the player's face, video data transmitted by the other game devices, and video data output from the video board 32*b* of the host system 32. Although omitted from the drawings, the video data from the video board 32*b* of the home host system 32 is supplied to a mixer of the video block 43. The video block 43 shown in FIG. 13 is a schematic block structure for executing the aforementioned processing, and its composition and functions are described in detail in a following section. The sound block 45 processes sound data received from the microphone 35, such as the player's voice, sound data transmitted from other game devices, and sound data output by the CPU board 32*a* of the host system 32. Although omitted from the drawings, sound data from the CPU board 32*a* in the home host system 32 is supplied to a mixer in the sound block 44. The sound block 44 illustrated in FIG. 13 is a schematic block structure for executing the aforementioned processing, and its composition and function are described in detail in a following section.

B-1-1 Signal system a. Home device transfer packet

The game data of the home game device is transmitted from the CPU board 32*a* of the host system 32 to the communications chip 41, and the video data and sound data of the home game device are transmitted respectively from the video block 44 and sound block 45 to the communications chip 41 in the form of digital data. At the communications chip 41, a transfer packet containing "game data", "sound data" and "video data" is formed and transmitted to the network via the communications module 42.

b. Transfer packet from other devices

Transfer packets received from the other game devices are sent to the communications chip 41 via the communications module 42, and are stored in the communications memory 43. The game data in this transfer packet is accessed by the CPU board 32*a* of the host system 32 at prescribed time intervals. Furthermore, the sound data is accessed by the controller of the sound block 45 at prescribed time intervals, and the video data is accessed by the controller of the video block 44 at prescribed time intervals.

In the sound block 45, an internal DSP (digital signal processor) subjects the accessed sound data to signal processing to achieve various effects, whereupon the data is converted to an analogue signal by a D/A converter, and then synthesized with the sound signal from the CPU board 32*a* by a mixer. This synthesized sound signal is then output to the speaker 36.

In the sound block 45, the sound signal detected by the microphone 36 of the home system can also be output to the home speaker 37. Furthermore, in the video block 44, an internal DSP (digital signal processor) subjects the accessed video data to signal processing to achieve various effects, whereupon the data is converted to an analogue signal by a D/A converter, and then synthesized with the video signal from the video board 32*b* by a mixer. This synthesized video signal is then output to the monitor 34.

In the video block 44, the video signal detected by the video camera 33 of the home system can also be output to the home monitor 34.

B-1-2 Communications system (Packet transfer)

As illustrated in FIG. 8 above, a transfer packet comprises a game packet, sound packet, and a video packet, and essentially, one packet is transferred at each 1 int (vsync). Packets are stored in respective memories in the communications memory. Since the transfer procedure for the transfer packets is determined by the communications software, the packet order may differ from that shown. Furthermore, a system which is not based on transfer of one packet every 1 int may also be used.

(Transfer of game data)

Figure 14:
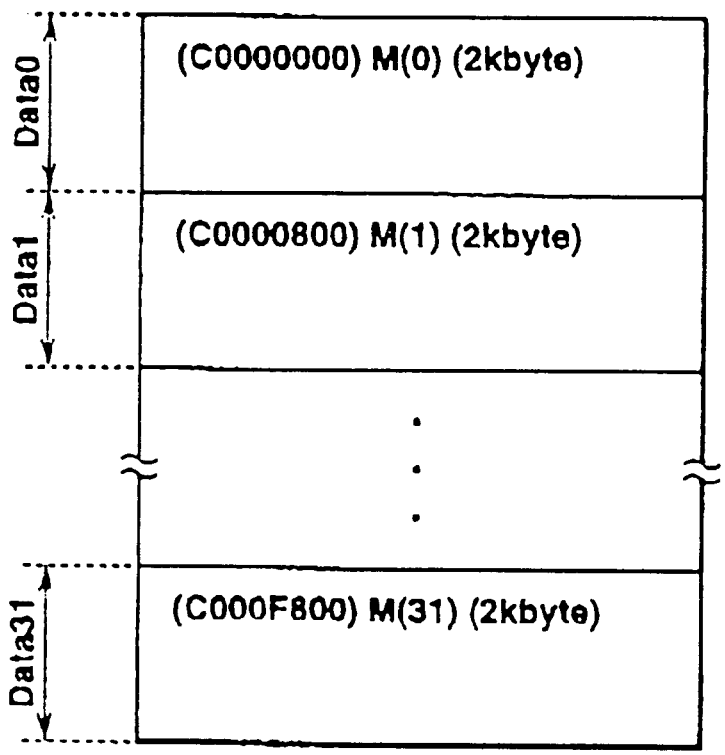
FIG. 14 is a diagram for describing the composition and operation of a communications system.

Transfer of game data involves transmission and reception of game data required by the host system of the home game device, between the home device and other game devices. The data is transmitted in synchronism with the vsync signal, but this may also be changed by means of the communications software. FIG. 14 shows an example of a 32-device memory map used for implementing data transfer.

(Transfer of sound data)

Transfer of sound data involves transmission and reception of sound data input by the microphone of the home game device, between the home device and the other game devices. The sound data is transferred after transfer of the game data, for example, but this sequence is essentially determined by the communications software. The memory of the sound block 45 is divided into a common memory shared by the communications controller and the DSP, and a work memory used by the DSP, the common memory usually being disconnected from the DSP. The common memory is connected to the DSP when the DSP transfers data from the common memory to the work memory. This transfer timing is determined by the DSP by means of the communications chip outputting a synchronizing signal to the DSP. During this transfer operation, it is impossible to access the memory from the communications side. Therefore, the bus is designed so that it is switchable by time division, in order that this operation does not overlap with sound transfer.

Figure 15:
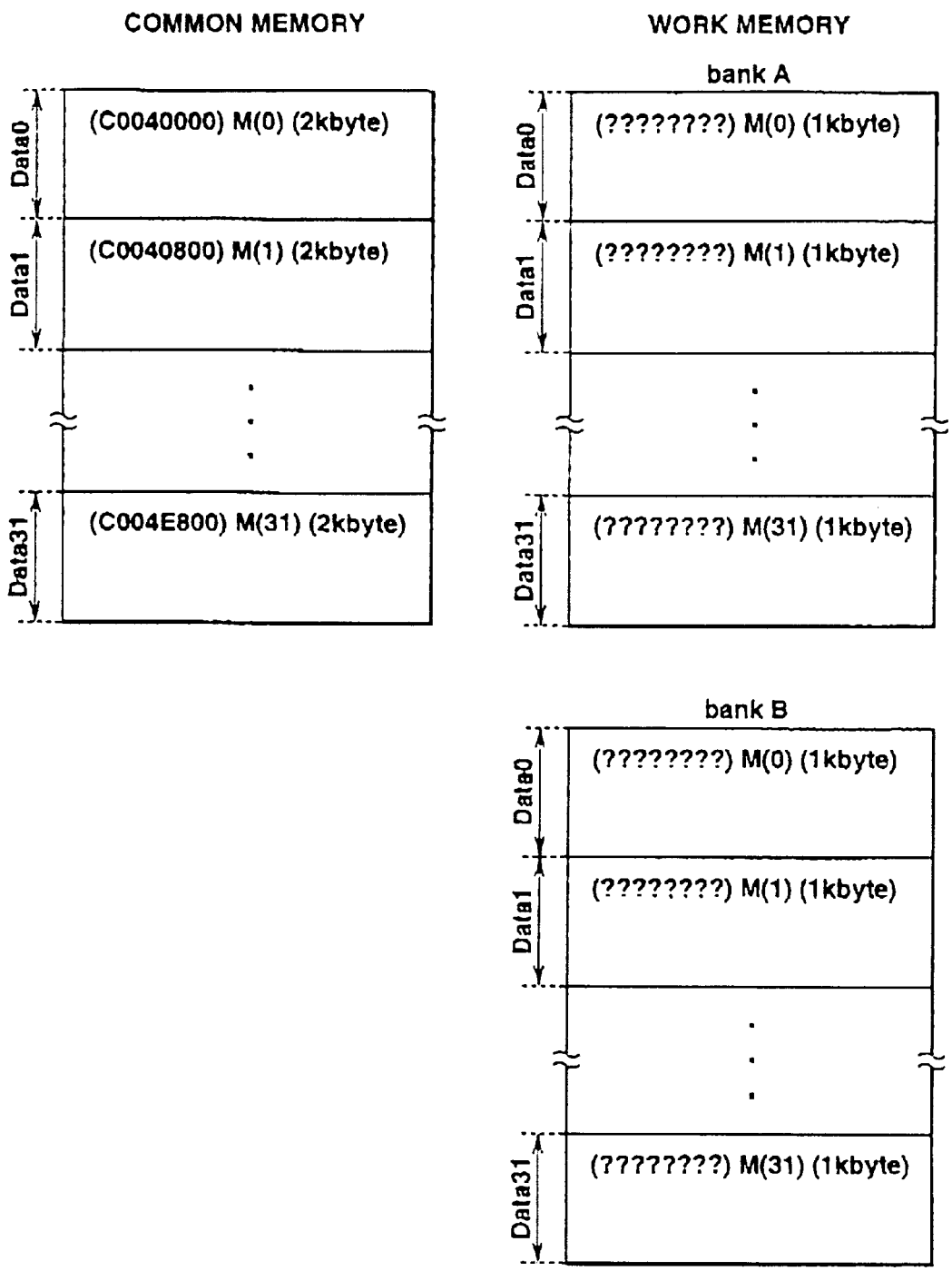
FIG. 15 is a diagram for describing the composition and operation of a communications system.

FIG. 15 shows an example of a 32-device memory map for sound data. The work memory is used by dividing it hypothetically into two banks.

(Transfer of video data)

Figure 16:
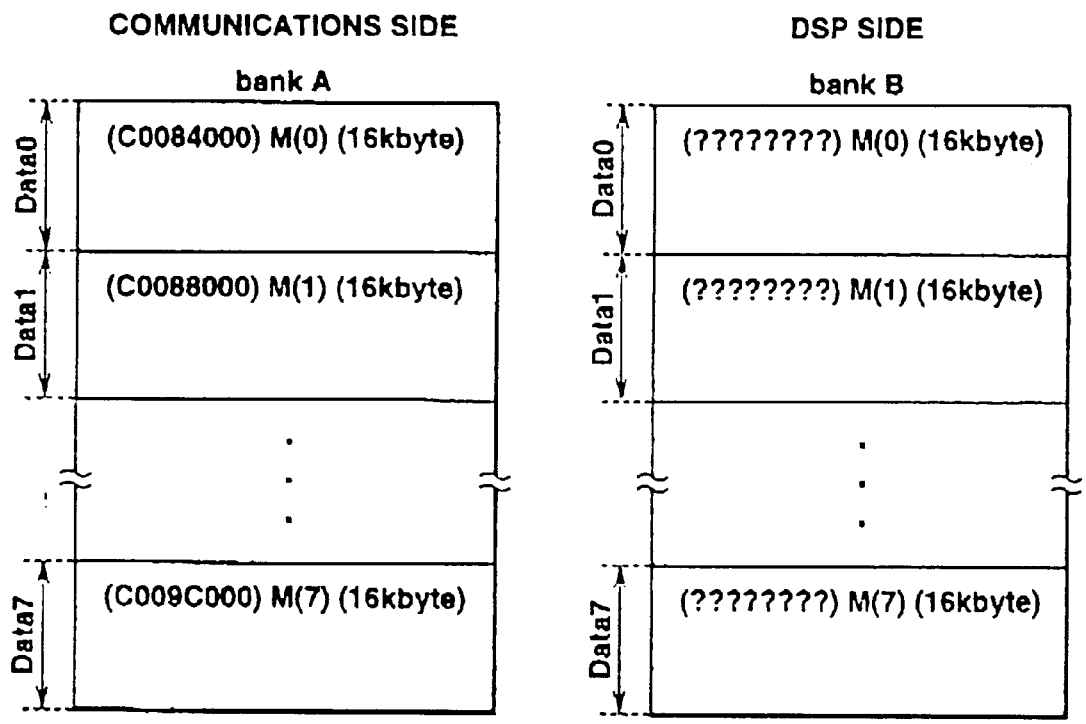
FIG. 16 is a diagram for describing the composition and operation of a communications system.

Transfer of video data involves transmission and reception of video data input by the video camera of the home game device, between the home device and the other game devices. Video data is transferred after transfer of the sound data, for example, but this sequence is essentially determined by the communications software. In this video block 44, one memory connected to a communications controller is divided into two banks: a communications bank and a DSP bank; and it has a switchable bank memory structure, whereby the bank in use is switched alternately at each incidence of the vsync signal. FIG. 16 shows an example of a memory map in a case where video data for 8 devices is allocated to each bank. At each 1 int, bank A switches between the communications side and the DSP side, and bank B also switches between the communications side and the DSP side.

B-1-3 Concrete example of communications system

FIG. 17 shows an example of the actual compositional blocks of a communications system provided in a game device. The communications system 31 in FIG. 17 is formed on the basis of the compositional principles described in FIG. 13, and the video block and sound block are formed as option circuits, these option circuits being formed into an option circuit block. A maximum of 6 option circuits (option 1–option 6) can be installed. A communications chip 41 is connected to each of the option circuits in the option circuit section OP by means of a 16-bit bus H, and it is also connected to a communications memory 43 via a 32-bit bus G. Therefore, the main communications data passes from the communications chip 41, through the bus M, to the communications memory 43. Furthermore, data transmission is conducted between the communications chip 41 and the options in the option circuit section OP by means of the bus H.

(Transmission packet)

All transmission packets are deleted when they have passed around the transmission loop and are received by the transmission source, and they are divided into the following types transmission system control packets RST, HLT; synchronizing packet SYN; and data transmission packets SET, SND, OPN, LOOP. FIG. 18 shows how these packets are used, by packet type.

Furthermore, FIG. 19 shows an example of a data communications packet. Data transmission is conducted by packet transmission in word units (16-bit). The transmission volume is 1–256 words. As described later, when transmitting SND, a transmission source ID address and a byte length and CRC length are appended to the data. Also, when transmitting SET, a transmission source ID address and a byte length and CRC length are appended to the data.

The addresses for storing the data are divided into one address corresponding linearly to each channel as viewed from bus G, and hypothetical addresses divided into pages by means of a status signal. There are six hypothetical addresses. In FIG. 17, the bus corresponding to the single linear corresponding address is bus M, and the bus relating to the addresses divided into pages by the aforementioned status signal is bus H. Controls regarding which channels is allocated to which address can be set by means of a status register.

(Transmission mode)

Figure 20:
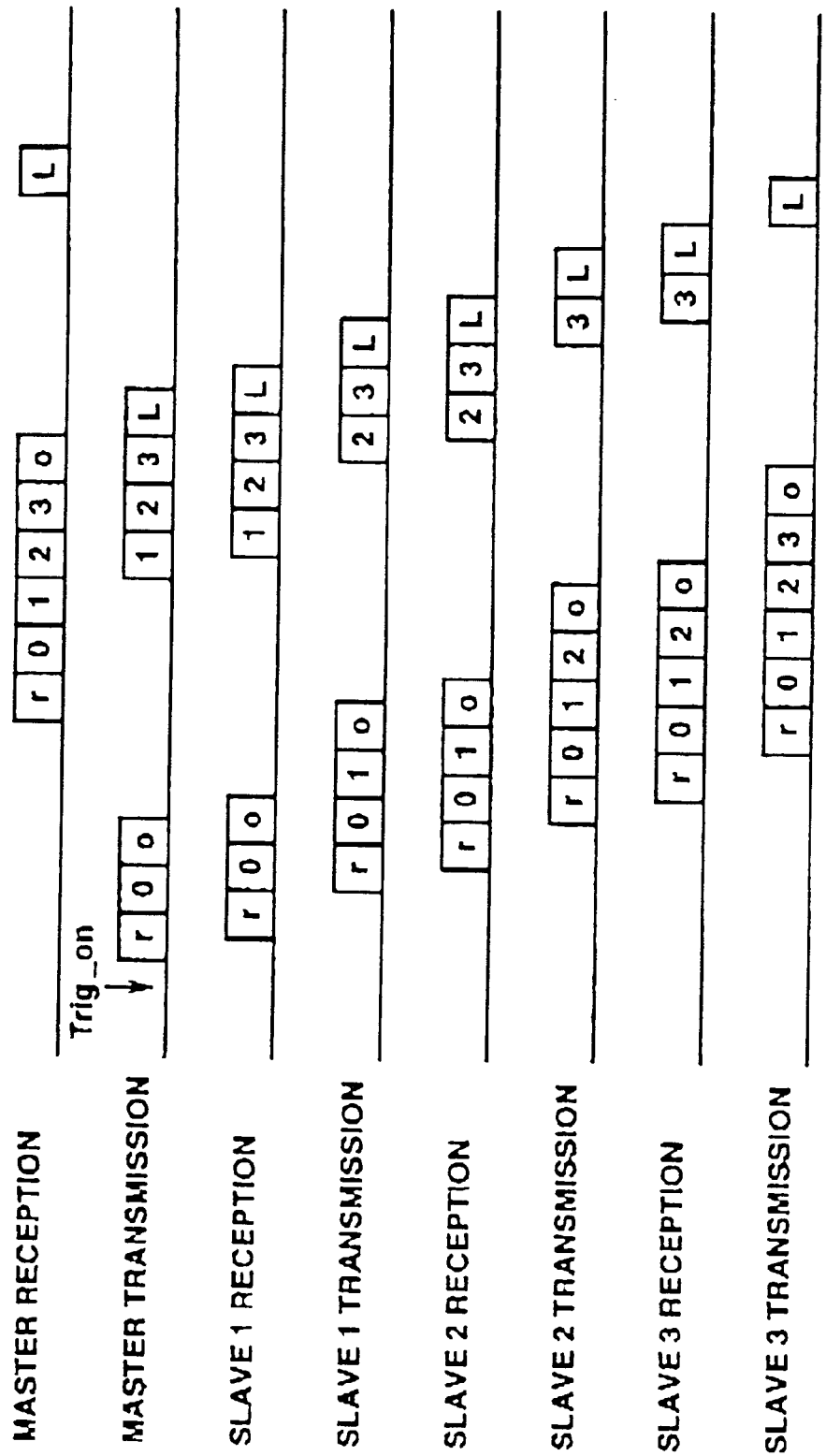
FIG. 20 is a diagram for describing the composition and operation of a communications system.

There are three types of transmission modes: SET transmission of a transmission destination ID setting, ASND (asynchronous SND) transmission of a transmission source ID setting, and SSND (synchronous SND) transmission of a transmission source ID command. FIG. 20 shows an example of an SND packet transmission (ASND transmission, SSND transmission) sequence, along with the time flow of packets passing once through the loop. Actual packets are not continuous, but the diagram gives a conceptual illustration thereof.

In the transmission sequence illustrated, there are four game devices, of which one is a master device, and the other three devices are slaves 1–3. r is an RST packet, o is an OPN packet, and L is a LOOP packet. 0 indicates master transmission, and 1–3 indicates slave transmission.

An OPN (open) packet is appended to the end of transmission data when it is necessary for the game device having the right of transmission to transmit data. In the case of synchronous transmission, when a synchronizing signal Trig is input, data passes round a maximum of 7 loops simultaneously (namely, 7 channels' worth of data), so in order to control this, asynchronous transmission must be used. However, in the case of asynchronous transmission, the slave game devices are not given the right to terminate the loop. Moreover, the LOOP packet is generated by the master game device, and it serves to increment a loop counter in the slave game devices. When the right of transmission returns to the master device (when an OPN packet returns thereto), then provided that the transmission loop is to be continued thereafter, this packet is appended to the end of the data up to that point, and new data and an OPN packet are further appended to the end of this, whereupon the data is transferred to the next game device.

(Buffer memory)

The buffer space is divided into a main block (1 block) and option blocks (maximum 7 blocks).

Figure 21:
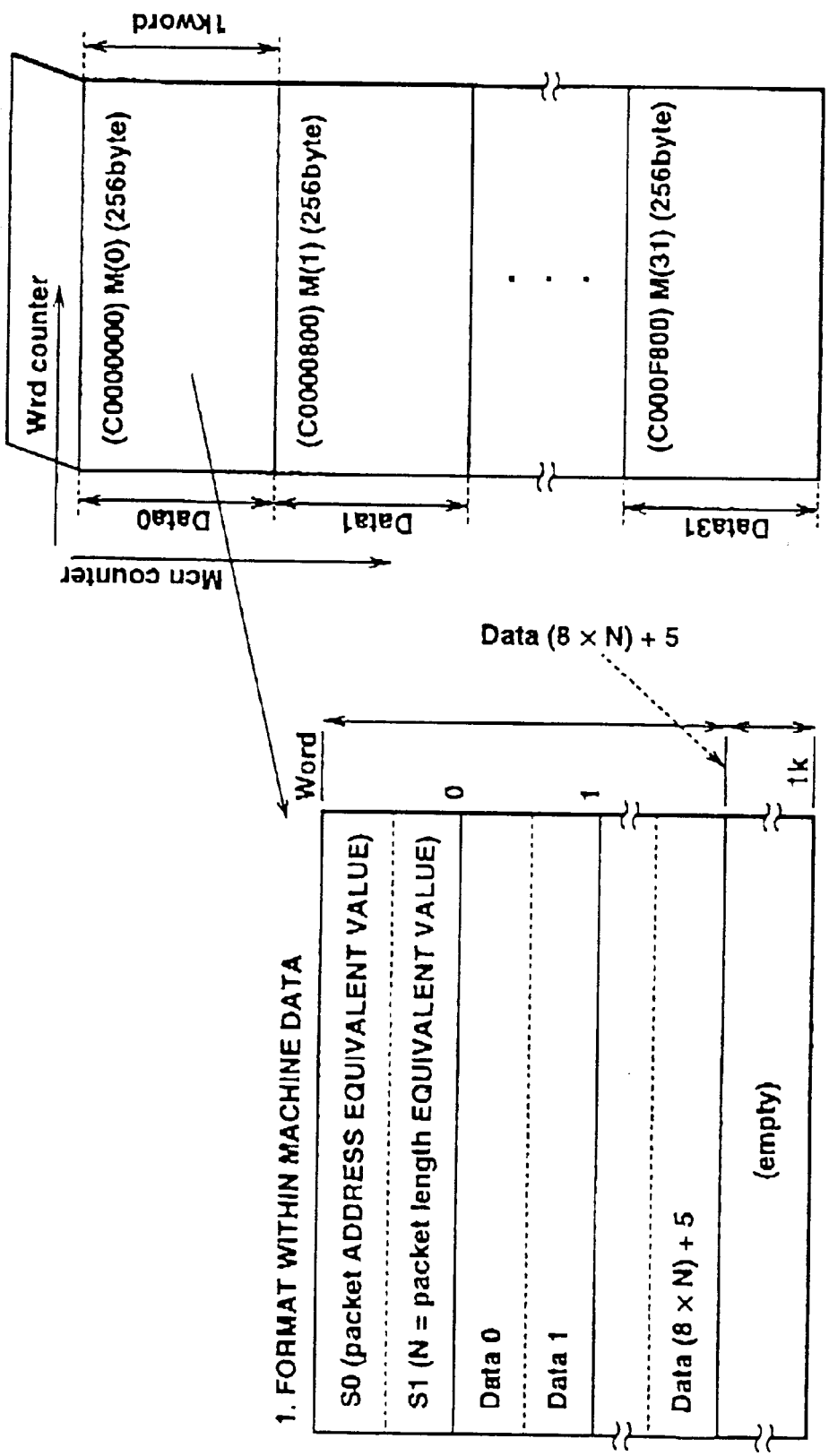
FIG. 21 is a diagram for describing the composition and operation of a communications system.

FIG. 21 shows an example of buffer memory mapping. When conforming to a 32-bit machine, two SRAMs (256K) are used to give 512 Kbits, and when conforming to a 64-bit machine, four SRAMs (256K) are used to give 1 Mbits. The allocation M(x) of the memory blocks is indicated by M (mch counter). The SET command data and transmission data are buffered on an area of the home machine (game device).

B-2 Video block

This video block is now described with regard to the video reception block, monitor output block, and operation, in turn.

B-2-1 Video reception block

Figure 22:
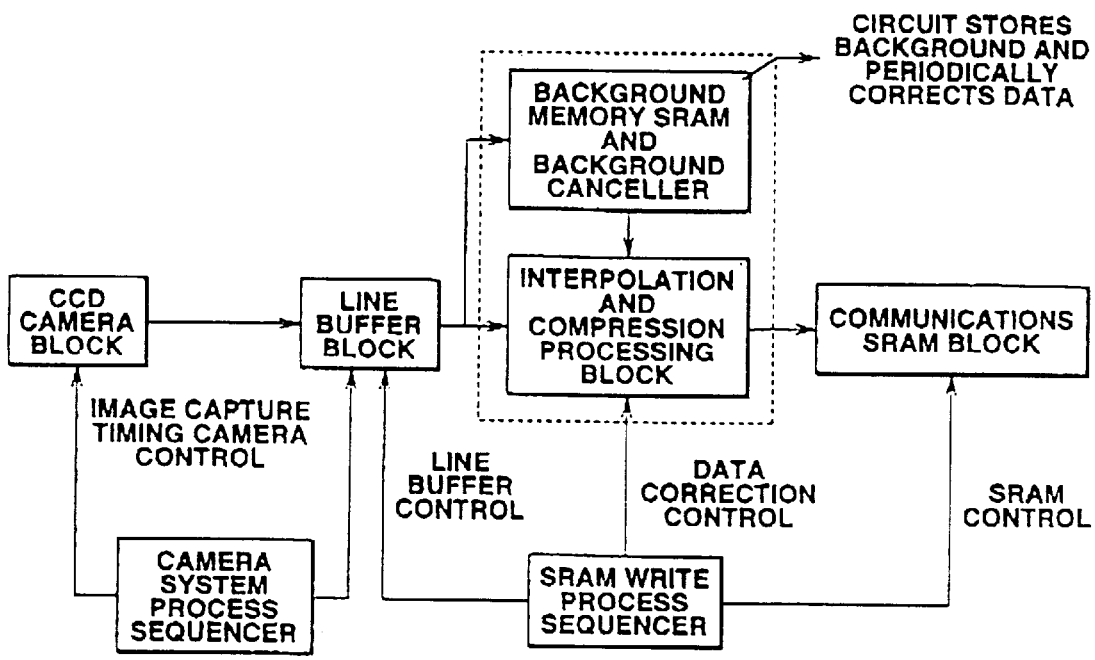
FIG. 22 is a diagram for describing the composition and operation of a video block.

FIG. 22 shows a compositional example of a video reception block. Here, a CCD camera block converts an optical signal obtained by means of a CCD camera to an RGB 8-bit full colour signal. The line buffer block is a memory capable of storing 6 lines of video data. An interpolation and compression processing block enlarges or reduces the video data to a desired size, and conducts colour interpolation processing. A communications SRAM block is used for storing transmission data (in this case, video data).

An image data reception sequencer controls the timing at which the CCD camera takes an image and outputs video data, and it also generates a write timing to the line buffer in synchronism with this. Furthermore, the sequencer comprises a register used for camera control. An image data compression sequencer reads out the video data from the line buffer and generates a timing until writing to the transmission SRAM. These two sequencers form SRAM write sequencers, and arbitration processing is required between these sequencers and a monitor output block sequencer, which is described later.

The background memory SRAM and BG canceller is a circuit which records background data and extracts only the human figure from the camera image by means of differentiation.

(CCD camera block)

In this block, the image obtained from the CCD camera is divided into RGB signals.

Figure 23:
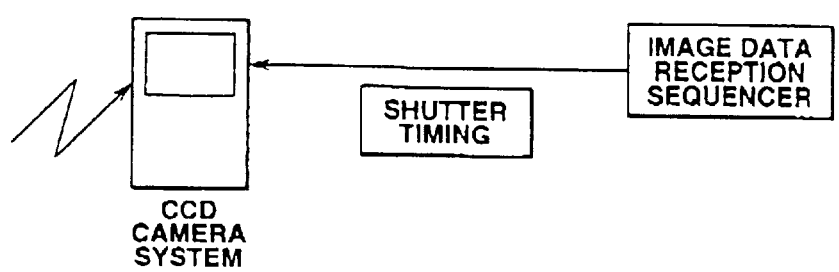
FIG. 23 is a diagram for describing the composition and operation of a video block.
Figure 24:
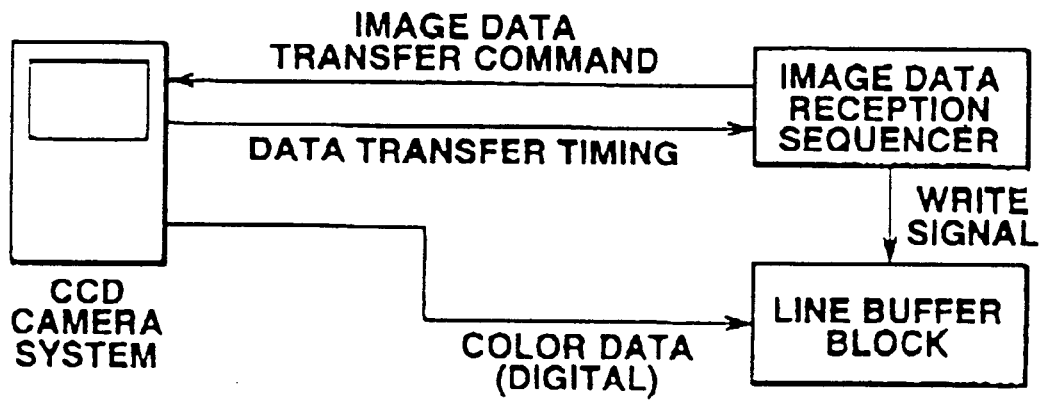
FIG. 24 is a diagram for describing the composition and operation of a video block.

To achieve this, the image data reception sequencer transmits a shutter timing to the CCD camera (see FIG. 23). In response to this, the CCD camera secures image data outside that point in time. The image data reception sequencer then sends a trigger signal for data transfer (transfer command) to the CCD camera (see FIG. 24). This transfer command is valid for one line of data. When the CCD camera receives the transfer request trigger, it outputs colour data (digital) and a timing signal for that output (data transfer timing).

The colour data forms a signal directly on the data bus of the line buffer block, and the timing signal is sent to the image data reception sequencer. Upon receiving the timing signal, this sequencer converts it to a write timing signal, which it supplies to the line buffer block. Consequently, one line of image data from the CCD camera system is stored in the line buffer. The aforementioned processing is repeated line by line for each line in one screen of image data.

The image data reception sequencer comprises a control register which provides CCD camera mirror effects, red correction, white balance, and the like, and it also performs serial writing operations to the CCD camera.

(Colour balance control)

Figure 25:
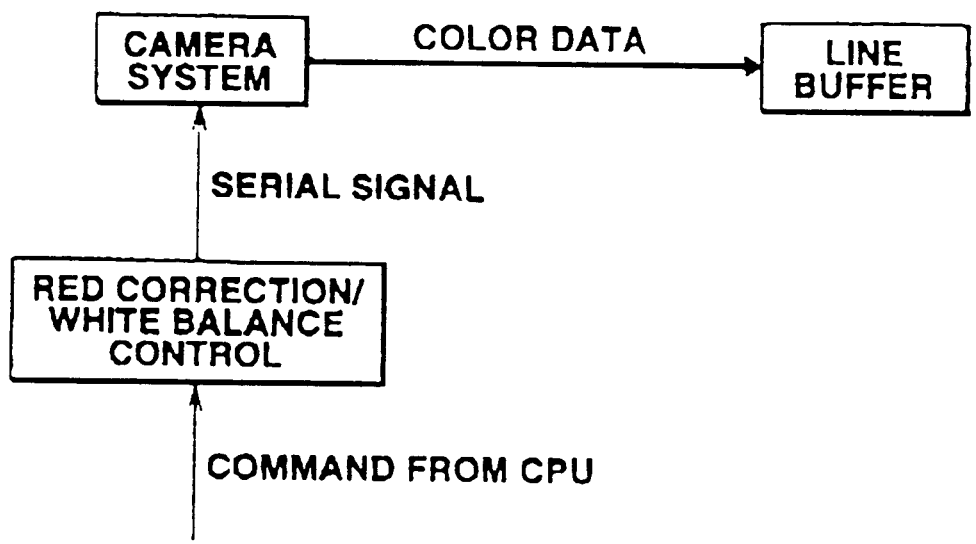
FIG. 25 is a diagram for describing the composition and operation of a video block.

FIG. 25 shows the composition of a block for achieving colour balance control. In cases where brightness control and red correction control, etc. are adjusted as intrinsic functions of the CCD camera system, it is possible to write commands from the CPU to a register and control the CCD camera system by means of serial signals.

(Line buffer block)

Figure 26:
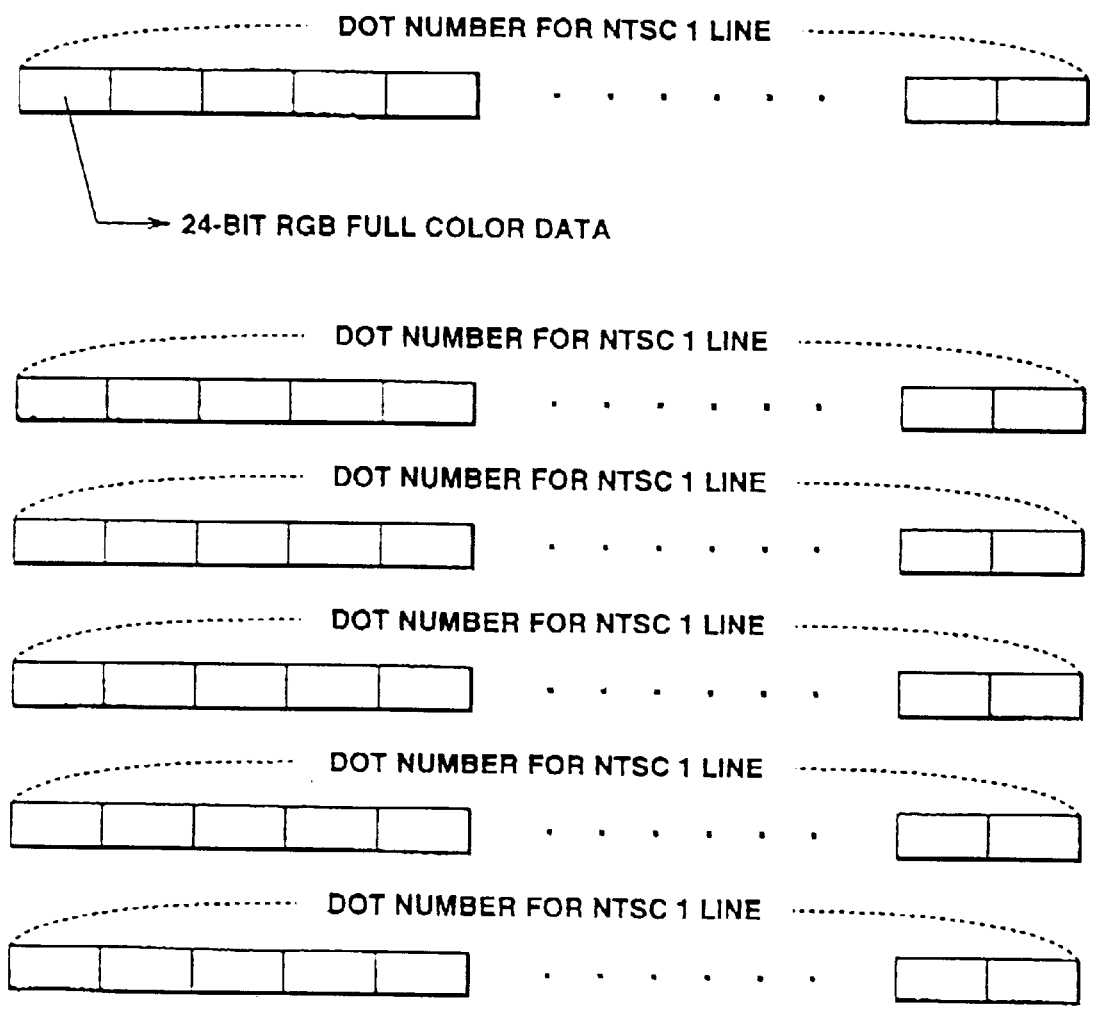
FIG. 26 is a diagram for describing the composition and operation of a video block.

The line buffer block comprises six registers (or memories) capable of storing data for one line of an NTSC screen in full colour (RGB 8 bits), as illustrated in FIG. 26.

Of these six line buffers, only one is available for write access. The remaining five line buffers are used for read access for transferring data to the transmission SRAM. (The details of this are described in the following section relating to the interpolation and compression block.) Therefore, the sequencer controlling the six line buffers operates as shown in FIG. 27 and FIG. 28.

Figure 27:
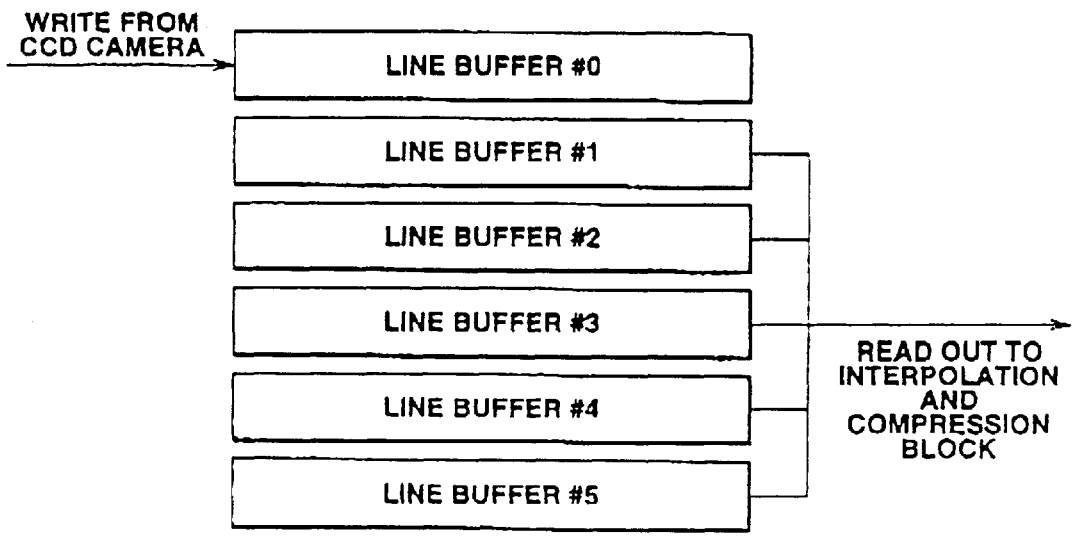
FIG. 27 is a diagram for describing the composition and operation of a video block.
Figure 28:
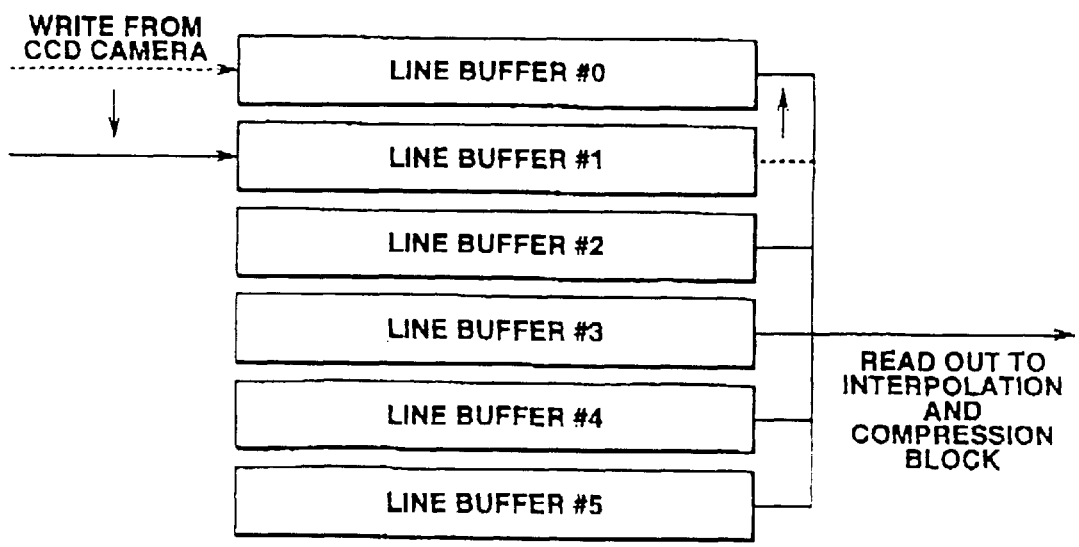
FIG. 28 is a diagram for describing the composition and operation of a video block.

Firstly, processing is implemented for writing one line of data to line balance #0 from one line of data from the CCD camera, whilst data is read out to the interpolation and compression block from the remaining five line buffers #1–#5 (FIG. 27). Of these writing and reading operations, the process which finishes first waits until the other process is completed. Thereupon, when both processes are completed, the sequencer switches the line buffer, as shown in FIG. 28. In this example, the write line buffer for the CCD camera data is then switched from #0 to #1, and the read line buffers are switched from #1–#5 to #0 and #2–#5. In other words, if the order of the age of the data is #0>#1>#2>#3>#4>#5, then the line buffer to which data is to be written next is designated as the buffer containing the oldest data. By repeating the aforementioned processing, the data for one screen of the CCD camera can be read out.

(Interpolation and compression block)

Figure 29:
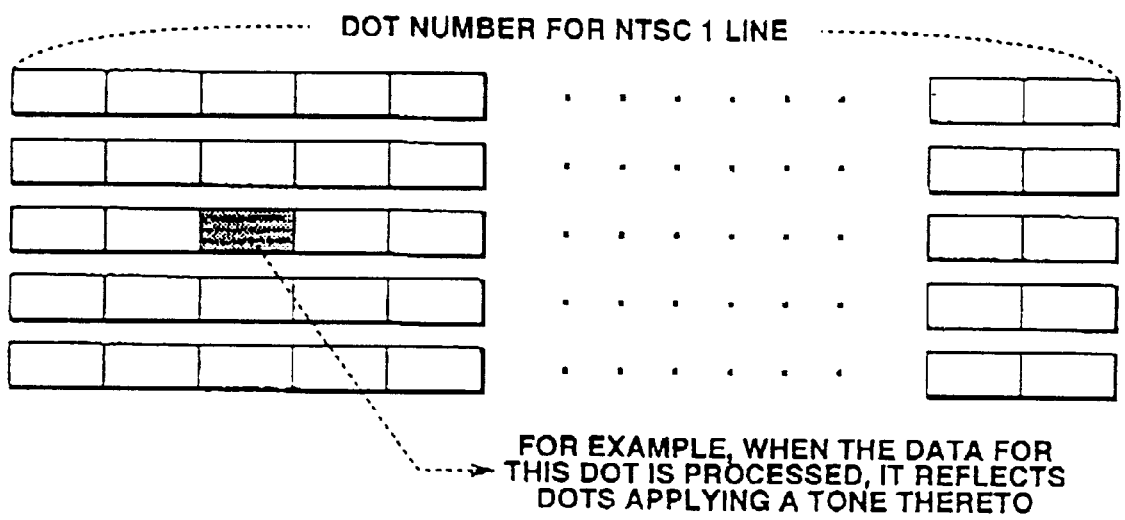
FIG. 29 is a diagram for describing the composition and operation of a video block.

In this block, data compression (reduction) processing for reducing the data volume (dot number) of the transmitted video data is carried out. In order that image quality is not degraded by this compression operation, when reducing the number of dots, processing is implemented to reflect the data of the erased dots in the data of the other dots. An outline of this is illustrated in FIG. 29. By conducting this processing, the volume of video data is reduced, and furthermore, the image can be made to appear more natural since it is compressed.

(Compression theory)

Figure 30:
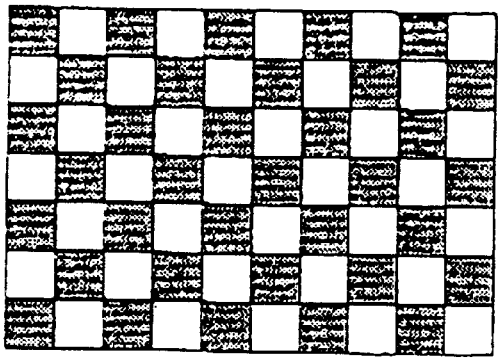
FIG. 30 is a diagram for describing the composition and operation of a video block.

Basically, compression processing is carried out by cancelling pixels (dots) (processing which sets the data as invalid) at intervals of a certain number of pixels. In the example in FIG. 30, the pixel data is thinned out for each pixel and each line. The thinning out pattern is set by the CPU. If a chequered thinning out pattern is used, as shown in FIG. 30, then the video data is compressed by one half. Furthermore, since it is possible that the picture may not be properly formed if a thinning out operation alone is applied, interpolation processing is carried out, whereby the erased pixel data is reflected in the remaining pixels, as described above.

(Compression system block)

Figure 31:
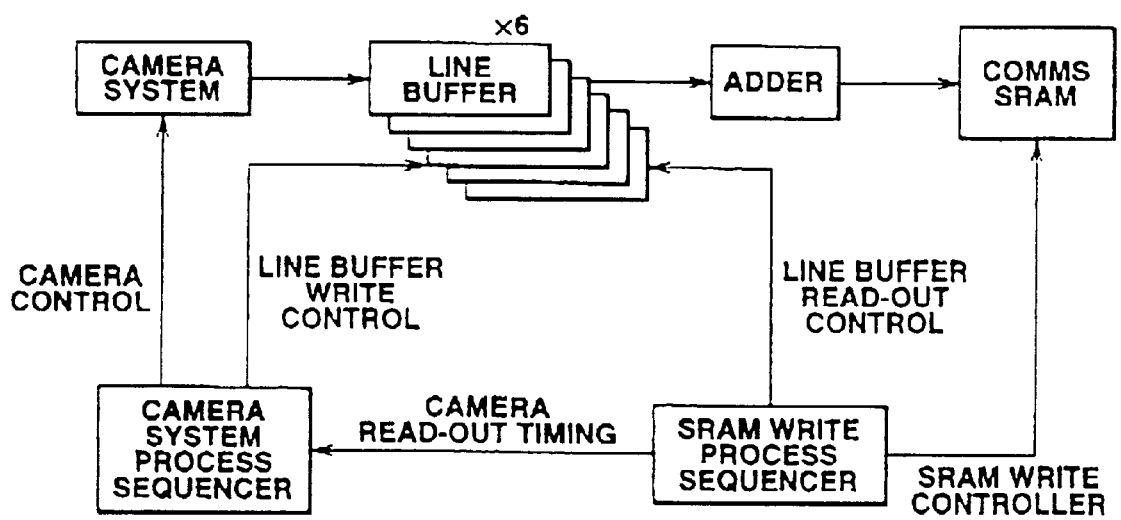
FIG. 31 is a diagram for describing the composition and operation of a video block.

This block is shown in FIG. 31. In particular, the line buffer comprises six registers capable of holding data for six lines as read out from the CCD camera system. The switching of the six registers is performed by means of an SRAM write processing sequencer. An adder is provided on the read-out side of the line buffer. This adder carries out interpolation processing by referring to five of the line buffer registers. The calculation in this interpolation processing is mean processing. Furthermore, the operation start timing for the camera system process sequencer is commanded by the SRAM write process sequencer.

(Communications SRAM block)

This block has the communications function of storing video data to be transmitted, and holding data that has been received. The communications SRAM comprises two banks: one bank receives video data from the CCD camera and outputs it to the monitor, and the other bank is used in transmitting the video data.

(Background memory SRAM and BG canceller)

This canceller is a circuit comprising functions for recording the background in a state where no person is present, comparing this recorded background with a captured camera image, and extracting the image other than the background taken by the camera. This is implemented by the following procedure.

a. At device start-up, an image from the CCD camera is taken at slow shutter.
b. Several slow shutter images are taken for verification purposes.
c. These slow shutter images are averaged to produce basic background data.
d. Subsequent camera images are compared with the basic background data and the background is cancelled.
e. Thereafter, the background is captured periodically using a slow shutter, and this data is averaged to produce basic background data, which is used to update the previous basic background data.

The background cancelling operation is conducted by comparing the camera image currently taken with the basic background data backed up in the SRAM, but in doing this, it is not possible to cancel the background simply by differentiation based on colour difference alone. Therefore, in the present mode of implementation, this point has been improved in particular, and a method whereby vectors are taken for the background colour data is used. Specifically, the RGB components are expressed as ratios, and data is cancelled if it belongs to the same colour system.

(Background processing block)

Figure 32:
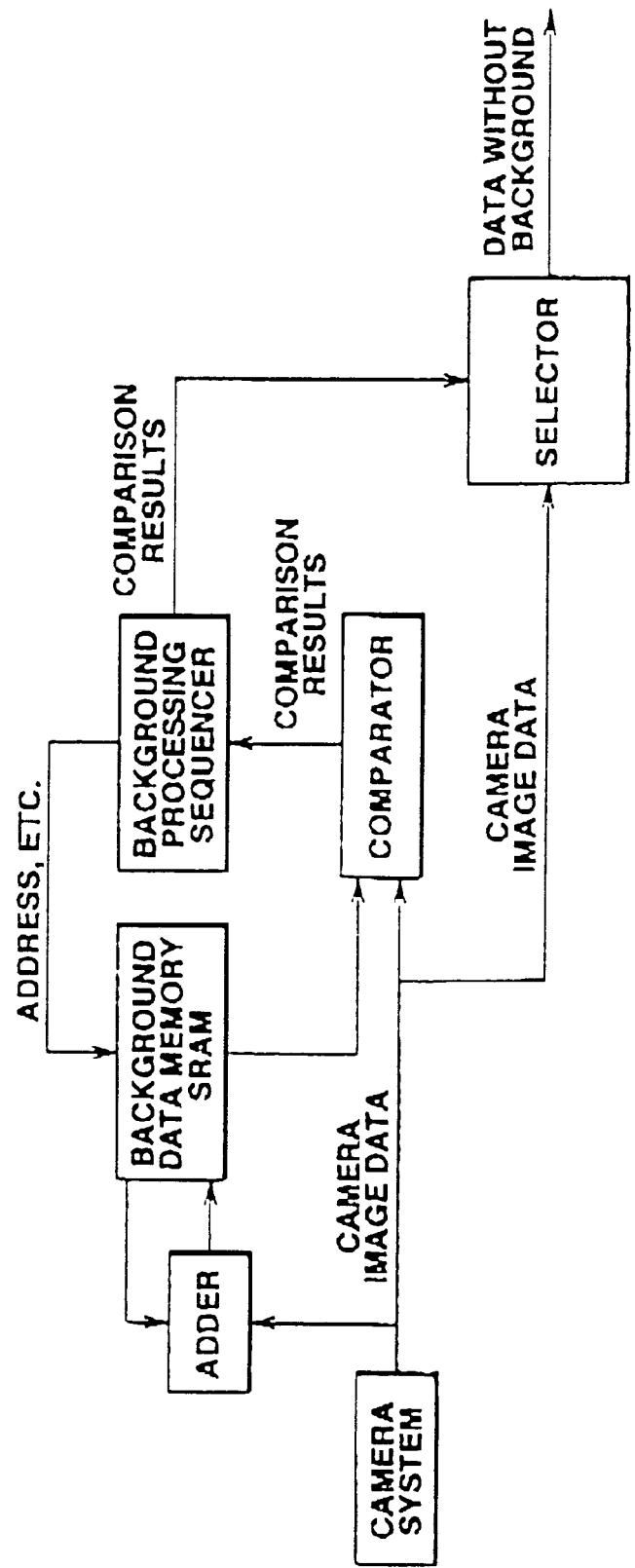
FIG. 32 is a diagram for describing the composition and operation of a video block.

FIG. 32 shows a block composition for performing the aforementioned background cancelling operation. In this diagram, the camera system outputs the video data obtained from the CCD camera, one pixel at a time. An adder receives this data output and takes an average of this video data and the data in the background data memory SRAM. The background data memory SRAM is composed such that it stores background data obtained using a slow shutter. A background processing sequencer controls the SRAM (adder) when obtaining the background data, and furthermore, it cancels the background or the basis of the results from a comparator, which is described below. This comparator compares (by subtraction) the camera image data and the video data stored in the SRAM, and outputs the corresponding results to the background processing sequencer. A selector selects either the camera image or transparent data (comparison result), and outputs data of a human image wherein the background has been cancelled.

(Initialization of background data (when power is turned on))

Figure 33:
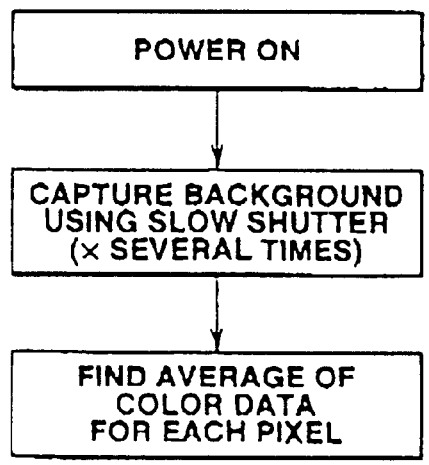
FIG. 33 is a diagram for describing the composition and operation of a video block.

The object of this processing is to cause the CCD camera to operate when the power supply of the game device is turned on, in order to obtain background data which will form the basis of subsequent operations. The essential sequence involved in this is shown in FIG. 33. The CCD camera is fixed such that it cannot move. In the processing illustrated in this diagram, the background is captured several times (e.g., eight times) at prescribed time intervals using a slow shutter (e.g., about ¼ of a second) and the colour data of each pixel is averaged. The slow shutter operation utilizes the effect that moving objects are deleted (obscured) when a long exposure time is used. Since the data obtained thereby can be expected to be very bright, a brightness adjustment process is carried out. By sampling this data several times to obtain an average, it is possible to extract data which approximates the background very closely.

(Cancelling background data)

Figure 34:
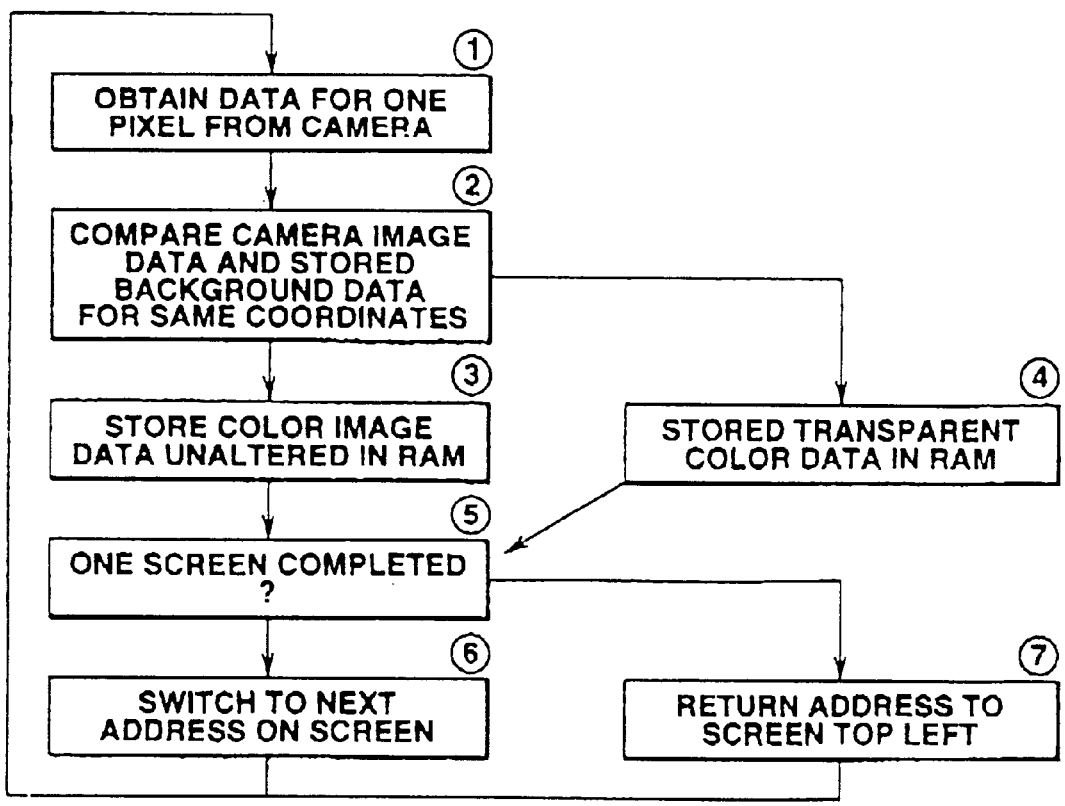
FIG. 34 is a diagram for describing the composition and operation of a video block.

Using the background data obtained in the manner described above, an operation for cancelling the region outside the player (in other words, the background) from the image obtained by the CCD camera in the game is implemented as shown in FIG. 34.

Figure 35:
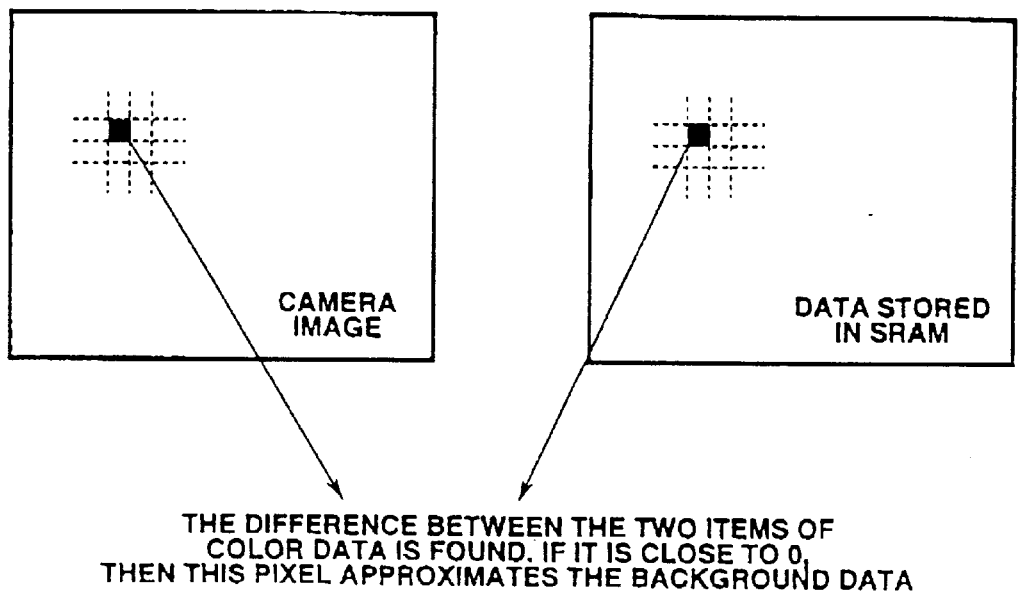
FIG. 35 is a diagram for describing the composition and operation of a video block.

Specifically, at step (1), full colour data (24-bit; RGB 8-bit each) is captured for 1 pixel corresponding to the address of the screen currently being processed. Thereupon, at step (2), the colour data of the corresponding co-ordinates is extracted from stored background data and compared with the colour data captured in step (1) (see FIG. 35). At step (3), the camera image data is stored directly in a RAM. If it is judged in the comparison processing in step (2) that this data differs from background data, then the selector is switched such that the values of the camera image data are output in an unaltered state (see FIG. 32). At step (4), transparent colour data is stored in the RAM. In other words, if it is recognized in the comparison processing in step (2) that the data approximates very closely to background data, then colour data representing a transparent state is written to the SRAM instead of the camera image data.

Next, at step (5), it is determined whether or not the aforementioned processing has been completed for all the pixels in one screen. In other words, it is judged whether the processing has reached the end points in both the horizontal direction H and the vertical direction V. Thereupon, at step (6), the process switches to the next address. Specifically, if at step (5) there still remain pixels in the screen which have not yet been processed, then the address is incremented by 1 in the horizontal direction. When the end point has been passed in the horizontal direction H, the H address is cleared to 0, and the V address is incremented by 201. At step (7), the address returns to the top left position. Namely, if the comparison at step (5) reveals that the address is at the end points in both the horizontal direction H and the vertical direction V (processing completed for all pixels in one screen), then the H address and the V address are both cleared to 0, and the routine returns to the initial state.

B-2-2 Monitor output block

Figure 36:
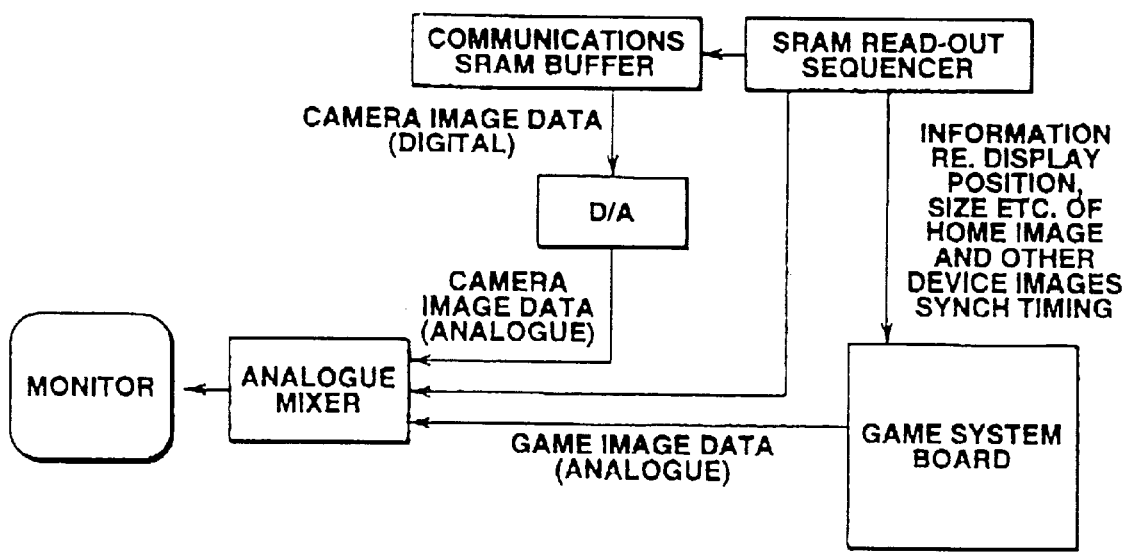
FIG. 36 is a diagram for describing the composition and operation of a video block.

FIG. 36 shows a device configuration for outputting images to a monitor, as provided in each game device.

In this diagram, the monitor displays a synthesized image of a game screen and a camera image. In order to achieve this, an analogue mixer is provided. The analogue mixer synthesizes image data for the game screen and camera image data by s electing one or other of these data sources at each pixel. The selection signal for the mixer is supplied by an SRAM read-out sequencer. Furthermore, the game screen signal is output to the analogue mixer by a game system board (host system; see FIG. 13). This game system board also outputs data relating to the camera (e.g., the camera image data used, the size and display position of the image, synchronizing signal clock, and the like) to the SRAM read-out sequencer.

The SRAM read-out sequencer controls the address read out from the communications SRAM buffer and the timing of this operation, on the basis of the aforementioned camera-related data, and it also controls the operation of the analogue mixer. Camera image data from the home device or other devices (game devices) is held in the communications SRAM buffer.

(Composition of SRAM read-out sequencer)

Figure 37:
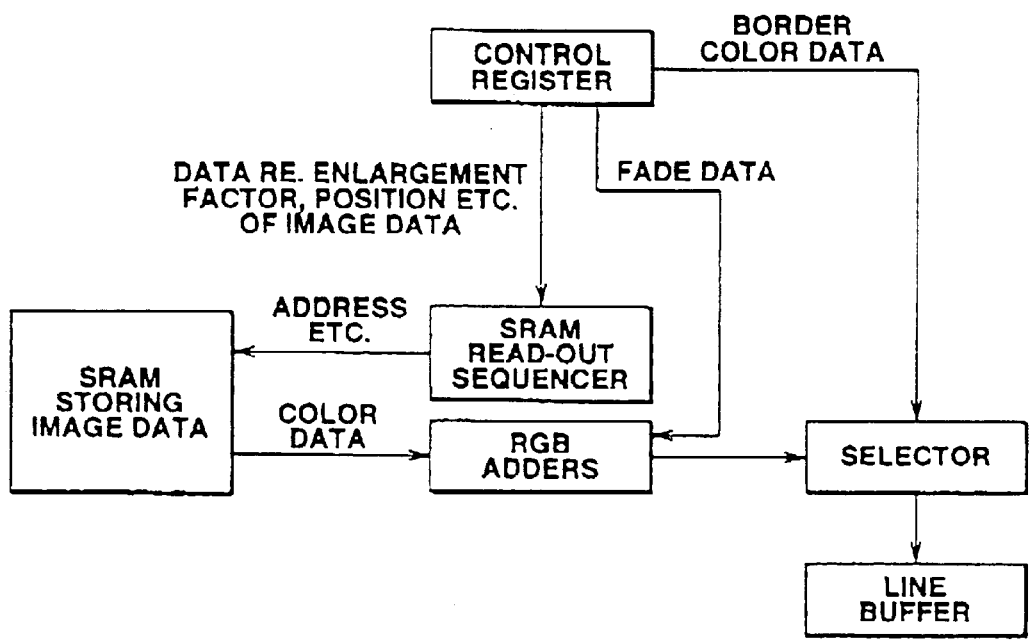
FIG. 37 is a diagram for describing the composition and operation of a video block.

FIG. 37 shows a compositional example of this sequencer.

The SRAM stores CCD camera image data captured by the home device, and image data from other devices obtained by means of communications functions. The address of the data from the home device and the address into which data from other devices is written are fixed. Furthermore, a control register is also provided. The CPU sets whether the image data from the home device or another device is to be displayed, as well as determining the position of the image data (origin at top left) and the enlargement or reduction factor (origin at top left), and therefore the control register is used to store this information.

The SRAM read-out sequencer has functions for generating an SRAM address by referring to the contents of the control register and the position of the pixel currently being processed, and controlling the SRAM control signal.

The data for one line of a screen (maximum 1024 pixels) is stored in the line buffer. Two sets of line buffers are provided, and they are switched as and when necessary. The RGB adder is an addition processing device for applying a fade to the camera image. The selector selects either bordering colour data, image data, or transparent data.

(Operation of SRAM read-out sequencer)

Figure 38:
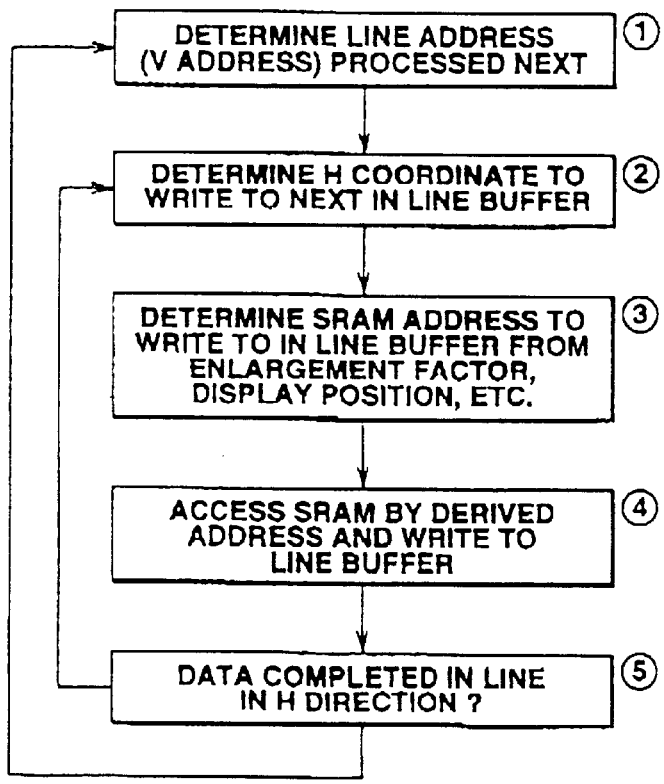
FIG. 38 is a diagram for describing the composition and operation of a video block.

FIG. 38 shows a sequence example relating to the operation of the SRAM read-out sequencer. Steps (1) and (2) determine the line address (V address) to be written subsequently in the line buffer, and the horizontal direction H address. Thereupon, at step (3), it is determined whether or not camera data needs to be called up, on the basis of the co-ordinates of the camera image data and the enlargement factor. If the data is to be called up, the SRAM address is determined. The routine then moves to step (4), and data is extracted from the designated SRAM address and written to a specified address of the line buffer. Furthermore, at step (5), it is judged whether or not the data processing from one line has been completed, and if processing has been completed, the bank in the line buffer is switched, and the line address is then cleared.

(Line buffer)

The line buffer has a two-bank structure, in order that processing is conducted smoothly. As shown in FIG. 39, data read out from the SRAM is written to one of the line buffers, whilst data is read out periodically from the other line buffer in order to be displayed on the monitor.

(RGB adders)

Figure 40:
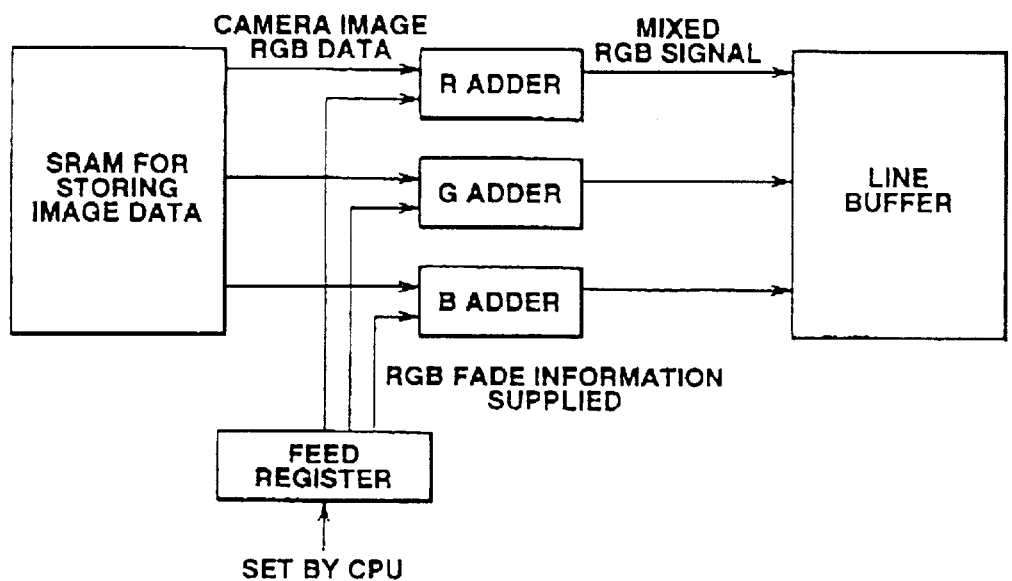
FIG. 40 is a diagram for describing the composition and operation of a video block.

As shown in FIG. 40, an R adder, G adder and B adder corresponding to the three basic colours are provided between the SRAM storing the video data and the line buffers. The R adder, G adder and B adder are supplied with respective R, G and B fade information from a fade register. Thereby, the data in the SRAM is read out, the respective RGB components are added and subtracted, and fade effects are applied thereto.

(Border processing circuit block)

This block has the function of calculating a border effect by inserting a particular colour at the edges of the camera images, thereby making the player clearly aware that a camera image is contained in the game screen. The circuit composition of this block is as shown in FIG. 41.

Figure 41:
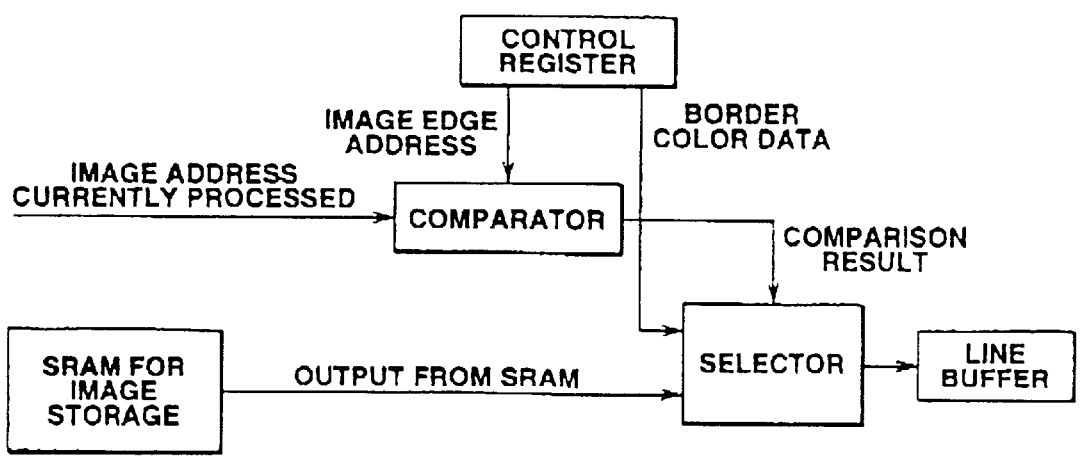
FIG. 41 is a diagram for describing the composition and operation of a video block.

The image saving SRAM shown in FIG. 41 stores data captured by the CCD camera or captured image data from other devices received by means of the communications functions. This SRAM is controlled by an SRAM read-out sequencer, which is omitted from this diagram. The control register is a register readable and writeable by the CPU, which relates to the position in which the camera image data is displayed, the enlargement factor, and priority, etc. In this register, the vertical and horizontal end co-ordinates (edge addresses) of the camera image data are derived by referring to the aforementioned data, and they are supplied to a comparator. The comparator compares the co-ordinates (address) on the screen currently being processed with the camera image edge addresses obtained from the control register, and sets the corresponding results as a selector signal to the selector. The selector selects either the video data from the SRAM, or the border colour data set in the control register. The selector results signal is sent to the line buffer. The line buffer is formed by registers, and data for one line of the screen is held temporarily in each of these registers in order to output data to the monitor. This line buffer also has a two-buffer composition.

(Border processing operation)

Figure 42:
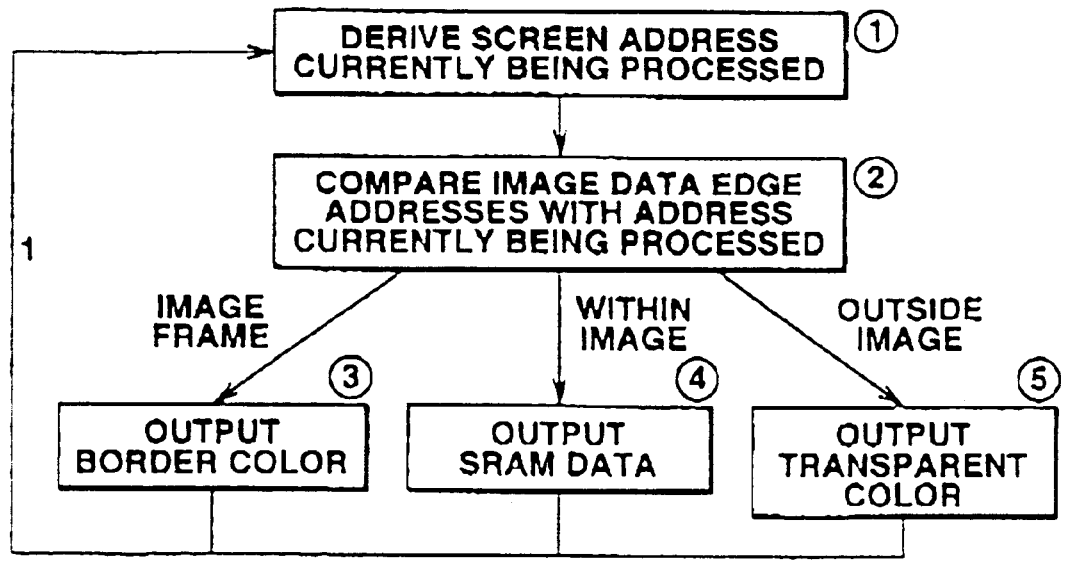
FIG. 42 is a diagram for describing the composition and operation of a video block.

FIG. 42 is a sequence illustrating one example of a border processing operation. In step (1) in this diagram, the planar co-ordinates (address) of the screen currently being processed are derived. The SRAM address, etc. is then determined on the basis of these co-ordinates. Next, at step (2), the edge addresses of the camera image data (border addresses set in control register) are compared with the screen address currently being processed. If it is consequently judged that the address currently being processed lies on the border line of the camera image data, then at step (3), the border colour data set in the control register is extracted. If the comparison in step (2) reveals that the address currently being processed lies in the range of the camera image data, at step (4), the data from the SRAM, which stores the camera image data, is taken as the valid data. Moreover, if it is judged in the comparison at step (2) that the address currently being processed lies outside the range of the camera image data, then at step (5), transparent colour data is output.

(Processing in cases where the border is to be designed)

Figure 43:
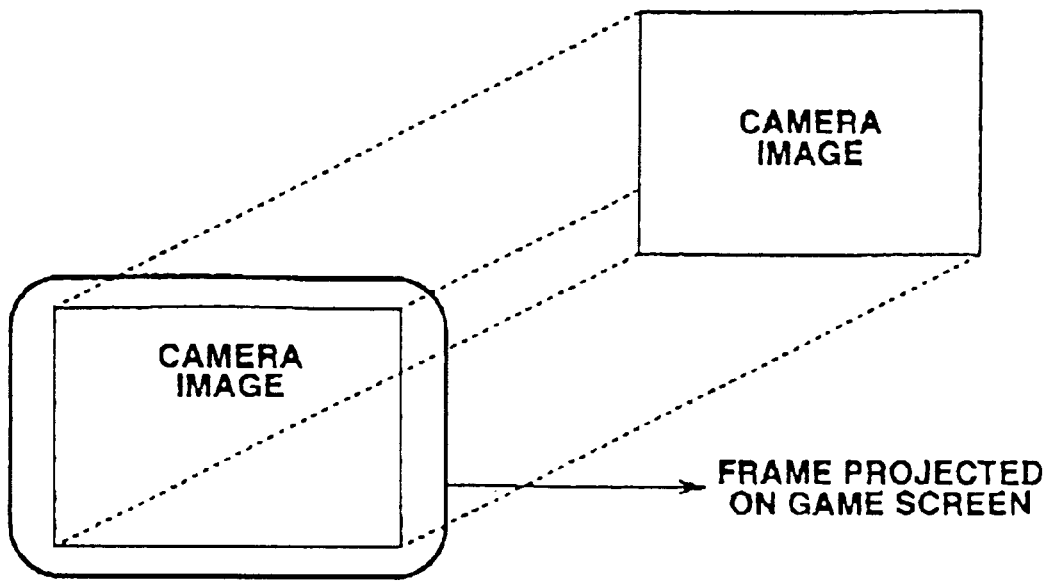
FIG. 43 is a diagram for describing the composition and operation of a video block.

If a design is to be created for the border, then this can be achieved by displaying an image forming a frame on the screen from the game board, in combination with the camera image data (see FIG. 43).

(Raster scrolling of camera image data)

Figure 44:
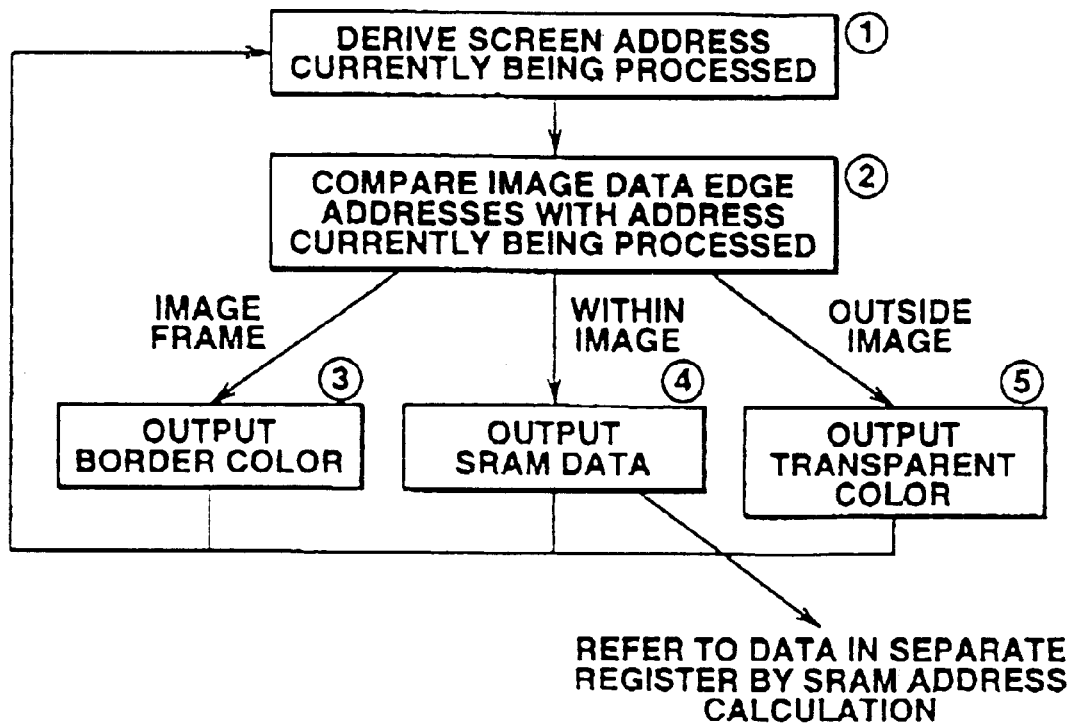
FIG. 44 is a diagram for describing the composition and operation of a video block.
Figure 45:
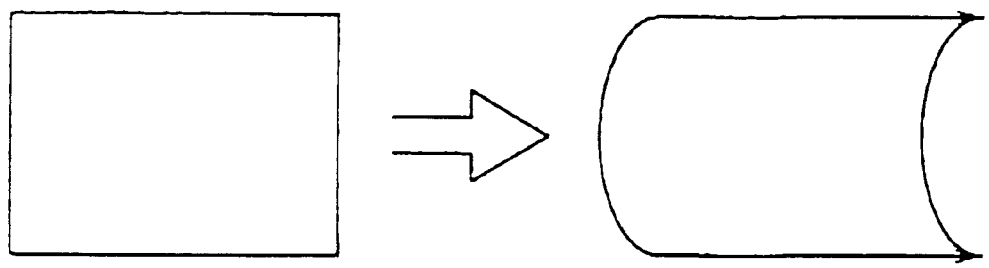
FIG. 45 is a diagram for describing the composition and operation of a video block.

A raster scrolling operation can be achieved by adding a line address offset value, previously stored in a further register, to the camera image position when comparing the camera image edge addresses with the screen address currently being processed, in the aforementioned bordering sequence (see FIG. 44, steps (2) and (4)). By this means, it is possible to modify the shape of the camera image on the monitor screen, as illustrated in the image in FIG. 45, thereby increasing the level of interest created by the game screen.

(Mixer)

Figure 46:
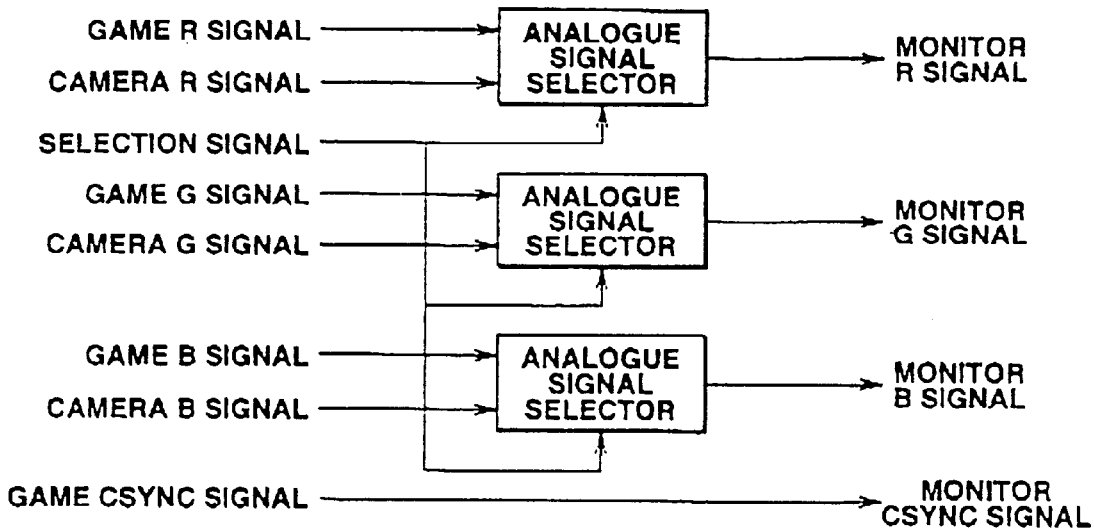
FIG. 46 is a diagram for describing the composition and operation of a video block.

An analogue mixer is provided in the video block 44. As shown in FIG. 46, this analogue mixer comprises analogue signal selectors forming a structure whereby one system is selected from the analogue signal systems of the camera image signal and the game signal, in accordance with a selection signal. As the diagram shows, there are three of these selectors, and the first selector selects either the camera signal R signal or the game R signal and outputs it as a monitor R signal, the second selector selects either the camera signal G signal or the game G signal and outputs it as a monitor G signal, and the third selector selects either the camera signal B signal or the game B signal and outputs it as a monitor B signal. The game CSYNC signal from the host system (game system) is used directly as a monitor CSYNC signal.

(D/A converter+SRAM read-out sequencer)

The D/A converter converts RGB data read out from the SRAM to an analogue signal. Furthermore, the SRAM read-out sequencer comprises: an SRAM access function for displaying on the monitor either the camera image data obtained from the field before last or the camera image data of another device (game device) obtained by communication of the last field; a mediating function for mediating with an SRAM write sequencer used for obtaining the current camera image data; and a register set by the CPU.
(Entire SRAM block (DRAM block))

Figure 47:
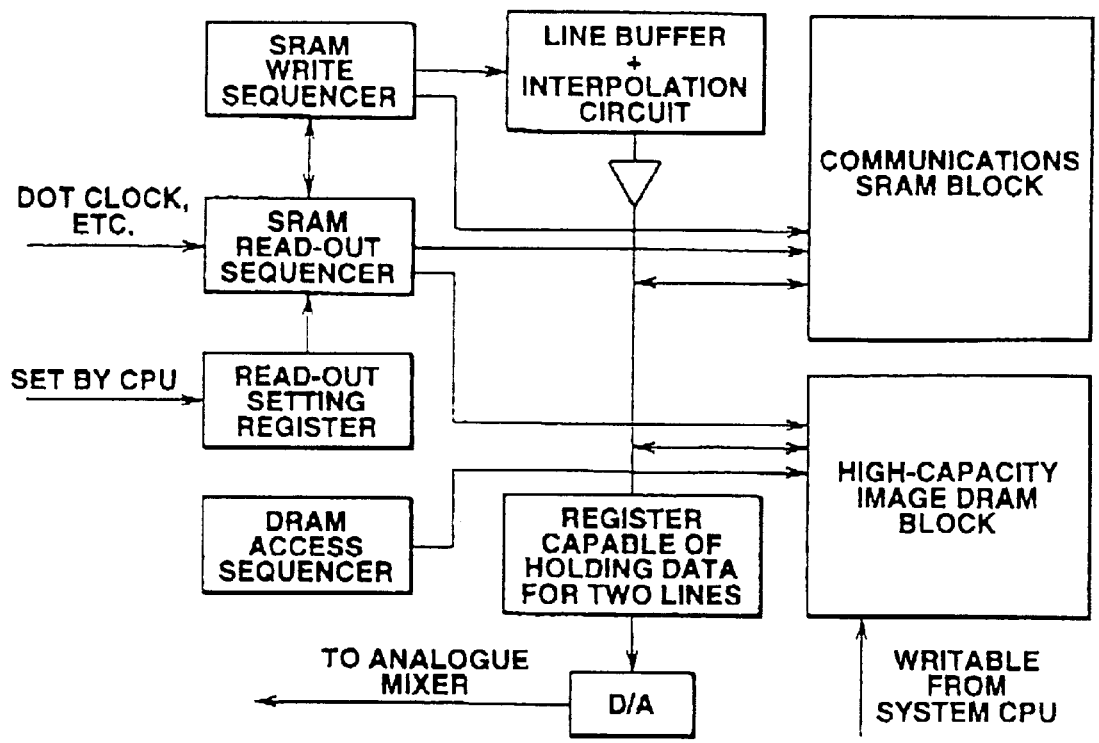
FIG. 47 is a diagram for describing the composition and operation of a video block.

FIG. 47 shows the overall composition relating to an SRAM in the video block 44. Here, the read-out setting register and the SRAM read-out sequencer are described in particular.

a. Read-out setting register

In this register, values are set for the display position of the camera image (co-ordinates of top left point of camera image), the enlargement factor (size of camera image data used), and the priority (order of priority of camera image data (home device and all other devices)) and this information is supplied to the SRAM read-out sequencer. Furthermore, the read-out setting register is used also for restoring compressed data, when necessary.

b. SRAM read-out sequencer

This sequencer has the function of generating a timing for SRAM access by referring to the read-out setting register and the dot clock. The host system detects the position where display is currently to be made from the dot clock. Consequently, if that position corresponds to co-ordinates where camera image data is to be output, then it accesses the SRAM. Specifically, it accesses the SRAM by determining the address in the SRAM to be read out, from the image display position, enlargement factor and priority information. Furthermore, special effects processing (background switching, etc.) is also implemented.

The SRAM read-out sequencer comprises a register wherein colour data for several pixels can be stored, which is capable of being read out in advance. Thereby, it is possible to read out pixel data without delay, even in cases where this overlaps with the processing of the SRAM write sequencer. This mediation processing is essentially implemented by giving priority to read-out access and weighting write access.

(Camera operation and SRAM operation)

Figure 48:
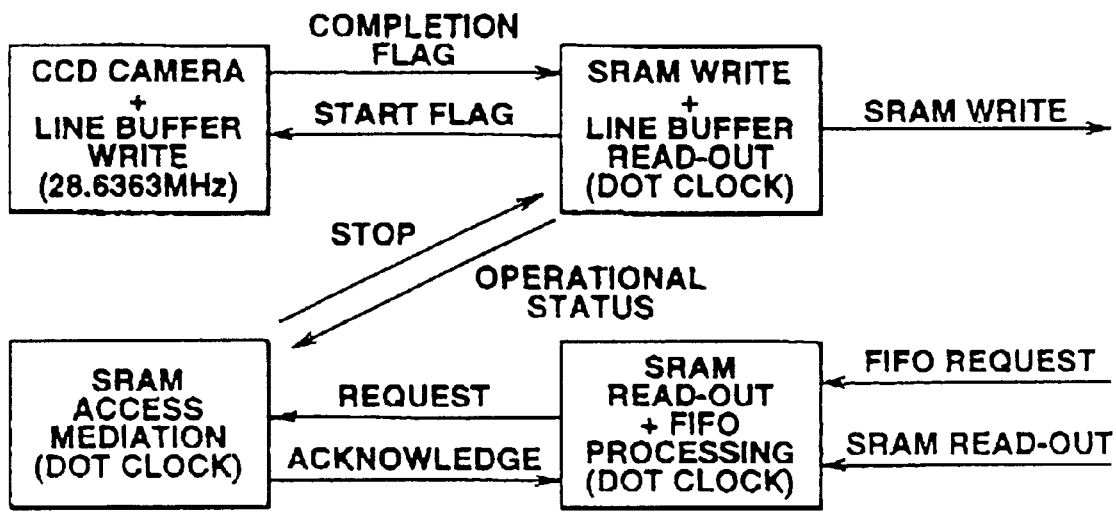
FIG. 48 is a diagram for describing the composition and operation of a video block.

In the present mode of implementation, camera operation, SRAM read-out/write sequences, and the read-out/write mediation algorithm sequences are based on a synchronous design, and therefore can be configured in four different ways. These four sequences are illustrated in FIG. 48. Each sequence is synchronized by means of a handshaking procedure.

a. CCD camera/line buffer write sequence state diagram

Figure 49:
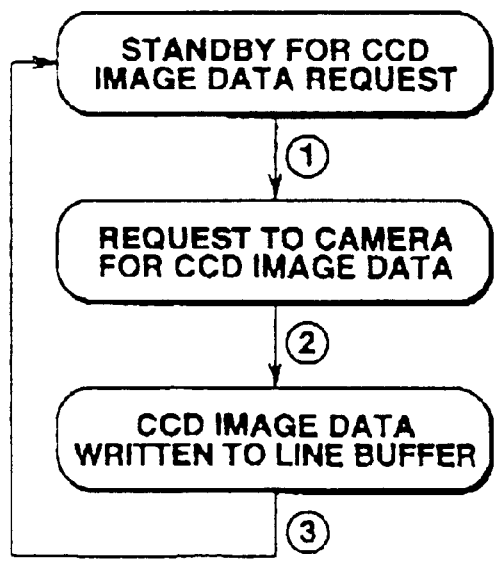
FIG. 49 is a diagram for describing the composition and operation of a video block.

This sequence state diagram is shown in FIG. 49. The routine starts from a standby state awaiting a start command from the SRAM write/line buffer read-out sequencer (step (1)), and passes to a request output to the CCD camera (no waiting) (step (2)), and then to a write operation to the line buffer in accordance with a signal from the CCD camera (step (3)). When the writing step is completed, the system returns to a request standby state (step (1)).

b. SRAM write/line buffer read-out sequence state diagram

Figure 50:
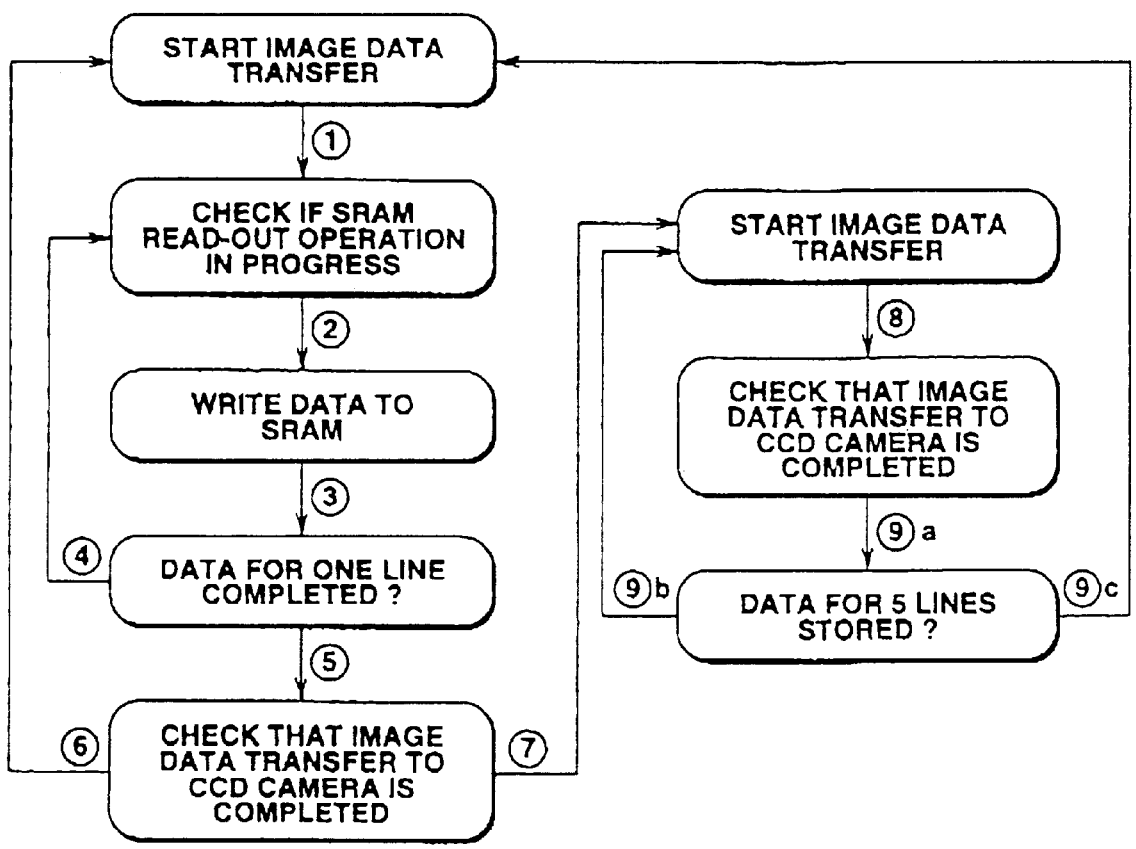
FIG. 50 is a diagram for describing the composition and operation of a video block.

This sequence state diagram is shown in FIG. 50. Initially, a request is output such that an image data transfer request is sent to the CCD camera block (no waiting) (step (1)). The SRAM read-out sequencer confirms the active state, and if the state is active is outputs a wait command (step (2)). Thereupon, data for 1 dot is written to the SRAM (no waiting) (step (3)). Next, if data for one line has not yet been written to the SRAM, the routine returns to the s tart (step (4)) When data for one line has been written to the SRAM, the camera waits until transmission of the one line of data is completed (step (5)). It then checks whether the image data transfer processing for one screen has been completed (step (6)). If it has not been completed, the aforementioned processing is repeated.

When image data transfer processing has been completed for one screen, the routine moves to an initialize state (step (7)). It then submits an image data transfer request to the CCD camera block (no waiting) (step (8)). The camera waits until transmission of the one line of data is completed (step (9)a). If five lines' worth of data has not yet been stored, the aforementioned processing is repeated (step (9)b). If five lines' worth of data has been stored, then an SRAM write state is initiated (step 9(c)).

c. SRAM read-out/FIFO processing sequence state diagram

Figure 51:
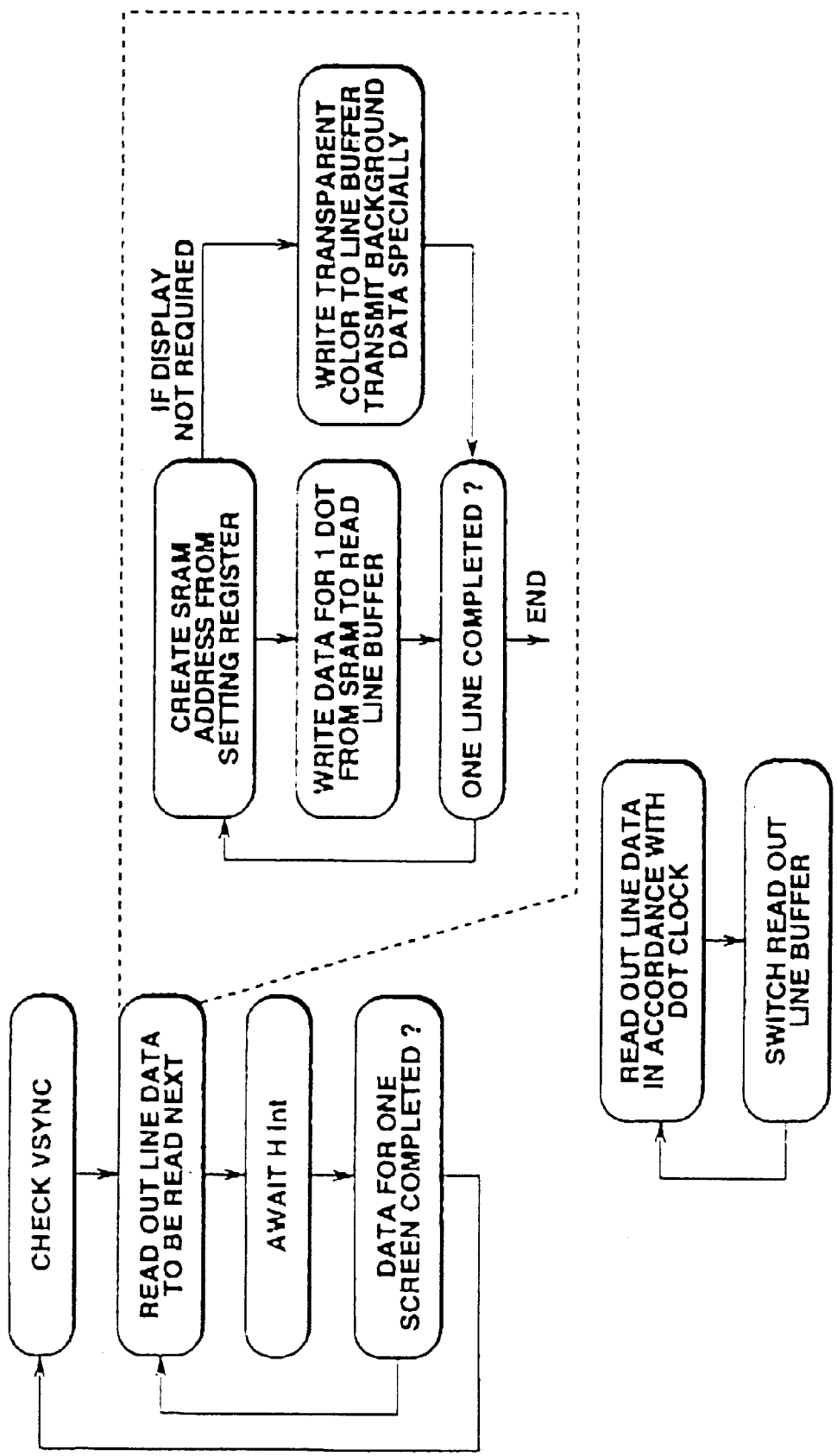
FIG. 51 is a diagram for describing the composition and operation of a video block.

This sequence state diagram is shown in FIG. 51. The sequence in this diagram is based on the assumption that V blank IN is taken as V-SYNC.

Since the video block 44 has the foregoing composition and functions, it is possible to transfer image data captured by the CCD cameras at a plurality of game devices by means of a digital communications network, and to superimpose one or a plurality of camera images at a desired size and a desired position an the screen of any of the other game devices. Furthermore, it is also possible to introduce special effects required for the game or TV-specific noise, etc. into the camera image in a variety of different modes. Therefore, this communications system can be applied suitably to all games using communications. For example, in a communicative car race game, by displaying the facial expression of the player operating the leading car on the monitor screen of the game device of other players, or by displaying the expression of the player operating the car which is adjacent or running closest in the virtual game space on the monitor screen, the sense of rivalry is heightened, and the level of interest and sense of realism created by the game can be raised. Furthermore, when this system is applied to a car racing game involving teams, the image presentation method can be enriched by, for example, displaying the faces of team mates, or the expressions of the winning team, as camera screens.

B-3 Sound block

Next, the block relating to sound will be described.
(Configuration)

Figure 52:
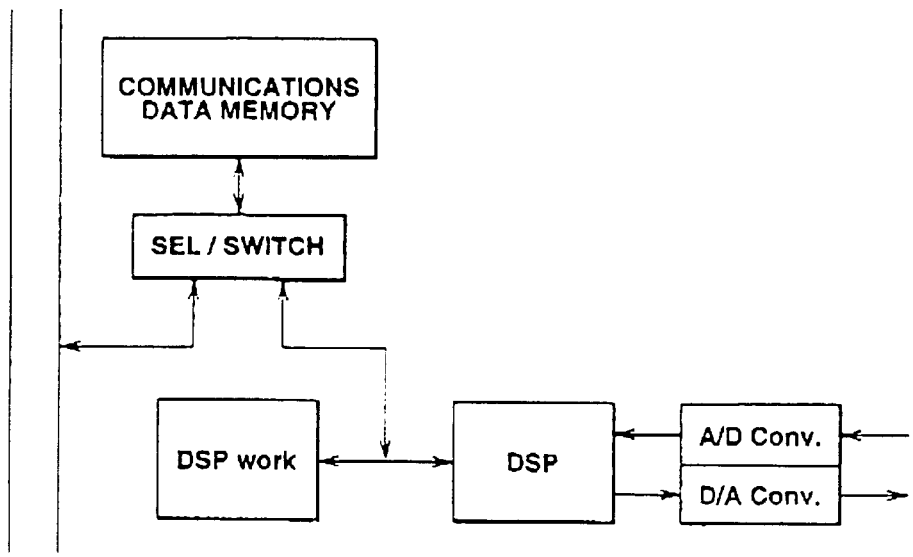
FIG. 52 is a diagram for describing the composition and operation of a sound block.
Figure 53:
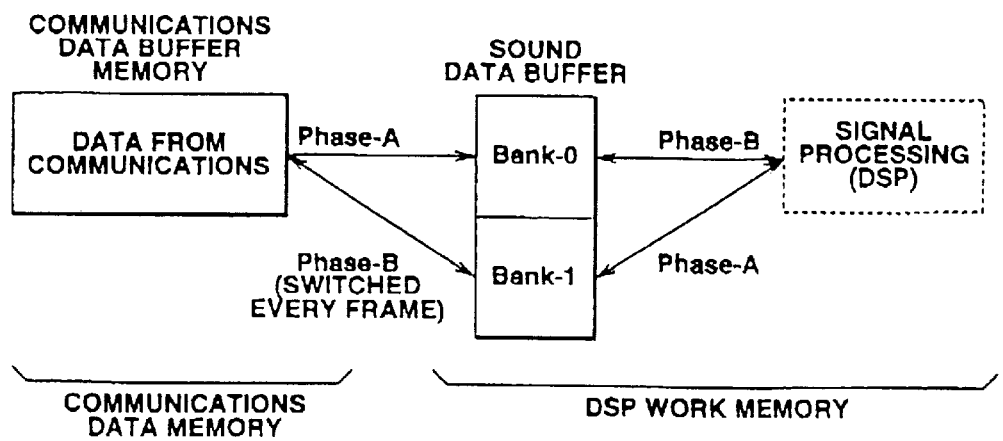
FIG. 53 is a diagram for describing the composition and operation of a sound block.

FIG. 52 shows one example of a sound block. This block comprises a communications data memory, selector switch. DSP, DSP work memory, A/D converter, D/A converter, and the like. The DSP undertakes the functions of downloading data, synchronizing the communications bus with the A/D converter and D/A converter, signal processing, CODEC, and the like. The DSP work memory is a buffer for processing sound data signals and it serves as a work area for the DSP. The communications data memory is a memory for storing communications data. The selector switch is a device for bus switching in the communications data memory. This division of the memory into a data transfer memory and a DSP work memory is a characteristic feature of this sound block.

The basic operation of this block is as described below. When data is transferred from the communications bus, the sound data is transmitted to the communications data memory. At this time, the DSP prohibits access to the communications data memory. When transfer of the communications data is completed, the selector switch is switched, and the communications data memory is connected to the DSP bus. The DSP shifts the transferred sound data to the DSP work area and then conducts signal processing on this sound data.

(Example of buffer memory use)

Sound signal processing must be carried out continuously, even if the system is in the process of transferring sound data from the communications bus. To achieve this, two sound data buffer regions are provided by address processing in the DSP, and the sound data is processed alternately in two phases at each frame interval. The data buffer region is allocated by the address.

If the timing at a particular frame unit is taken as n, then once transmission data transfer has been completed the frame data D(n) is transferred to bank 0 by the DSP. This data transfer is completed before writing the next frame data.

The DSP continuously processes the frame data of frame timing (n-1) stored in bank 1 (this frame data contains sound data transmitted from other devices (game devices) and sound data from the home device). If bank 0 is used in data transfer within a video synchronizing frame, then signal processing is applied to the opposite bank, namely, bank 1.

At each cycle of the sound sampling frequency, the received sound data from a number of machines, stored in bank 1, is accumulated and supplied to the output port of the DSP. As regards the sound transmission data, the data from the input port of the DSP is transferred to bank 1.

When the next video frame synchronizing signal arrives, the DSP processing phase is updated. Bank 1 is used for data transfer and bank 0 is allocated to signal processing.

(Frame synchronization of sound data)

In each game device, the communications data timing is managed on the basis of the video synchronization timing. However, a characteristic difference of sound data is that continuous sound data is output all the time. Continuous sound data is output from data obtained at prescribed frequency intervals, such as the video signal timing (e.g. 60 Hz), and therefore the sound data is buffered by the DSP.

Figure 54:
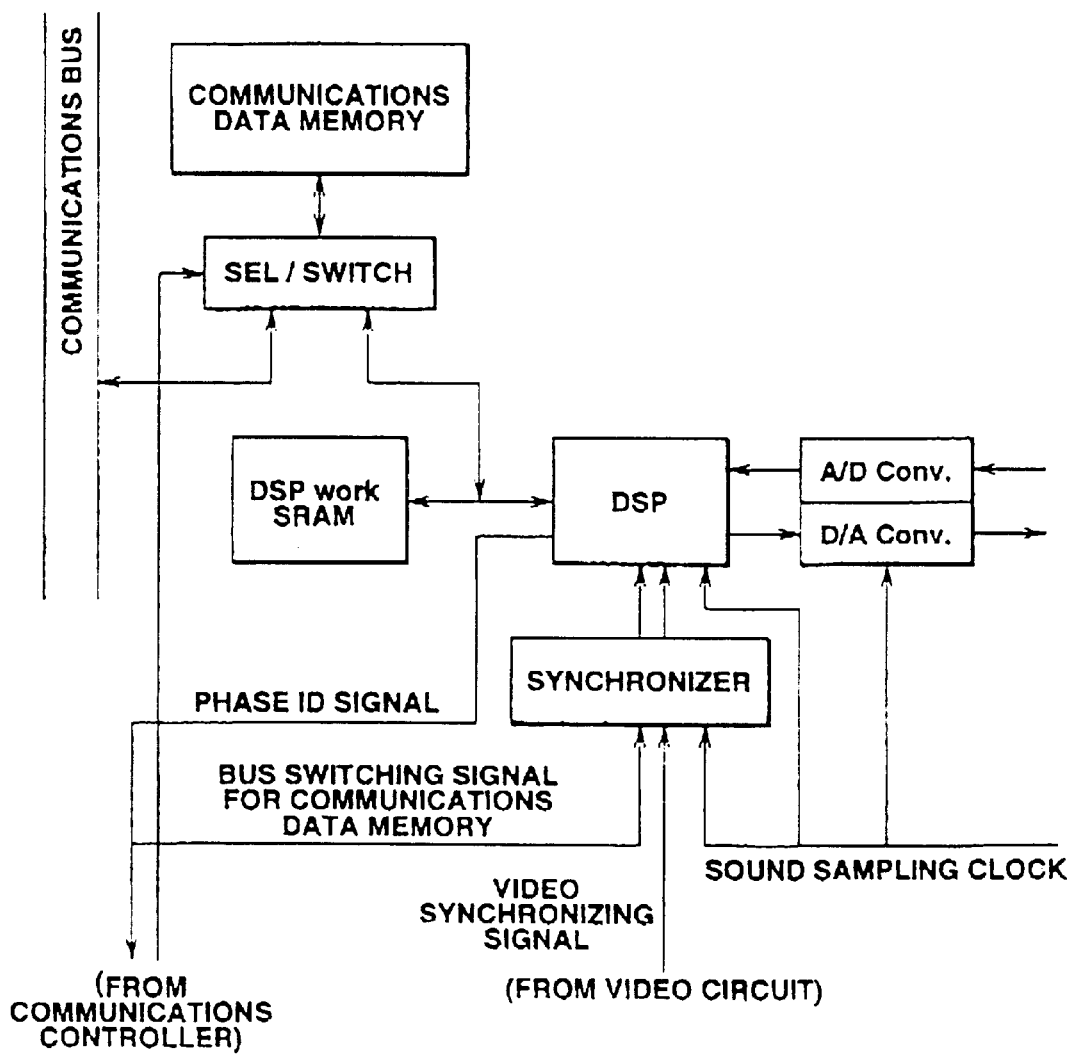
FIG. 54 is a diagram for describing the composition and operation of a sound block.

The video synchronizing signal and communications data memory bus switching signal are input to the synchronizing circuit, as shown in FIG. 54, and they are resampled by the sound sampling clock. The synchronized signals are input to the DSP and used to determine the video timing and the length of the frame data by means of a DSP program.

In FIG. 54, the sound sampling clock is a reference timing for sound signal processing, and the video synchronizing signal indicates the frame start timing. The bus switching signal indicates that frame data from communications can be transferred. In this case, sound transmission data is transferred to the communications data memory, and sound reception data is transferred to the sound data buffer region. The video synchronizing signal is resampled by the sound sampling clock, and the DSP uses the resampled signal to identify the start of a frame.

(Synchronization method (1))

Figure 55:
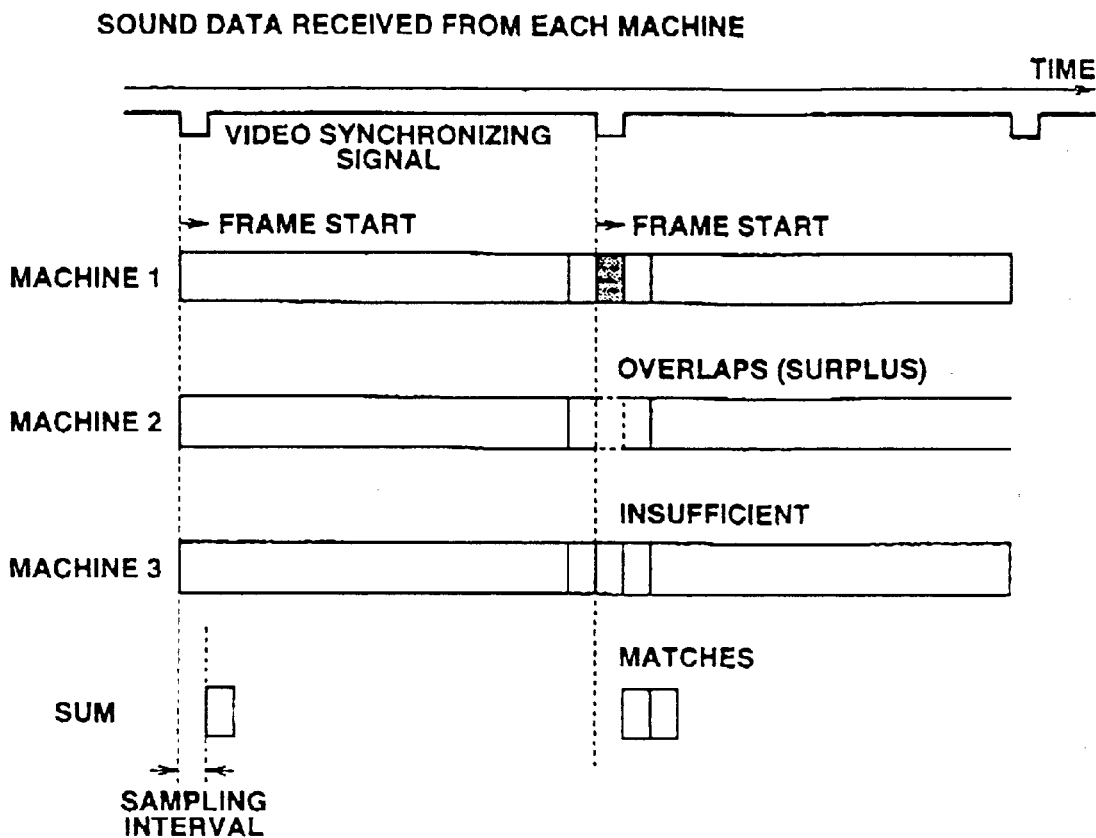
FIG. 55 is a diagram for describing the composition and operation of a sound block.

A case where the sound is asynchronous to the video clock is illustrated schematically in FIG. 55. In this case, in order to match the frame lengths, if the data is not aligned between the machines, then it is interpolated by the receiving side. One application of this is in a system for standardizing times readily when communications is limited to conversation. The amount by which the other machine diverges forms a ±1 sample (since the same frequency is used and the video signal is taken as reference in each machine).

Specifically, for example, if the data from machine 1 is "1" short of the reference sample number at the home machine, the average between the previous sample and the leading data bit of the next frame is calculated. Conversely, if the data from machine 1 is "1" greater than the reference sample number of the home machine, the values of overlapping samples are divided by two and added to samples before and after them.

(Synchronization method (2))

Figure 56:
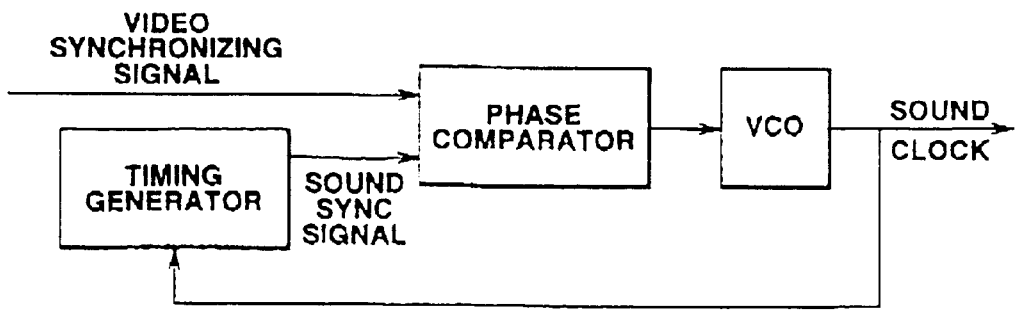
FIG. 56 is a diagram for describing the composition and operation of a sound block.

A case where the sound is synchronous with the video clock is illustrated schematically in FIG. 56. In this method, a sound sample clock is generated from the video clock, and used to align the timing of the whole system.

In order to achieve this, as shown in the diagram, the system comprises a phase comparator for comparing the phase of the video synchronizing signal with the sound synchronizing signal from the timing generator, and a VCO into which the phase comparison results signal from the phase comparator is input. The output signal from the VCO forms a sound clock, and is also fed back to the timing generator. The video synchronizing signals in each machine are completely in sequence with each other. Therefore, by creating a sound reference clock for the whole circuit on the basis of this video synchronizing signal, as described above, the video and sound are synchronized completely. In this system, there is no need for interpolation calculations, in contrast to the asynchronous system described previously, and therefore the portion of the circuit for interpolating can be omitted.

(Synthesis of sound effects and noise)

Sound effects can be processed by software by means of the DSP, or they may be processed by hardware circuitry.

Figure 57:
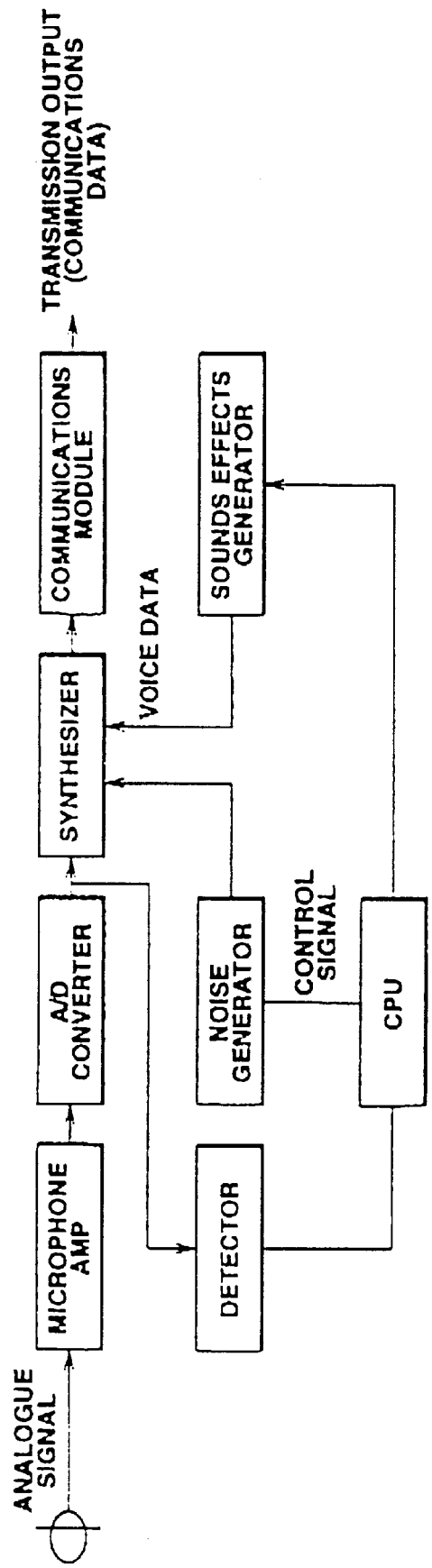
FIG. 57 is a diagram for describing the composition and operation of a sound block.

FIGS. 57 and 55 illustrate cases where sound effects are processed by hardware circuits.

The circuit shown in FIG. 57 relates to a composition for synthesizing noise and sound effects with the voice of the (home) player and then transmitting it to other machines. The analogue voice signal detected by the microphone is amplified by passing it through a microphone amplifier, and it is then converted to a digital signal by an A/D converter and sent to a synthesizer. The digital signal output from the A/D converter is detected by a detecting circuit, and this detection information is passed to the CPU. The CPU drives a noise generator and effects generator in response to the voice being detected, and noise sound data and effects sound data are supplied respectively to the synthesizer. The synthesizer then synthesizes the sound data, noise data and effects data, and transmits them to the communications module. Thereby, data relating to the player's voice is carried in the communications data output from the communications module.

Figure 58:
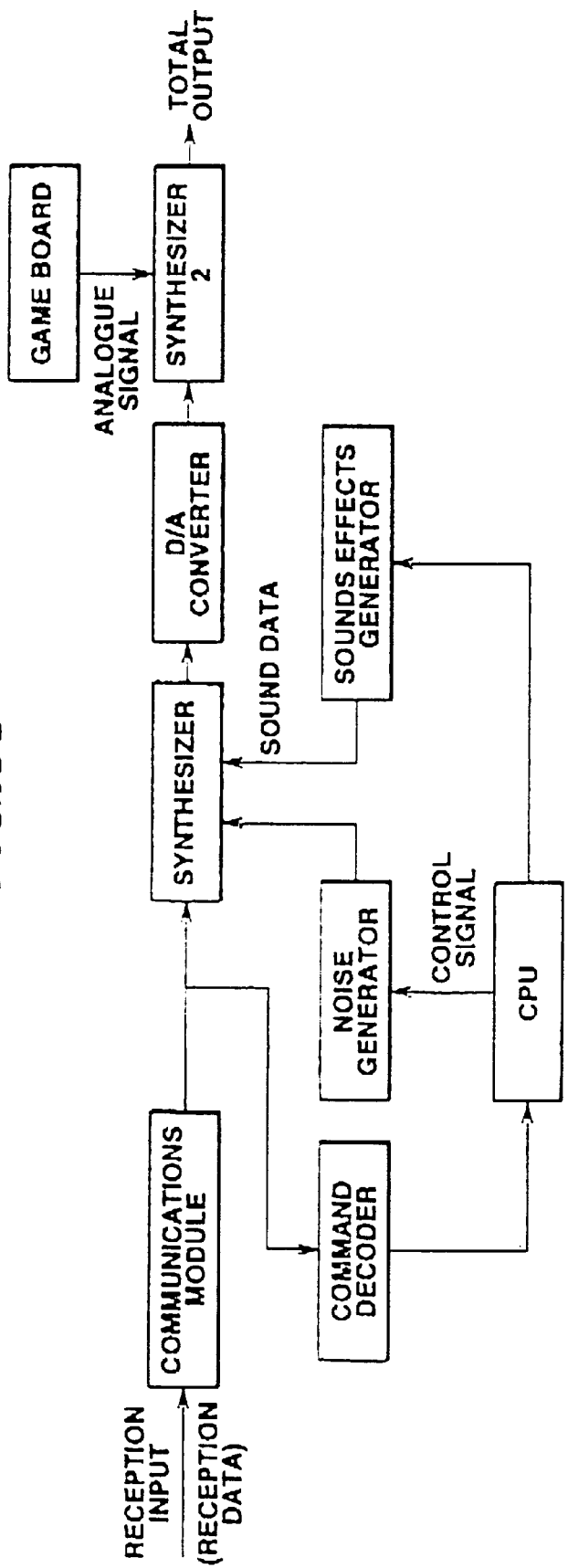
FIG. 58 is a diagram for describing the composition and operation of a sound block.

The circuit shown in FIG. 58 relates to a composition whereby noises and effects are synthesized with the received voice signal of a player (opponent) at another game device. The reception data in the communications module (reception module) is supplied to a synthesizer (first synthesizer), and it is also supplied to a command decoder. The command decoder decodes the sound data in the reception data and transmits the results to the CPU. In response to this, the CPU controls a noise generator, causing it to output noise data to the synthesizer, and it also controls around effects generator, causing it to output sound effects data to the synthesizer. Accordingly, the synthesizer then synthesizes the voice data, noise data and effects data, and transmits the synthesized signal to a second synthesizer via a D/A converter. The second synthesizer is also supplied with a sound signal (analogue) corresponding to the state of development of the game from the game circuit board (host system) of the home device. Therefore, the two sound signals are synthesized at the second synthesizer and output to a speaker.

(Effects)

Figure 59:
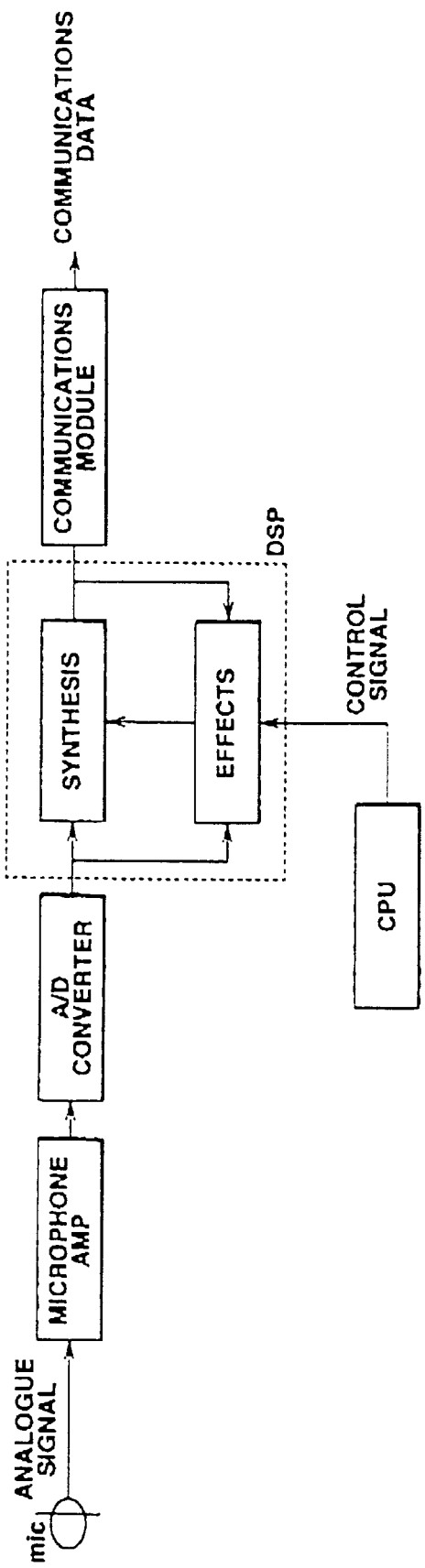
FIG. 59 is a diagram for describing the composition and operation of a sound block.
Figure 60:
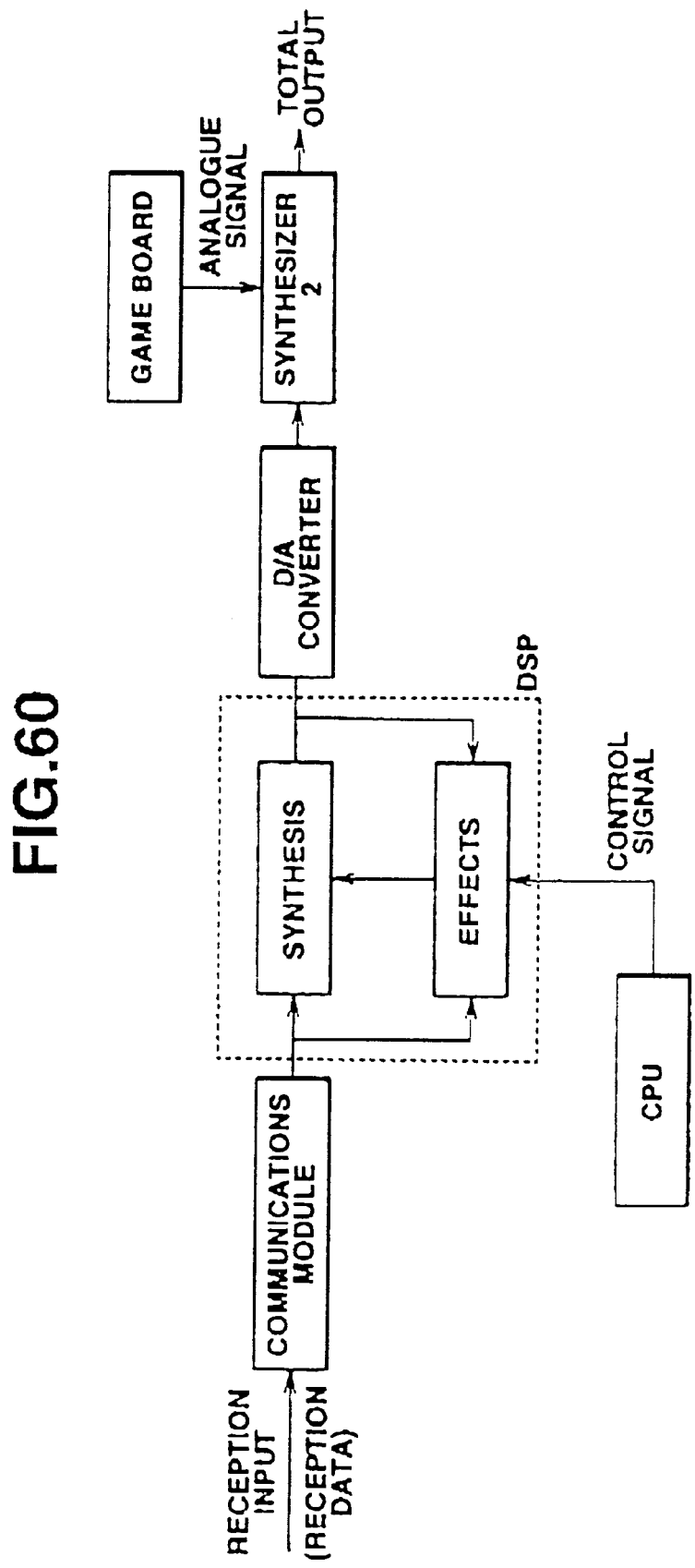
FIG. 60 is a diagram for describing the composition and operation of a sound block.

Generation of effects is processed by a DSP. FIGS. 59 and 60 show an example of a related block composition.

The block composition in FIG. 59 processes the voice of the (home) player and transmits it to the other devices (opponents). Digital sound data obtained via the microphone, microphone amp and A/D converter is subjected to effects (processed) by a DSP (performing the functions of a synthesizer and effects circuit), and it is transmitted to the network by the communications module as sound data in the communications data. The other devices select this data at a prescribed timing.

The block composition shown in FIG. 60 processes and outputs sound transmitted from other devices (opponents). The sound data in the reception data received by the communications module is subjected to effects (processed) by the DSP, whereupon it is converted to an analogue signal by the D/A converter. This analogue signal is sent to a synthesizer, where it is synthesized with a sound signal (analogue) corresponding to the state of development of the game transmitted by the game circuit board (host system) of the home device, and then output by the speaker.

(Standardization of BGM)

Standardization of BGM (background music) is a method whereby sounds and music are distributed to game devices connected to a plurality of other devices, by either transmitting the BGM used by one game device to all of the other game devices, or by transmitting and subsequently synthesizing the BGM of the respective parts.

In a situation where, for example, a plurality of players are located in the same virtual space, this process enables them to share BGM and alarm sounds, etc. matched to common background sound and circumstances, etc. If there are a plurality of game devices, conventionally, the individual game circuit boards create and reproduce their own sound and music data, and music sequence data. Therefore, if there is a scene where the BGM is shared by a plurality of devices at the same time, and if a device which delivers the sound and music is connected at one location, then memory and CPU power consumption can be reduced, thereby lowering the costs of the system as a whole.

Figure 61:
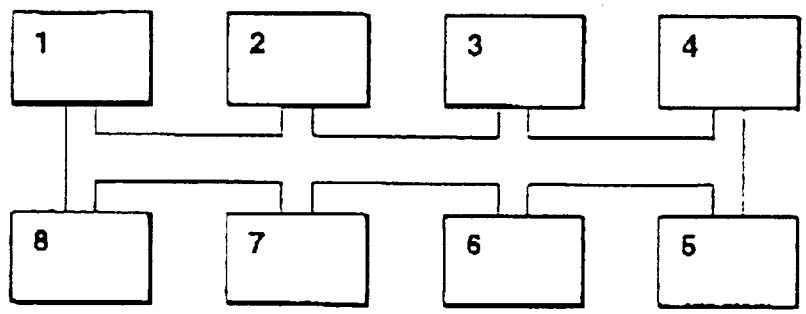
FIG. 61 is a diagram for describing the composition and operation of a sound block.

FIG. 61 shows a compositional example of this process. Game device transmits music and sound, which is received by the remaining game devices 2–8. Since the game devices 2–8 simply require a memory, or the like, for reproducing the music, it is possible to reduce the costs of the communicative game system as a whole.

(Three-dimensional sound communications)

Figure 62:
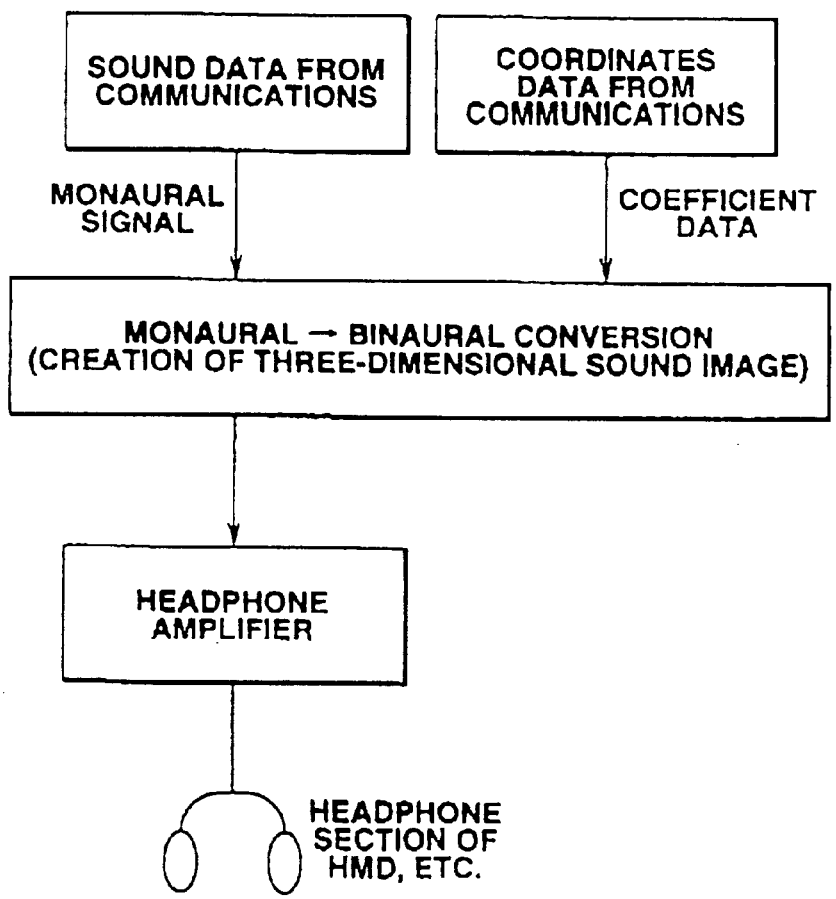
FIG. 62 is a diagram for describing the composition and operation of a sound block.

Here, if a scene where a plurality of players are participating in the same virtual space is imagined, and it is supposed that there is a player (A) in this virtual space in addition to the home player, then three-dimensional sound is sound which reproduces exactly the sensation of someone speaking in the real world, in other words, the voice of player (A) appears to emanate from the current position (co-ordinates) of player (A). On the other hand, player (A) senses his or her voice to be emanating from his or her current position. FIG. 62 shows a processing sequence for achieving this. This processing is implemented by software by means of a DSP. Sound data and co-ordinates data obtained by communications functions are input and a monaural signal is binaurally converted in accordance with co-ordinates data to produce a stereo signal. Three-dimensional sound is produced by passing this stereo signal through a headphone amp and listening on an HMD system. Here, a microphone is attached to this HMD, such that the system can handle three-dimensional sound communications satisfactorily.

The object of the binaural conversion with reference to coordinates data is not limited to the human voice. For example. effects used in the game may also be binaurally converted with reference to co-ordinates data, thereby, for example, causing sounds (e.g. engine noise, etc.) emitted by an enemy character to move three-dimensionally in accordance with the development of the game.

Figure 63:
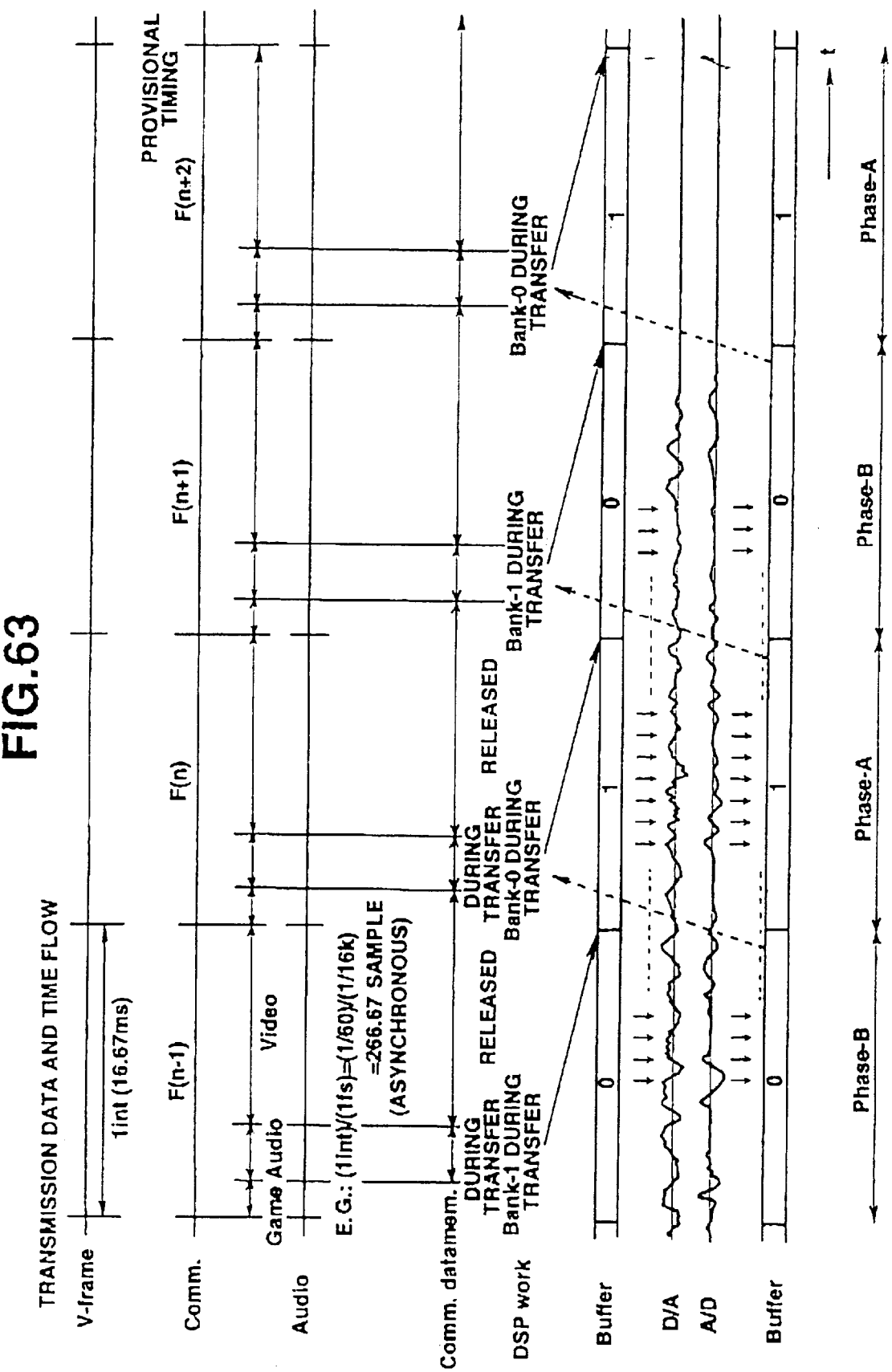
FIG. 63 is a diagram for describing the composition and operation of a sound block.
Figure 64:
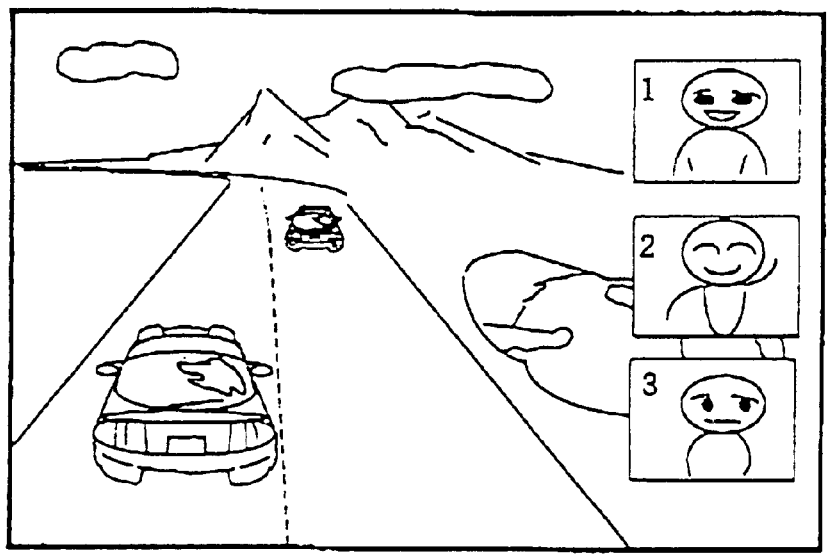
FIG. 64 is a diagram illustrating a further example of image processing implemented by means of communications.

The sound block has been described above, but the relationship between the communications data (particularly sound data) processing and the time sequence is summarized in the timing chart shown in FIG. 63.

As described above, the sound block 45 transfers the voice of each player onto the communications network in the form of a digital signal, and it mixes and outputs received voice data and voice and sound generated by the host system (game board). Furthermore, it is also capable of applying various types of special effects and noises specific to communications to the transferred sound. Therefore, this communicative game system can be applied satisfactorily to all games using communications. For example, in a car racing game involving a contest by communications, the happy voice of the player in the leading car can be output from the speakers of the game devices of the other players, or a player can converse with the player operating the car adjacent or closest to him or her in the virtual game space. Thereby, similarly to the aforementioned communication of camera images, the sense of rivalry and the players' interest in the game is raised, and the sense of realism is increased. Furthermore, if applied to a car racing game involving teams, the voice and sound generating method can be enriched by, for example, outputting the cheers of the winning team or team mates.

Other modes of implementation

Game variations to which the communicative game system according to the present invention can be applied are now described, along with display examples thereof. The processing described in the examples below is carried out by the CPU of the host system (game board) and/or the DSP for image processing.

a. Competitive game

Figure 65:
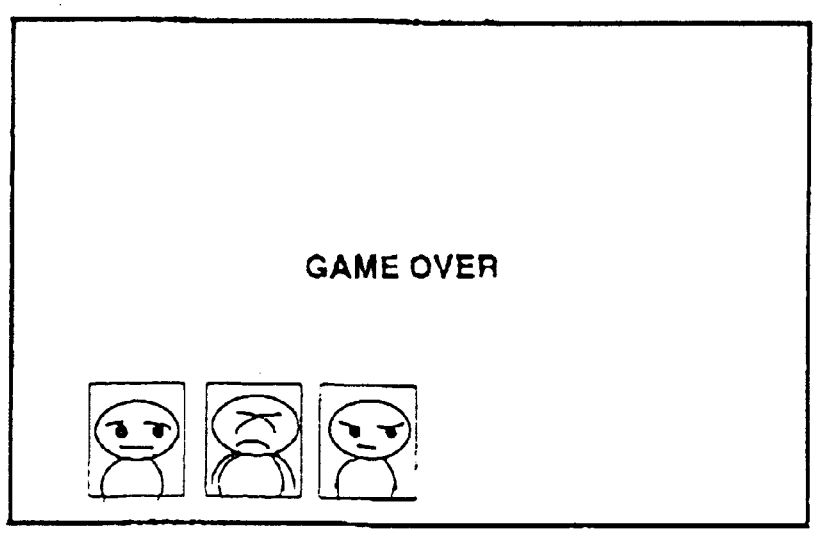
FIG. 65 is a diagram illustrating a further example of image processing implemented by means of communications.

In a competitive game, such as a race game, or the like, camera images (players' faces) can be displayed alongside each other in accordance with their rankings in the contest at that moment in time. The display position or enlargement factor may be changed according to the rankings, or processing may be implemented to change the expression of the face for each rank. Furthermore, as shown in FIG. 65, images taken of the players' expressions at the moment that they lose may also be displayed. In this case, emboss processing may be applied to the images, and gravestones may be carved, for example.

b. Horse racing game, and the like

Figure 66:
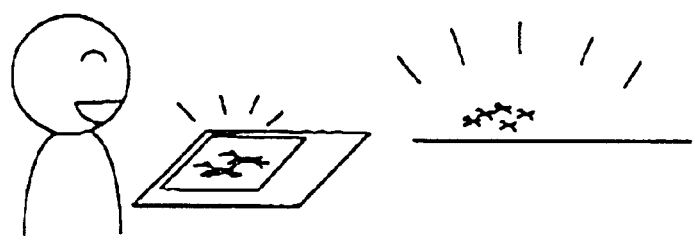
FIG. 66 is a diagram illustrating a further example of image processing implemented by means of communications.

In medal games, such as a horse racing game, a CCD camera image may be transmitted at high speed by means of the communications system according to the present invention to a satellite monitor, whereon it is displayed (see FIG. 66). "Satellite" refers to a simple display system having I/O and image display functions only, as used in games of this kind.

c. Other

Image replay

Another variation involves replay of images. For example, in the case of a racing game, the reaction of a player when his or her car crashes, for instance, is recorded on a high-capacity storage medium, such as a hard disk, such that it can then be replayed. Specifying display position of camera image.

Figure 67:
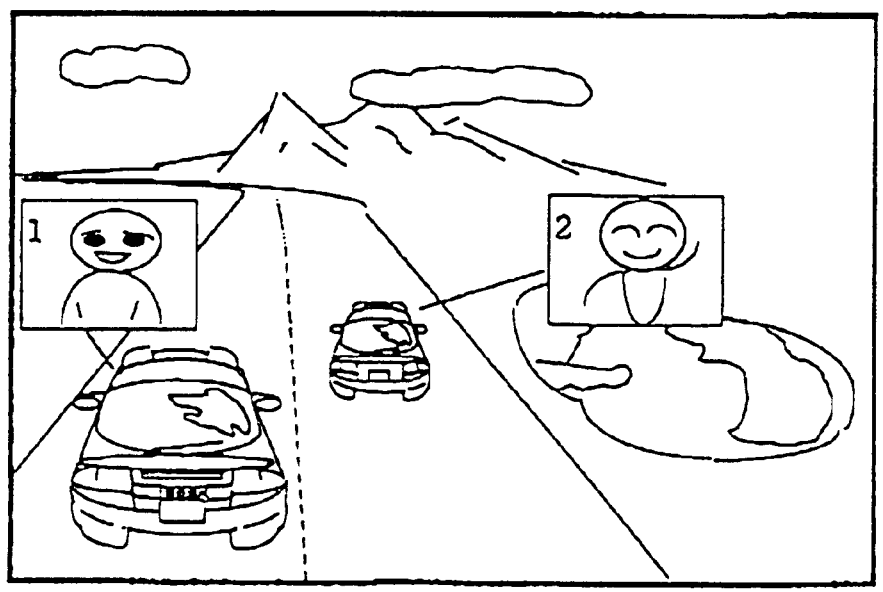
FIG. 67 is a diagram illustrating a further example of image processing implemented by means of communications.

FIG. 67 shows examples where the display position of the camera image is specified in accordance with the screen position of the characters operated by the players. This operation of specifying the display position of the camera image is achieved by providing a register or memory which can be accessed by both the CPU of the host system (game board) and the DSP for image processing, and then indicating the display position of the camera image to the DSP for image processing from the host system CPU. This display position is transmitted over the network as part of the game data to each game device.

Scene change

Figure 68:
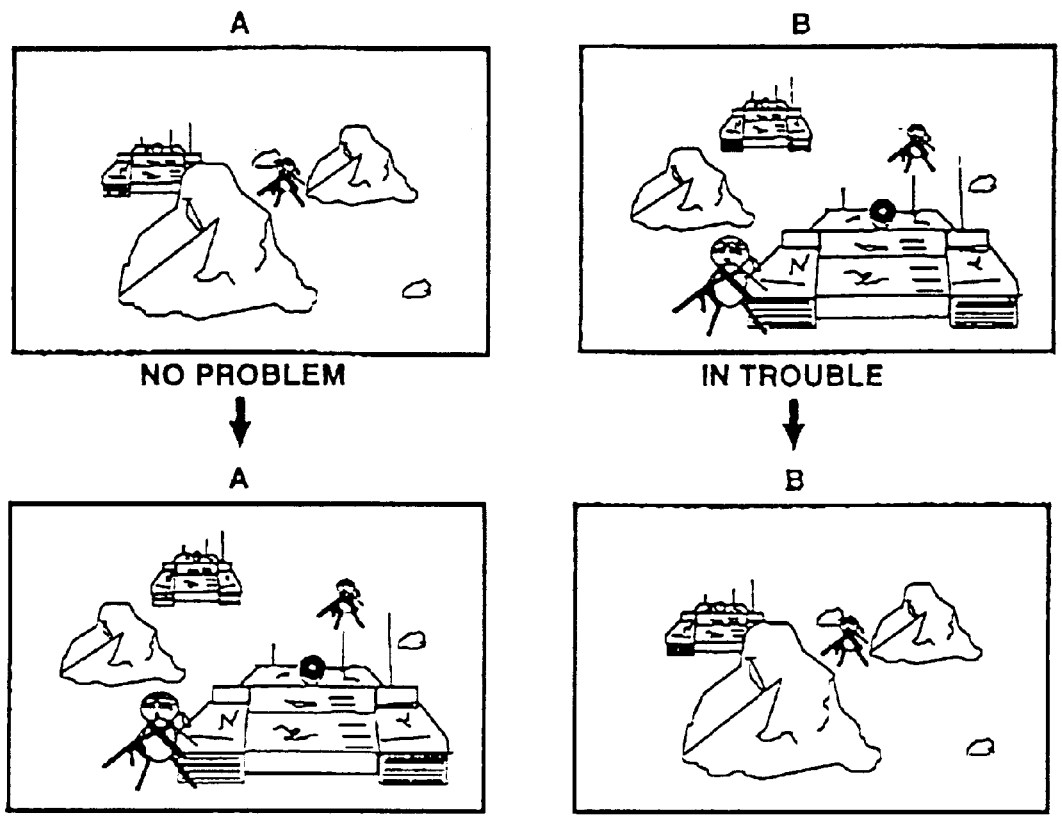
FIG. 68 is a diagram illustrating a further example of image processing implemented by means of communications.
Figure 69:
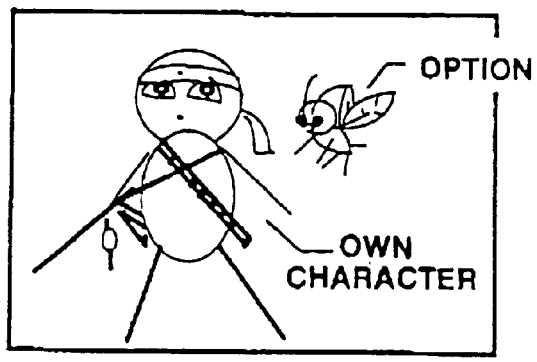
FIG. 69 is a diagram illustrating a further example of image processing implemented by means of communications.

Scene changing is a process which is appropriate for co-operative games, whereby the current scene (situation) can be exchanged instantly between a player's own character and a character operated by a friendly player. In the examples shown in FIG. 68, the scene is changed instantly by scene change processing due to the fact that A is strong whilst B is weak. The data required for this scene change can be transmitted and processed by the communicative game system according to the present invention. Voice recognition In this example, voice input is used for inputting names for a fortune-telling game, or to input other supplementary information. Therefore, a voice recognition I/O section is provided in the sound block. As shown in FIG. 69, the player's own character is moved by operational inputs from a joystick, or the like, whilst optional characters are moved by voice input via the voice recognition I/O.

Virtual band

Figure 70:
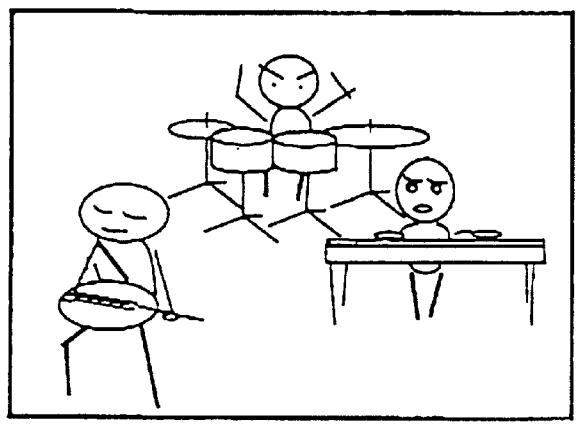
FIG. 70 is a diagram illustrating a further example of image processing implemented by means of communications.

In this example, one instrument is allocated to each one of a plurality of game devices in the communicative game system according to the present invention (e.g., guitar, drums, piano, etc.) and a band performance is created by synthesizing sounds played artificially by the players (game sounds, microphone sounds) with images of a performance and/or camera images (see FIG. 70). In this case, it is suitable to use polygons for displaying the performance images.

Use of texture

Figure 71:
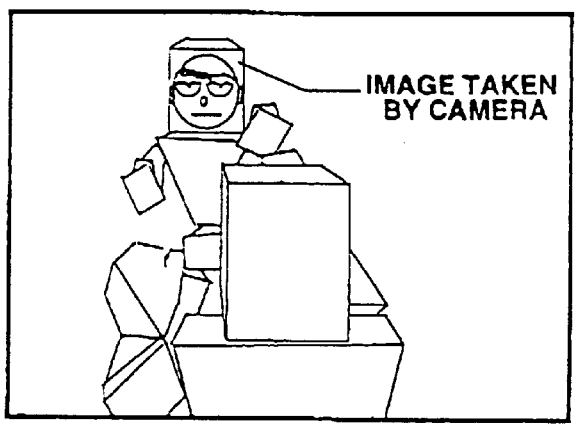
FIG. 71 is a diagram illustrating a further example of image processing implemented by means of communications.

Here, the camera image is used as texture. For example, in a fighting game, or the like, an image taken by a camera is applied to the polygons comprising a game image (see FIG. 71).

Virtual quick-response quiz game

Figure 72:
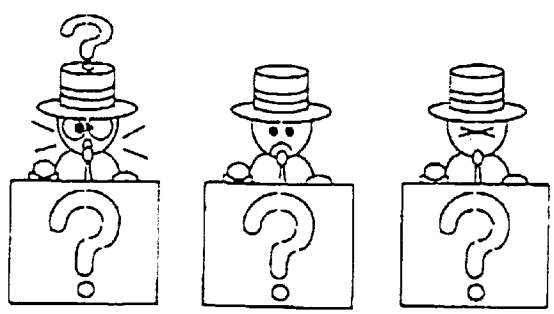
FIG. 72 is a diagram illustrating a further example of image processing implemented by means of communications.

The communicative game system according to the present invention is also suitable for playing a quick-response quiz game, or the like, wherein voice recognition I/O sections are provided in the sound block of each game device, and players answer by voice, as illustrated schematically in FIG. 72.

The present invention is not limited to the modes of implementation described above, and it is clear to anyone involved in this field that the compositions of the aforementioned modes of implementation can be modified in a variety of ways, provided that this does not deviate from the essence of the present invention, and these modifications also lie within the scope of the present invention. As described above, according to the communicative game system of the present invention, since a plurality of game devices respectively comprise transferring means for receiving data transferred on the network and transferring this reception data and data generated by the game device itself onto the network, and access means for accessing the reception data, and data is transmitted and received between the plurality of game devices by means of a broadcast communications system based on the transferring means and the access means, it is possible to communicate data, such as the expressions or voices of players, and the like, as well as game data. Therefore, unlike conventional communicative game systems, information relating to each player, other than the game data, can also be exchanged, thereby improving "communication" between players, raising the sense of rivalry and level of interest created by the game, and thus increasing the added value of the game. Furthermore, it is also possible to improve the sense of realism of the game by communicating special effects, and the like, which are desirable in the game, as information other than the game data.

What is claimed is:

1. A communicative game system comprising a network formed by mutually connecting a plurality of game devices, whereby a plurality of players play a game individually, by means of communications media, wherein said plurality of game devices respectively comprise:

transferring means for receiving data transferred over said network and transferring the received data and data generated by the game device onto said network; and access means for accessing said received data; wherein the data is transmitted and received by conducting communications according to a broadcast system between said plurality of game devices by means of said transferring means and said access means; and wherein the data transferred over said network comprises a frame data packet generated by implementation of the game in each of said game devices; a sound data packet relating to the voice of the player playing the game at each of said game devices; and a video packet relating to an image of the player playing the game at each of said game devices.

2. The communicative game system according to claim 1, wherein each of said game devices comprises game executing means for generating said game data, sound data generating means for inputting the voice of said player and generating said sound data and video data generating means for inputting images of said player and generating said video data.

3. The communicative game system according to claim 2, wherein each of said game devices comprises sound generating means for generating sound by synthesizing the sound data in said game data with said sound data in said transfer data, and image display means for displaying an image on a monitor by synthesizing the video data in said game data with said video data in said transfer data.

4. The communicative game system according to claim 2, wherein said image display means comprises video data processing means whereby at least one element out of the elements of display size, display position, brightness, colour, bordering and embossing, relating to said video data in said transfer data can be changed.

5. The communicative game system according to claim 3, wherein said video data generating means comprises compression means for compressing said video data.

6. The communicative game system, according to claim 3, wherein said video data generating means comprises extracting means for extracting only a human image of said player from said video data.

7. The communicative game system according to claim 3, wherein said image display means comprises means for superimposing said video data in said transfer data on the screen of video data in said game data, in the form of a window.

8. The communicative game system according to claim 3, wherein said transferring means comprises a controller for controlling the data transmission and reception operations of said transferring means and a memory for recording said received data, and said sound data generating means comprises a processor for processing said sound data and a working memory, which is separate from said memory and is used as a work area by the processor.

9. The communicative game system, according to claim 3, wherein said sound data generating means comprises means for achieving synchronism by interpolation processing to match a plurality of frame lengths.

10. The communicative game system according to claim 3, wherein said sound data generating means comprises sound data processing means for applying processing corresponding to at least one element of the elements of sound effects, noise or special effects, to said sound data.

11. The communicative game system according to claim 3, wherein any one of said plurality of game devices comprises means for transmitting background sound data generated by a home game device to the other game devices.

12. The communicative game system according to claim 3, wherein said sound data generating means comprises means for converting said sound data to three-dimensional sound data.

13. The communicative game system according to claim 1, wherein each of said game devices comprises scene change processing means for exchanging a scene between a first character corresponding to a user of the game device and a second character corresponding to a user of another game device.

* * * * *